United States Patent
Xu et al.

(10) Patent No.: US 12,395,971 B2
(45) Date of Patent: Aug. 19, 2025

(54) SLOT FORMAT DOWNLINK CONTROL INFORMATION FOR CROSS LINK INTERFERENCE MEASUREMENT RESOURCE CONFIGURATION

(71) Applicant: QUALCOMM INCORPORATED, San Diego, CA (US)

(72) Inventors: Huilin Xu, Temecula, CA (US); Chenxi Hao, Beijing (CN); Ruifeng Ma, Beijing (CN); Yuwei Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/004,387

(22) PCT Filed: Aug. 14, 2020

(86) PCT No.: PCT/CN2020/109111
§ 371 (c)(1),
(2) Date: Jan. 5, 2023

(87) PCT Pub. No.: WO2022/032619
PCT Pub. Date: Feb. 17, 2022

(65) Prior Publication Data
US 2023/0362897 A1  Nov. 9, 2023

(51) Int. Cl.
*H04W 72/0446* (2023.01)
*H04W 72/1263* (2023.01)
(Continued)

(52) U.S. Cl.
CPC ... *H04W 72/0446* (2013.01); *H04W 72/1263* (2013.01); *H04W 72/232* (2023.01); *H04W 72/541* (2023.01)

(58) Field of Classification Search
CPC ........... H04W 72/0446; H04W 72/541; H04W 72/232; H04W 72/1263
See application file for complete search history.

(56) References Cited

U.S. PATENT DOCUMENTS

2021/0321415 A1* 10/2021 Raghavan ......... H04L 27/26025
2025/0008492 A1*  1/2025 Xu .................... H04W 72/0446

FOREIGN PATENT DOCUMENTS

CN   109803429 A    5/2019
EP   3567759 A1   11/2019

OTHER PUBLICATIONS

CATT: "Contents of the Group-common PDCCH", 3GPP TSG RAN WG1 Meeting #AH_NR2, 3GPP Draft; R1-1710081, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 26, 2017, XP051299305, Retrieved from the Internet: URL: http://www.3gpp.org/ftp/Meetings_3GPP_SYNC/RAN1/Docs/ [retrieved on Jun. 26, 2017], 4 pages, Sections 1-4.
(Continued)

*Primary Examiner* — Melvin C Marcelo
(74) *Attorney, Agent, or Firm* — Holland & Hart LLP

(57) ABSTRACT

Methods, systems, and devices for wireless communications are described. In some systems, a base station may transmit a slot format indicator (SFI) to a first user equipment (UE) via downlink control information (DCI) and the first UE may use the SFI to determine time-domain resources over which the first UE may measure cross link interference (CLI) arising from a transmission from a second UE. The first UE may use the SFI as an index into a slot format combination table, which may also be used for uplink and downlink scheduling or may be exclusively used for determining the time-domain resources for CLI measurement. The first UE may determine a set of slot formats from a slot format table based on a slot format combination corresponding to the SFI index and may determine over which symbols the first UE may measure CLI based on the set of slot formats.

30 Claims, 26 Drawing Sheets

(51) Int. Cl.
H04W 72/232 (2023.01)
H04W 72/541 (2023.01)

(56) References Cited

OTHER PUBLICATIONS

CMCC: "UE Behaviour Related to Dynamic and Semi-static Configured Resources", 3GPPTSG RAN WG1 NR Ad-Hoc#2, 3GPP Draft; R1-1710781, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017, XP051299985, 3 pages, Sections 1-3.
International Search Report and Written Opinion—PCT/CN2020/109111—ISA/EPO—May 12, 2021.

* cited by examiner

| Format 405 | Symbol Number in a Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| ••• | ••• | ••• | ••• | ••• | ••• | ••• | ••• | ••• | ••• | ••• | ••• | ••• | ••• | ••• |
| $l-1$ | D | D | F | F | F | U | U | U | D | D | D | D | D | D |
| $l$ | N | N | N | N | Y | Y | Y | N | N | N | N | Y | Y | Y |
| $l+1$ | N | N | N | N | N | N | Y | Y | Y | Y | Y | Y | Y | Y |
| $l$ through $p-2$ Reserved | | | | | | | | | | | | | | |
| $P-2$ | ••• | ••• | ••• | ••• | ••• | ••• | ••• | ••• | ••• | ••• | ••• | ••• | ••• | ••• |
| $P-1$ | | | | | | | | | | | | | | |

SLOT FORMAT DOWNLINK CONTROL INFORMATION FOR CROSS LINK INTERFERENCE MEASUREMENT RESOURCE CONFIGURATION

CROSS REFERENCE

The present Application is a 371 national stage filing of International PCT Application No. PCT/CN2020/109111 by XU et al. entitled "SLOT FORMAT DOWNLINK CONTROL INFORMATION FOR CROSS LINK INTERFERENCE MEASUREMENT RESOURCE CONFIGURATION," filed Aug. 14, 2020, which is assigned to the assignee hereof, and which is expressly incorporated by reference in its entirety herein.

INTRODUCTION

The following relates to wireless communications, including managing crosslink interference (CLI) measurement resources at a user equipment (UE) via downlink control signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as UE.

SUMMARY

A method of wireless communication at a first UE is described. The method may include receiving, from a base station, downlink control information (DCI) including a slot format indicator (SFI) associated with a set of slot formats. The method may also include determining time-domain resources for CLI measurement at the UE based on the set of slot formats, the time-domain resources including a first set of symbols for the CLI measurement at the first UE. The method may further include measuring CLI at the first UE over the first set of symbols based on the determination.

An apparatus for wireless communication at a first UE is described. The apparatus may include a processor and memory coupled to the processor. The processor and memory may be configured to receive, from a base station, DCI including an SFI associated with a set of slot formats. The processor and memory may also be configured to determine time-domain resources for CLI measurement at the UE based on the set of slot formats, the time-domain resources including a first set of symbols for the CLI measurement at the first UE. The processor and memory may further be configured to measure CLI at the first UE over the first set of symbols based on the determination.

Another apparatus for wireless communication at a first UE is described. The apparatus may include means for receiving, from a base station, DCI including an SFI associated with a set of slot formats. The apparatus may also include means for determining time-domain resources for CLI measurement at the UE based on the set of slot formats, the time-domain resources including a first set of symbols for the CLI measurement at the first UE. The apparatus may further include means for measuring CLI at the first UE over the first set of symbols based on the determination.

A non-transitory computer-readable medium storing code for wireless communication at a first UE is described. The code may include instructions executable by a processor to receive, from a base station, DCI including an SFI associated with a set of slot formats. The code may also include instructions executable by a processor to determine time-domain resources for CLI measurement at the UE based on the set of slot formats, the time-domain resources including a first set of symbols for the CLI measurement at the first UE. The code may further include instructions executable by a processor to measure CLI at the first UE over the first set of symbols based on the determination.

Some examples of the method, apparatuses, and non-transitory computer-readable medium described herein may further include operations, features, means, or instructions for receiving, from the base station, an indication of a slot format combination table and for determining a slot format combination based on the SFI and the slot format combination table, the slot format combination indicating the set of slot formats.

In some examples of the method, apparatuses, and non-transitory computer-readable medium described herein, the slot format combination table may be associated with the base station from which the DCI may be received.

Some examples of the method, apparatuses, and non-transitory computer-readable medium described herein may further include operations, features, means, or instructions for receiving an identifier of the second base station in the DCI. Such examples of the method, apparatuses, and non-transitory computer-readable medium described herein may further include operations, features, means, or instructions for determining to use the slot format combination table associated with the second base station based on receiving the identifier of the second base station received in the DCI.

In some examples of the method, apparatuses, and non-transitory computer-readable medium described herein, the slot format combination table may be exclusively associated with the time-domain resources for the CLI measurement at the first UE.

Some examples of the method, apparatuses, and non-transitory computer-readable medium described herein may further include operations, features, means, or instructions for determining a set of rows of a slot format table based on the slot format combination. Such examples of the method, apparatuses, and non-transitory computer-readable medium described herein may further include operations, features, means, or instructions for determining the set of slot formats based on the set of rows in the slot format table, each row of the set of rows in the slot format table indicating a slot format of the set of slot formats.

In some examples of the method, apparatuses, and non-transitory computer-readable medium described herein, the set of rows includes rows within a portion of the slot format table associated with available slot formats for uplink and downlink scheduling.

In some examples of the method, apparatuses, and non-transitory computer-readable medium described herein, the set of rows includes rows within a portion of the slot format table associated with reserved slot formats that may be unavailable for uplink and downlink scheduling.

In some examples of the method, apparatuses, and non-transitory computer-readable medium described herein, the set of rows includes a first subset of rows within a first portion of the slot format table associated with available slot formats for uplink and downlink scheduling and a second subset of rows within a second portion of the slot format table associated with reserved slot formats that may be unavailable for uplink and downlink scheduling.

Some examples of the method, apparatuses, and non-transitory computer-readable medium described herein may further include operations, features, means, or instructions for receiving, from the base station, an indication of frequency-domain resources for the CLI measurement at the first UE.

Some examples of the method, apparatuses, and non-transitory computer-readable medium described herein may further include operations, features, means, or instructions for receiving, from the base station, sequence generation information for the CLI measurement at the first UE. Such examples of the method, apparatuses, and non-transitory computer-readable medium described herein may further include operations, features, means, or instructions for receiving, from the second UE, a reference signal transmitted by the second UE over the first set of symbols, the reference signal associated with the sequence generation information and the measuring of the CLI at the first UE based on the receiving of the reference signal over the first set of symbols from the second UE.

Some examples of the method, apparatuses, and non-transitory computer-readable medium described herein may further include operations, features, means, or instructions for receiving, from the base station, an indication of a periodic pattern within a resource occasion. Such examples of the method, apparatuses, and non-transitory computer-readable medium described herein may further include operations, features, means, or instructions for determining a second set of symbols based on the periodic pattern within the resource occasion and determining the first set of symbols based on the time-domain resources and the second set of symbols.

In some examples of the method, apparatuses, and non-transitory computer-readable medium described herein, the first set of symbols may be fully included within the second set of symbols.

In some examples of the method, apparatuses, and non-transitory computer-readable medium described herein, the first set of symbols at least partially overlap with the second set of symbols.

Some examples of the method, apparatuses, and non-transitory computer-readable medium described herein may further include operations, features, means, or instructions for receiving, from the base station, an indication of a location of the SFI within the DCI.

Some examples of the method, apparatuses, and non-transitory computer-readable medium described herein may further include operations, features, means, or instructions for determining a CLI measurement report based on measuring the CLI at the first UE over the first set of symbols. Such examples of the method, apparatuses, and non-transitory computer-readable medium described herein may further include operations, features, means, or instructions for transmitting, to the base station, the CLI measurement report.

In some examples of the method, apparatuses, and non-transitory computer-readable medium described herein, each slot format of the set of slot formats may include a quantity of symbols including the first set of symbols, the quantity of symbols comprising one or more downlink symbols, one or more uplink symbols, or one or more flexible symbols, or any combination thereof. Such examples of the method, apparatuses, and nontransitory computer-readable medium described herein may include operations, features, means, or instructions for receiving, from the base station, an indication of a slot format configuration for the CLI measurement at the first UE, the slot format configuration indicating the first set of symbols.

Some examples of the method, apparatuses, and non-transitory computer-readable medium described herein may further include operations, features, means, or instructions for determining that the first set of symbols include the one or more uplink symbols of each slot format of the set of slot formats based on the slot format configuration.

Some examples of the method, apparatuses, and non-transitory computer-readable medium described herein may further include operations, features, means, or instructions for determining that the first set of symbols include the one or more downlink symbols of each slot format of the set of slot formats based on the slot format configuration.

Some examples of the method, apparatuses, and non-transitory computer-readable medium described herein may further include operations, features, means, or instructions for determining that the first set of symbols include the one or more uplink symbols and the one or more flexible symbols of each slot format of the set of slot formats based on the slot format configuration.

Some examples of the method, apparatuses, and non-transitory computer-readable medium described herein may further include operations, features, means, or instructions for determining that the first set of symbols include the one or more downlink symbols and the one or more flexible symbols of each slot format of the set of slot formats based on the slot format configuration.

Some examples of the method, apparatuses, and non-transitory computer-readable medium described herein may further include operations, features, means, or instructions for determining that each slot format of the set of slot formats includes a quantity of symbols including a first type of symbols and a second type of symbols, the first set of symbols including the first type of symbols.

In some examples of the method, apparatuses, and non-transitory computer-readable medium described herein, the first type of symbols may be associated with first symbols over which the first UE measures the CLI at the first UE and the second type of symbols may be associated with second symbols over which the first UE refrains from measuring the CLI at the first UE.

In some examples of the method, apparatuses, and non-transitory computer-readable medium described herein, the DCI may be associated with an SFI DCI format.

In some examples of the method, apparatuses, and non-transitory computer-readable medium described herein, the DCI may be associated with a DCI format that may be exclusively used for conveying the time-domain resources for the CLI measurement at the first UE.

In some examples of the method, apparatuses, and non-transitory computer-readable medium described herein, the SFI includes a slot format combination index.

A method of wireless communication at a base station is described. The method may include determining time-domain resources to be used for CLI measurement at a first UE based on a first slot format of the first UE and a second slot format of a second UE, the time-domain resources including a first set of symbols for the CLI measurement at the first UE. The method may also include transmitting, to the first UE, DCI including an SFI associated with a set of slot formats indicative of the time-domain resources to be used for the CLI measurement at the first UE. The method may further include receiving, from the first UE, a CLI measurement report including a measured CLI at the first UE over the first set of symbols.

An apparatus for wireless communication at a base station is described. The apparatus may include a processor and memory coupled to the processor. The processor and memory may be configured to determine time-domain resources to be used for CLI measurement at a first UE based on a first slot format of the first UE and a second slot format of a second UE, the time-domain resources including a first set of symbols for the CLI measurement at the first UE. The processor and memory may also be configured to transmit, to the first UE, DCI including an SFI associated with a set of slot formats indicative of the time-domain resources to be used for the CLI measurement at the first UE. The processor and memory may further be configured to receive, from the first UE, a CLI measurement report including a measured CLI at the first UE over the first set of symbols.

Another apparatus for wireless communication at a base station is described. The apparatus may include means for determining time-domain resources to be used for CLI measurement at a first UE based on a first slot format of the first UE and a second slot format of a second UE, the time-domain resources including a first set of symbols for the CLI measurement at the first UE. The apparatus may also include means for transmitting, to the first UE, DCI including an SFI associated with a set of slot formats indicative of the time-domain resources to be used for the CLI measurement at the first UE. The apparatus may further include means for receiving, from the first UE, a CLI measurement report including a measured CLI at the first UE over the first set of symbols.

A non-transitory computer-readable medium storing code for wireless communication at a base station is described. The code may include instructions executable by a processor to determine time-domain resources to be used for CLI measurement at a first UE based on a first slot format of the first UE and a second slot format of a second UE, the time-domain resources including a first set of symbols for the CLI measurement at the first UE. The code may also include instructions executable by a processor to transmit, to the first UE, DCI including an SFI associated with a set of slot formats indicative of the time-domain resources to be used for the CLI measurement at the first UE. The code may further include instructions executable by a processor to receive, from the first UE, a CLI measurement report including a measured CLI at the first UE over the first set of symbols.

Some examples of the method, apparatuses, and non-transitory computer-readable medium described herein may further include operations, features, means, or instructions for transmitting, to the first UE, an indication of a slot format combination table to be used to determine a slot format combination based on the SFI, the slot format combination indicating the set of slot formats.

In some examples of the method, apparatuses, and non-transitory computer-readable medium described herein, the slot format combination table may be associated with the base station.

Some examples of the method, apparatuses, and non-transitory computer-readable medium described herein may further include operations, features, means, or instructions for transmitting an identifier of the second base station in the DCI.

In some examples of the method, apparatuses, and non-transitory computer-readable medium described herein, the slot format combination table may be exclusively associated with the time-domain resources for the CLI measurement at the first UE.

Some examples of the method, apparatuses, and non-transitory computer-readable medium described herein may further include operations, features, means, or instructions for determining the set of slot formats based at least in part based on the time-domain resources to be used for the CLI measurement at the first UE. Such examples of the method, apparatuses, and non-transitory computer-readable medium described herein may further include operations, features, means, or instructions for determining a set of rows of a slot format table based on the set of slot formats, the slot format combination based on the set of rows of the slot format table.

In some examples of the method, apparatuses, and non-transitory computer-readable medium described herein, the set of rows includes rows within a portion of the slot format table associated with available slot formats for uplink and downlink scheduling.

In some examples of the method, apparatuses, and non-transitory computer-readable medium described herein, the set of rows includes rows within a portion of the slot format table associated with reserved slot formats that may be unavailable for uplink and downlink scheduling.

In some examples of the method, apparatuses, and non-transitory computer-readable medium described herein, the set of rows includes a first subset of rows within a first portion of the slot format table associated with available slot formats for uplink and downlink scheduling and a second subset of rows within a second portion of the slot format table associated with reserved slot formats that may be unavailable for uplink and downlink scheduling.

Some examples of the method, apparatuses, and non-transitory computer-readable medium described herein may further include operations, features, means, or instructions for transmitting, to the UE, an indication of frequency-domain resources for the CLI measurement at the first UE.

Some examples of the method, apparatuses, and non-transitory computer-readable medium described herein may further include operations, features, means, or instructions for transmitting, to the first UE, sequence generation information for the CLI measurement at the first UE.

Some examples of the method, apparatuses, and non-transitory computer-readable medium described herein may further include operations, features, means, or instructions for determining the first set of symbols based on the time-domain resources and a second set of symbols, the second set of symbols associated with a periodic pattern within a resource occasion. Such examples of the method, apparatuses, and non-transitory computer-readable medium described herein may further include operations, features, means, or instructions for transmitting, to the first UE, an indication of the periodic pattern within the resource occasion.

In some examples of the method, apparatuses, and non-transitory computer-readable medium described herein, the first set of symbols may be fully included within the second set of symbols.

In some examples of the method, apparatuses, and non-transitory computer-readable medium described herein, the first set of symbols at least partially overlap with the second set of symbols.

Some examples of the method, apparatuses, and non-transitory computer-readable medium described herein may further include operations, features, means, or instructions for transmitting, to the first UE, an indication of a location of the SFI within the DCI.

Some examples of the method, apparatuses, and non-transitory computer-readable medium described herein may further include operations, features, means, or instructions for determining the time-domain resources including an overlap of downlink symbols in the first slot format of the first UE and uplink symbols in the second slot format of the second UE.

In some examples of the method, apparatuses, and non-transitory computer-readable medium described herein, each slot format of the set of slot formats may include a quantity of symbols including the first set of symbols, the quantity of symbols comprising one or more downlink symbols, one or more uplink symbols, or one or more flexible symbols, or any combination thereof. Such examples of the method, apparatuses, and nontransitory computer-readable medium described herein may include operations, features, means, or instructions for transmitting, to the first UE, an indication of a slot format configuration for the CLI measurement at the first UE, the slot format configuration indicating the first set of symbols.

Some examples of the method, apparatuses, and non-transitory computer-readable medium described herein may further include operations, features, means, or instructions for determining that the first set of symbols include the one or more uplink symbols of each slot format of the set of slot formats, the slot format configuration based on determining that the first set of symbols include the one or more uplink symbols.

Some examples of the method, apparatuses, and non-transitory computer-readable medium described herein may further include operations, features, means, or instructions for determining that the first set of symbols include the one or more downlink symbols of each slot format of the set of slot formats, the slot format configuration based on determining that the first set of symbols include the one or more downlink symbols.

Some examples of the method, apparatuses, and non-transitory computer-readable medium described herein may further include operations, features, means, or instructions for determining that the first set of symbols include the one or more uplink symbols and the one or more flexible symbols of each slot format of the set of slot formats, the slot format configuration based on determining that the first set of symbols include the one or more uplink symbols and the one or more flexible symbols.

Some examples of the method, apparatuses, and non-transitory computer-readable medium described herein may further include operations, features, means, or instructions for determining that the first set of symbols include the one or more downlink symbols and the one or more flexible symbols of each slot format of the set of slot formats, the slot format configuration based on determining that the first set of symbols include the one or more downlink symbols and the one or more flexible symbols.

Some examples of the method, apparatuses, and non-transitory computer-readable medium described herein may further include operations, features, means, or instructions for determining that each slot format of the set of slot formats includes a quantity of symbols including a first type of symbols and a second type of symbols, the first set of symbols including the first type of symbols.

In some examples of the method, apparatuses, and non-transitory computer-readable medium described herein, the first type of symbols may be associated with first symbols over which the first UE measures CLI at the first UE and the second type of symbols may be associated with second symbols over which the first UE refrains from measuring the CLI at the first UE.

In some examples of the method, apparatuses, and non-transitory computer-readable medium described herein, the DCI may be associated with an SFI DCI format.

In some examples of the method, apparatuses, and non-transitory computer-readable medium described herein, the DCI may be associated with a DCI format that may be exclusively used for conveying the time-domain resources for the CLI measurement at the first UE.

In some examples of the method, apparatuses, and non-transitory computer-readable medium described herein, the SFI includes a slot format combination index.

DETAILED DESCRIPTION

Figure 1:
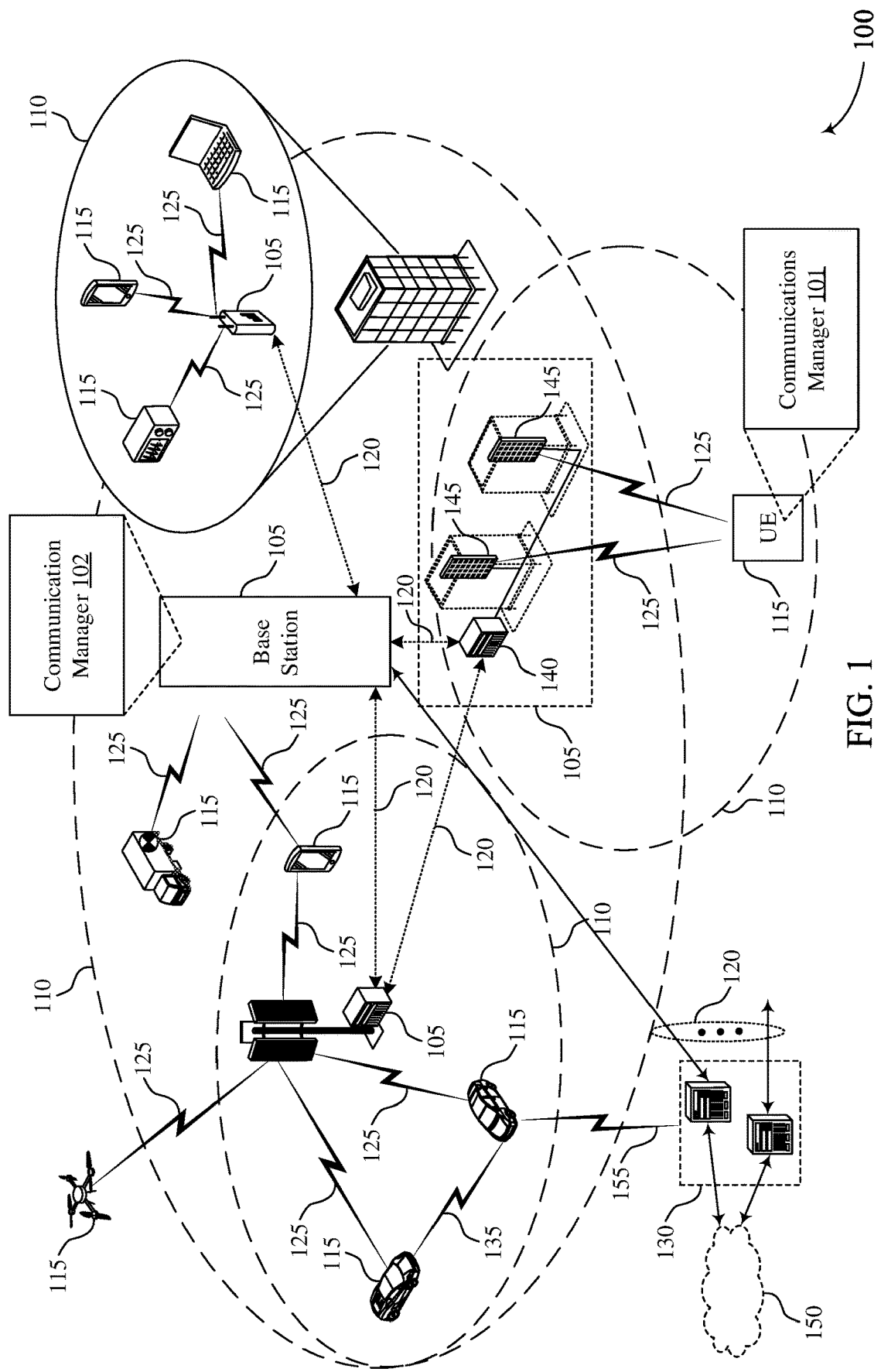
FIGS. 1, 2A, and 2B illustrate examples of wireless communications systems that support slot format DCI for CLI measurement resource configuration in accordance with one or more aspects of the present disclosure.

In some wireless communications systems, multiple nearby UEs may communicate with a base station (or different base stations) via either uplink signaling or downlink signaling. In some cases, whether a UE is communicating via uplink signaling or downlink signaling may be based on a current time-domain location (e.g., a current symbol) in a slot and a corresponding slot format configured at the UE. For example, a first UE may be configured with a first slot format and a second UE may be configured with a second slot format such that the first UE may communicate with a base station via uplink signaling or downlink signaling according to the first slot format while the second UE may communicate with the base station (or a different base station) via uplink signaling or downlink signaling according to the second slot format. In some cases, the first slot format may differ from the second slot format such that the first UE may be scheduled for downlink signaling over the same symbols as the second UE is scheduled for uplink signaling. In such cases, the transmission of the uplink signaling from the second UE may interfere with the downlink signaling received by the first UE. Such interference from one UE to another may be referred to as CLI. To account for CLI between the first UE and the second UE, the base station may configure a time-domain resource as a measurement resource (e.g., a CLI measurement resource) over which the first UE may measure CLI.

In some cases, the base station may configure the CLI measurement at the first UE as a Layer 3 (L3) measurement, which may result in a long-term view of the CLI conditions at the first UE. In examples in which the slot formats at the first UE and the second UE are configured dynamically (e.g., by DCI), however, the time-domain resources over which CLI may be present at the first UE may change in the short-term. For example, if the slot formats at the first UE or the second UE, or both, are dynamically configured, the CLI measurement resource may no longer include symbols allocated for downlink signaling to the first UE and uplink signaling from the second UE (e.g., when CLI may likely occur). As such, the first UE may sub-optimally measure the actual CLI at the first UE because the configuration of the L3 CLI measurement may be unable to keep up (e.g., stay current) with the dynamically configured slot formats and may lose synchronization with the symbols during which CLI may be likely.

In some implementations of the present disclosure, the base station may dynamically configure a CLI measurement resource at the first UE based on comparing current or active slot formats of the first UE and the second UE. For example, the base station may determine an active slot format of each of the first UE and the second UE and may dynamically configure the CLI measurement resource at the first UE based on determining over which symbols CLI will likely be present at the first UE (e.g., which symbols are allocated for uplink signaling from the second UE and downlink signaling to the first UE). In some examples, the base station may transmit an indication of the CLI measurement resource to the first UE as an SFI, which may also be referred to herein as a slot format combination index, within DCI. The first UE may use the SFI to determine a slot format combination from a slot format combination table and may determine a slot format for each of a number of slots within the slot format combination based on referencing a slot format table.

In some examples, the first UE may use the determined slot format for each of the number of slots within the slot format combination to determine time-domain resources over which the UE may measure CLI based on a slot format configuration. The slot format configuration may indicate which symbols (e.g., which of uplink symbols, downlink symbols, and flexible symbols) of a slot format the first UE may interpret as CLI measurement resources. Additionally or alternatively, the determined slot format may be dedicatedly (e.g., exclusively) configured for CLI measurement and may include two different symbol types. In such examples, the first UE may measure CLI during a first type of symbol and refrain from measuring CLI during a second type of symbol. Based on measuring the CLI over time-domain resources as indicated by the slot formats of the slot format combination, the first UE may generate a CLI measurement report and transmit the CLI measurement report to the base station.

Particular aspects of the subject matter described herein may be implemented to realize one or more potential advantages. The described techniques may be implemented to dynamically configure a CLI measurement resource at the first UE such that the first UE may more optimally measure CLI at the first UE, which may result in improved communications between the first UE and the base station. For example, based on more optimally measuring the CLI inflicted on the first UE by the second UE, the first UE may transmit a more accurate CLI measurement report to the base station and the base station may make more optimal scheduling decisions with regard to the first UE and the second UE based on receiving more accurate CLI measurement information from the first UE. The first UE may experience less CLI from the second UE based on the improved scheduling decisions, which may increase the likelihood of the first UE to successfully receive downlink signaling from the base station. Accordingly, the first UE and the base station may experience increased throughput, greater data rates, and higher spectral efficiency based on achieving the greater likelihood for successful communications.

Aspects of the disclosure are initially described in the context of wireless communications systems. Aspects of the disclosure are additionally described in the context of procedures for determining a CLI measurement resource, a slot format table configured for determining a CLI measurement resource, and a process flow. Aspects of the disclosure are further illustrated by and described with reference to apparatus diagrams, system diagrams, and flowcharts that relate to slot format downlink control information for cross link interference measurement resource configuration.

FIG. 1 illustrates an example of a wireless communications system 100 that supports slot format downlink control information for cross link interference measurement resource configuration in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. For example, the UEs 115 may communicate with the core network 130 through a communication link 155.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFTS-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, multiple nearby UEs 115 may communicate with a base station 105 (or different base stations 105) and may generate CLI that adversely impacts the ability of one or more of the multiple UEs 115 to successfully receive communication (either from a base station or another UE). Such CLI may result in cases in which a first UE 115 is receiving while a second UE 115 that is proximate to the first UE 115 is transmitting. For example, the first UE 115 and the second UE 115 may be allocated for different signaling (e.g., uplink signaling or downlink signaling) in different symbols within a slot such that, in some cases, one or more symbols of the slot may be allocated for or designated as downlink signaling to the first UE 115 and the same one or more symbols of the slot may be allocated for or as designated as uplink signaling from the second UE 115. Such variation in which symbols of the slot are allocated for uplink and downlink signaling may be because the first UE 115 and the second UE 115 are configured with different slot formats. In some cases, a base station 105 may configure different slot formats at the first UE 115 and the second UE 115 via DCI, such as SFI DCI.

To account for such CLI at the first UE 115, the base station 105 may configure an L3 measurement of CLI over a CLI measurement resource. In some cases, however, such a configuration of an L3 measurement of CLI may be associated with a semi-static CLI measurement resource or a CLI measurement resource that is otherwise unable to adapt to relatively frequent changes in slot format configurations. As such, an L3 CLI measurement may result in sub-optimal CLI measurement in cases in which the slot format of the first UE 115 or the second UE 115, or both, change more frequently than the configured CLI measurement resource.

In some implementations of the present disclosure, a communication manager 102 of a base station 105 may provide a dynamic configuration of a CLI measurement resource to the first UE 115. Such use of a dynamic configuration of the CLI measurement resource at the first UE 115 may help the CLI measurement resource to stay current with dynamically configured slot formats, which may enable the first UE 115 to more optimally measure CLI over time-domain resources in which CLI is likely to be present based on current or active slot formats of the first UE 115 and the second UE 115. For example, the communication manager 102 may determine time-domain resources that may be used for CLI measurement at the first UE 115 based on comparing a first slot format of the first UE 115 with a second slot format of the second UE 115. The communication manager 102 may transmit an SFI in DCI to the first UE 115, the SFI associated with a set of slot formats that are indicative of the time-domain resources to be used by the first UE 115 for CLI measurement at the first UE 115.

A communication manager 101 of the first UE 115 may receive the SFI in the DCI and determine the time-domain resources for CLI measurement at the first UE 115 based on the set of slot formats associated with the SFI. For example, the communication manager 101 may determine over which symbols of a slot to measure CLI based on each slot format of the set of slot formats and a configuration of the slot format. In some examples, for instance, the communication manager 101 may determine which of uplink symbols, downlink symbols, or flexible symbols, or any combination thereof, of a slot format are part of a CLI measurement resource based on the slot format configuration. In some other examples, the slot format configuration may configure each symbol of a slot format as one of two different symbol types and the communication manager 101 may determine over which symbols to measure CLI and over which symbols to refrain from measuring CLI based on the types of symbols of the slot format. Upon determining the CLI measurement resource based on the SFI in the DCI, the communication manager 101 may generate a CLI measurement report including CLI measurement information and transmit the CLI measurement report to the base station 105.

Figure 2A:
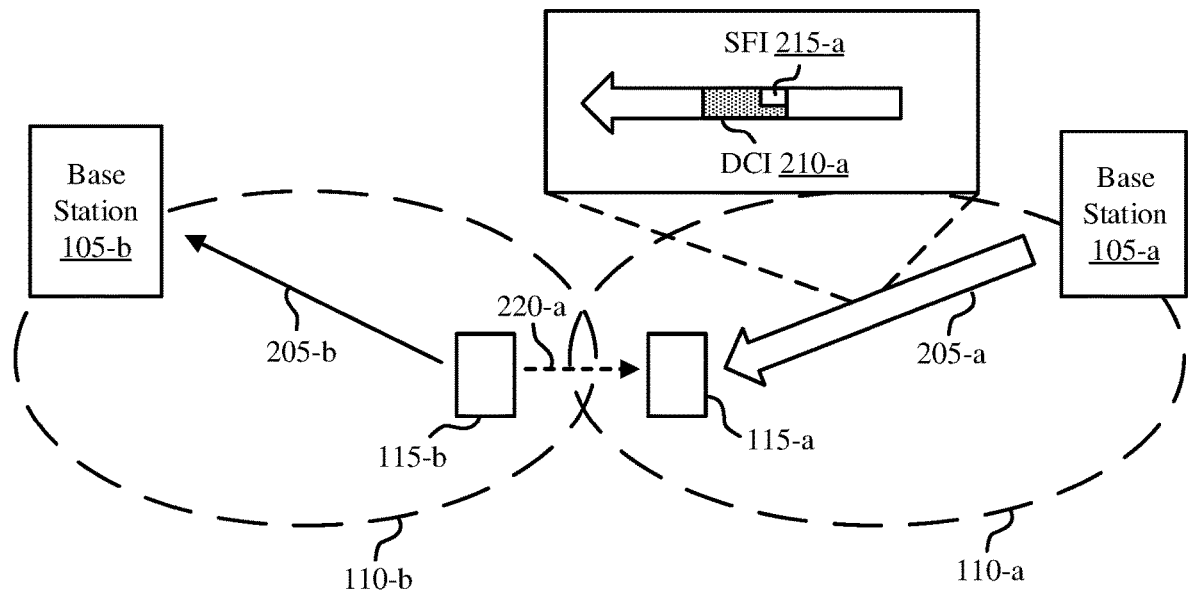
Figure 2B:
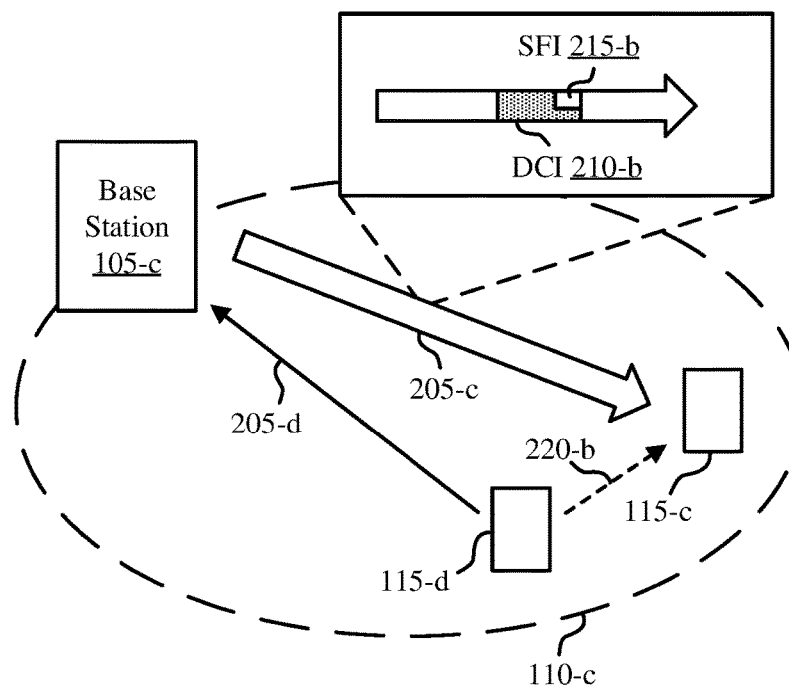

FIGS. 2A and 2B illustrate example wireless communications systems 200 and 201, respectively, that support slot format DCI for CLI measurement resource configuration in accordance with one or more aspects of the present disclosure. In some examples, the wireless communications systems 200 and 201 may implement aspects of the wireless communications system 100. The wireless communications systems 200 and 201 may each include multiple UEs 115 and one or more base stations 105, which may be examples of corresponding devices described herein. The wireless communications system 200, as shown in FIG. 2A, may illustrate implementations of the present disclosure in examples in which nearby UEs 115 communicate with different base stations 105. The wireless communications system 201, as shown in FIG. 2B, may illustrate implementations of the present disclosure in examples in which nearby UEs 115 may communicate with the same base station 105. In both FIG. 2A and FIG. 2B, a base station 105 may transmit an SFI 215 in DCI 210 to a UE 115 and the UE 115 may use the SFI 215 to determine time-domain resources over which the UE 115 may measure CLI.

For example, a first UE 115, such as a UE 115-*a* (as shown in the wireless communications system 200) or a UE 115-*c* (as shown in the wireless communications system 201), may experience CLI 220 from a second UE 115, such as a UE 115-*b* (which may be nearby or proximate to the UE 115-*a*) or a UE 115-*d* (which may be nearby or proximate to the UE 115-*c*), in cases in which the network (e.g., a base station 105) has configured different TDD uplink and downlink slot formats to the first UE 115 and the second UE 115. For instance, as shown in the wireless communications system 200, the UE 115-*a* may communicate with a base station 105-*a* over a communication link 205-*a* within a geographic area 110-*a* and the base station 105-*a* may configure a first slot format at the UE 115-*a*. Likewise, the UE 115-*b* may communicate with a base station 105-*b* over a communication link 205-*b* within a geographic area 110-*b* and the base station 105-*b* may configure a second slot format at the UE 115-*b*.

Similarly, as shown in the wireless communications system 201, the UE 115-*c* may communicate with a base station 105-*c* over a communication link 205-*c* within a geographic coverage area 110-*c* and the base station 105-*c* may configure a first slot format at the UE 115-*c*. Likewise, the UE 115-*d* may communicate with the base station 105-*c* over a communication link 205-*d* within the geographic coverage area 110-*c* and the base station 105-*c* may configure a second slot format at the UE 115-*d*. In some cases, the base station 105-*c* may have a full-duplex capability or functionality. In some aspects, the configured slot formats may include one or more uplink symbols, one or more downlink symbols, or one or more flexible symbols, or any combination thereof, such that the UEs 115 may communicate with their respective base stations 105 via either uplink signaling or downlink signaling according to their respectively configured slot formats.

In some cases, the first slot format may be different than the second slot format such that, when aligned in the time-domain, the location of uplink or downlink symbols in the first slot and the location of uplink or downlink symbols in the second slot format may be different (e.g., non-overlapping). For example, at a time-domain location, the first slot format configured at the UE 115-*a* or the UE 115-*c* may include one or more downlink symbols and the second slot format configured at the UE 115-*b* or the UE 115-*d* may include one or more uplink symbols. As such, at the time-domain location, the UE 115-*b* or the UE 115-*d* may transmit signaling to the base station 105-*b* or to the base station 105-*c*, respectively, and the UE 115-*a* or the UE 115-*c* may receive signaling from the base station 105-*a* or from the base station 105-*c*, respectively. In some cases, one or more transmissions by the UE 115-*b* while the UE 115-*a* is receiving may generate CLI 220-*a* at the UE 115-*a*, which may decrease the likelihood of the UE 115-*a* to successfully receive downlink signaling from the base station 105-*a*. Similarly, one or more transmissions by the UE 115-*d* while the UE 115-*c* is receiving may generate CLI 220-*b* at the UE 115-*b*, which may lower the likelihood of the UE 115-*b* to successfully receive signaling from the base station 105-*c*. In other words, CLI 220 may arise at the UE 115-*a* or the UE 115-*c* from one or more uplink transmissions from the UE 115-*b* or the UE 115-*d*, respectively, during a downlink-designated symbol at the UE 115-*a* or the UE 115-*c*. For example, the UE 115-*a* or the UE 115-*c* may experience interference from the UE 115-*b* or the UE 115-*d* as CLI 220-*a* or CLI 220-*b*, respectively. As such, the UE 115-*b* and the UE 115-*d* may be referred to as aggressor UEs 115 and the UE 115-*a* and the UE 115-*c* may be referred to as victim UEs.

To account for such CLI 220 at a first UE 115 (e.g., either or both of the UE 115-*a* and the UE 115-*c*), the base station 105 serving the first UE 115 may configure the first UE 115 to measure CLI 220 from an aggressing second UE 115 (e.g., either or both of the UE 115-*b* and the UE 115-*d*). As such, the second UE 115 may be unaware that the first UE 115 is measuring their uplink transmissions and may accordingly refrain from transmitting signaling (such as a reference signal) to the first UE 115 that is dedicated for CLI 220 measurement at the first UE 115. In some cases, the base station 105 serving the first UE 115 may configure measurement of CLI 220 at the first UE 115 as an L3 measurement, which may be similar to radio resource measurement (RRM) for mobility in a multi-cell scenario. For example, the base station 105-*a* may configure the UE 115-*a* with a CLI measurement resource (which may be configured as a periodic resource via RRC signaling) over which the UE 115-*b* may transmit a sounding reference signal (SRS) or other uplink transmissions such as physical uplink control channel (PUCCH), a physical uplink shared channel (PUSCH), and a random access channel (RACH) preamble to the base station 105-*b*. In such examples, the UE 115-*a* may measure a reference signal received power (RSRP) based on the SRS or the received signal strength indicator (RSSI) that corresponds to the uplink transmissions from the UE 115-*b* over the periodic CLI measurement resource. Although referred to as an interference, the base station 105-*a* may indicate the CLI measurement resource as an indication of an uplink transmission from the UE 115-*b* that may generate CLI 220-*a* at the UE 115-*a*. Whether the UE 115-*a* experiences CLI may be based on whether the UE 115-*a* receives downlink signaling from the base station 105-*a* in resources that overlap with the uplink transmission from the UE 115-*b*. The base station 105-*c* may configure a similar CLI measurement resource at the UE 115-*c*.

Such a configuration of a CLI measurement resource over which the UE 115-*a* or the UE 115-*c* may measure the CLI 220 may be suitable for estimating a long-term average of the CLI 220 from an uplink transmission of an aggressor UE 115. For example, based on using an L3 measurement of the CLI 220, the UE 115-*a* may determine a long-term view of the CLI 220-*a* condition at the UE 115-*a*. Similarly, the UE 115-*c* may determine a long-term view of the CLI 220-*b* condition at the UE 115-*c*. In some cases, however, such a configuration of a CLI measurement resource over which to measure a long-term average of the CLI 220 at the UE 115-*a* or the UE 115-*c* may be sub-optimal. For instance, in cases in which dynamic TDD configuration (e.g., dynamic slot format configuration) is enabled for the UEs 115, an L3 measurement resource of the CLI 220 at the UE 115-*a* and the UE 115-*c* may be unable to stay current with the actual symbols over which the UE 115-*b* or the UE 115-*d* may transmit uplink signaling and over which the UE 115-*a* or the UE 115-*c* may receive downlink signaling.

In some examples, the UE 115-*a* or the UE 115-*c* may use a Layer 1 (L1) measurement to measure the CLI 220 and may use L1 reporting of a CLI measurement report. In such examples of an L1 measurement of the CLI 220, an L1 CLI measurement resource may be configured as periodic (e.g., via RRC configuration), semi-persistently scheduled (e.g., via RRC configuration with DCI activation), or as aperiodic (e.g., triggered by a one-time DCI). In some cases, however, such periodic, semi-persistently scheduled, or aperiodic resource configuration may still result in sub-optimal measurement of the CLI 220 at the UE 115-*a* or the UE 115-*c* because the slot formats of the UEs 115 may be dynamically configured via DCI 210, such as an SFI DCI 210.

In some implementations of the present disclosure, a serving base station 105 may configure a measurement resource at the first UE 115 (e.g., either or both of the UE 115-*a* or the UE 115-*c*) via DCI 210 such that a key enabler of dynamic TDD configuration (e.g., the SFI DCI 210) may provide an indication of the CLI measurement resource in addition to or approximately as regularly as an indication of a slot format change. For example, the UEs 115 may be scheduled for uplink and downlink signaling via the SFI DCI 210 (which may configure or designate the flexible symbols of a slot format as either uplink symbols or downlink symbols) and a serving base station 105 may additionally provide the indication of the CLI measurement resource via DCI 210 to enable the indicated CLI measurement resource to stay current with the current or active slot formats configured by the SFI DCI 210. For instance, the base station 105-*a* may provide the indication of the CLI measurement resource in the DCI 210-*a* to the UE 115-*a* as an SFI 215-*a*. Similarly, the base station 105-*c* may provide the indication of the CLI measurement resource in the DCI 210-*b* to the UE 115-*c* as an SFI 215-*b*. The DCI 210 carrying the SFI 215 that the UE 115-*a* or the UE 115-*c* may use to determine a CLI measurement resource may be transmitted as various DCI formats without exceeding the scope of the present disclosure.

In some aspects, for example, the DCI 210 may be associated with an SFI DCI format (e.g., a DCI format 2_0). In some examples, such an SFI DCI format may be equivalently referred to herein as a slot format DCI. In some other aspects, the DCI 210 may be associated with a different DCI format than the format associated with an SFI DCI 210, such as a DCI format that is dedicatedly or exclusively defined for indicating or configuring CLI measurement resources. In such aspects in which the DCI 210 has a DCI format that is exclusively defined for indicating or configuring CLI measurement resources, the base station 105-*a* or the base station 105-*c* may scramble the DCI 210 based on a CRC technique (e.g., the DCI 210 may be CRC scrambled) using a unique radio network temporary identifier (RNTI). For example, the base station 105-*a* or the base station 105-*c* may CRC scramble the DCI 210 by a different RNTI than an RNTI used for other DCI formats that provide other configuration parameters outside of exclusively providing CLI measurement resources.

In some implementations, the UE 115-*a* or the UE 115-*c* may receive the SFI 215 in the DCI 210 from their respective serving base stations 105 and may determine time-domain resources over which the UE 115-*a* or the UE 115-*c* may measure the CLI 220. For example, the SFI 215 in the DCI 210 may be an example of a slot format combination index and the UE 115-*a* or the UE 115-*c* may each determine a slot format combination corresponding to the SFI 215 in their respective DCI 210. The slot format combination may indicate a slot format for a number of consecutive slots by referencing a slot format table, and the UE 115-*a* or the UE 115-*c* may determine the time-domain resources over which the UE 115-a or the UE 115-c may measure the CLI 220 in each slot of the number of consecutive slots based on the indicated slot format of a slot. Such a procedure for determining the time-domain resources over which the UE 115-a or the UE 115-c may measure the CLI 220 is described in more detail herein, including with reference to FIG. 3.

In some examples, the UE 115-a or the UE 115-c may receive an indication of a location of the SFI 215 in the DCI 210 corresponding to the CLI measurement resource from their respective serving base stations 105. For example, the base station 105-a (e.g., functioning on behalf of the network) may transmit a configuration or indication of the location of the SFI 215-a within the DCI 210-a that the UE 115-a may use to determine time-domain resources for measuring the CLI 220-a at the UE 115-a. In some aspects, the location may correspond to an index location, a field location, or a bit location in the DCI 210-a. The base station 105-c may similarly transmit a configuration or an indication of the location of the SFI 215-b within the DCI 210-b that the UE 115-c may use to determine time-domain resources for measuring the CLI 220-b at the UE 115-b.

In some implementations, the base station 105-a or the base station 105-c may provide additional configuration information about the resource to use for CLI 220 measurement to the UE 115-a or the UE 115-c, respectively. In some aspects, the additional configuration information about the CLI measurement resource may be provided to each of the UE 115-a and the UE 115-c separate from the DCI 210 including the SFI 215. For example, the base station 105-a or the base station 105-c may each provide the additional configuration information to the UE 115-a or the UE 115-c, respectively, via RRC signaling. In some implementations, the UE 115-a or the UE 115-c may receive, from their respective serving base stations 105, an indication of frequency-domain resources over which the UE 115-a or the UE 115-c may measure the CLI 220. For example, the UE 115-a or the UE 115-c may receive an indication of the resource blocks or the resource elements in the resource blocks, or both, over which the UE 115-a or the UE 115-c may measure the CLI 220. In such implementations, the UE 115-a or the UE 115-c may measure the CLI 220 over the time-domain resources indicated by the SFI 215 in the DCI 210 and over the frequency-domain resources indicated by the additional signaling (e.g., the RRC signaling).

Additionally or alternatively, the UE 115-a or the UE 115-c may receive, from their respective serving base stations 105, sequence generation information for the measurement of the CLI 220 at the UE 115-a or the UE 115-c, respectively. For example, the UE 115-b may transmit a reference signal (e.g., an SRS or an uplink demodulation reference signal (DMRS)) to the base station 105-b that causes CLI to the UE 115-a and the base station 105-a may provide the sequence generation information associated with the reference signal to enable the UE 115-a to demodulate and measure an RSRP of the reference signal transmitted by the UE 115-b. Similarly, the UE 115-d may transmit a reference signal (e.g., an SRS or an uplink DMRS) to the base station 105-c that causes CLI to the UE 115-c and the base station 105-c may provide the sequence generation information associated with the reference signal to enable the UE 115-c to demodulate and measure an RSRP of the reference signal transmitted by the UE 115-d.

Additionally or alternatively, the UE 115-a or the UE 115-c may receive, from their respective serving base stations 105, an indication of a periodic pattern of resource occasions associated with measurement of the CLI 220. The indication of the periodic pattern may include a periodicity or a slot or symbol offset (or a slot and symbol offset) in the period of the resource occasion in which the UE 115-a or the UE 115-c may measure the CLI 220. The UE 115-a or the UE 115-c may determine a set of symbols (which may be referred to herein as a second set of symbols) based on the periodic pattern and may compare the determined second set of symbols with the time-domain resources determined based on the SFI 215 in the DCI 210 to determine a first set of symbols over which the UE 115-a or the UE 115-c may measure the CLI 220.

For example, the UE 115-a or the UE 115-c may determine the first set of symbols over which to measure the CLI 220 based on comparing the overlap of the second set of symbols with the time-domain resources indicated by the SFI 215 in the DCI 210. In some implementations, the UE 115-a or the UE 115-c may determine the first set of symbols based on identifying symbols of the time-domain resources determined based on the SFI 215 that are fully included within (e.g., fully overlap with or fully contained by) the second set of symbols associated with the periodic pattern. In such implementations, the periodic pattern may represent a periodic resource occasion and each periodic resource occasion may correspond to consecutive OFDM symbols of an SRS transmission. In some other implementations, the UE 115-a or the UE 115-c may determine the first set of symbols based on identifying symbols of the time-domain resources determined based on the SFI 215 that are at least partially overlapping with the second set of symbols associated with the periodic pattern. In such implementations, the CLI measurement resource may be configured for CLI RSSI measurement.

The UE 115-a or the UE 115-c, based on determining the measurement resource over which the UE 115-a or the UE 115-c may measure the CLI 220 based on the SFI 215 within the DCI 210, may measure the CLI 220 and generate a CLI measurement report. The UE 115-a or the UE 115-c may transmit the CLI measurement report to the base station 105-a or the base station 105-c, respectively. Upon receiving the CLI measurement report from the UE 115-a or the UE 115-c, respectively, the base station 105-a or the base station 105-c may make scheduling decisions or provide additional configuration based on the reported CLI 220. For instance, in examples in which the UE 115-a measures a relatively high CLI 220-a from the UE 115-b, the base station 105-a and the base station 105-b may coordinate to configure slot formats or other transmission parameters at the UE 115-a and the UE 115-b to reduce the amount of CLI 220-a experienced by the UE 115-a. Similarly, in examples in which the UE 115-c measures a relatively high CLI 220-b from the UE 115-d, the base station 105-c may configure slot formats or other transmission parameters at the UE 115-c and the UE 115-d to reduce the amount of CLI 220-b experienced by the UE 115-c.

Figure 3:
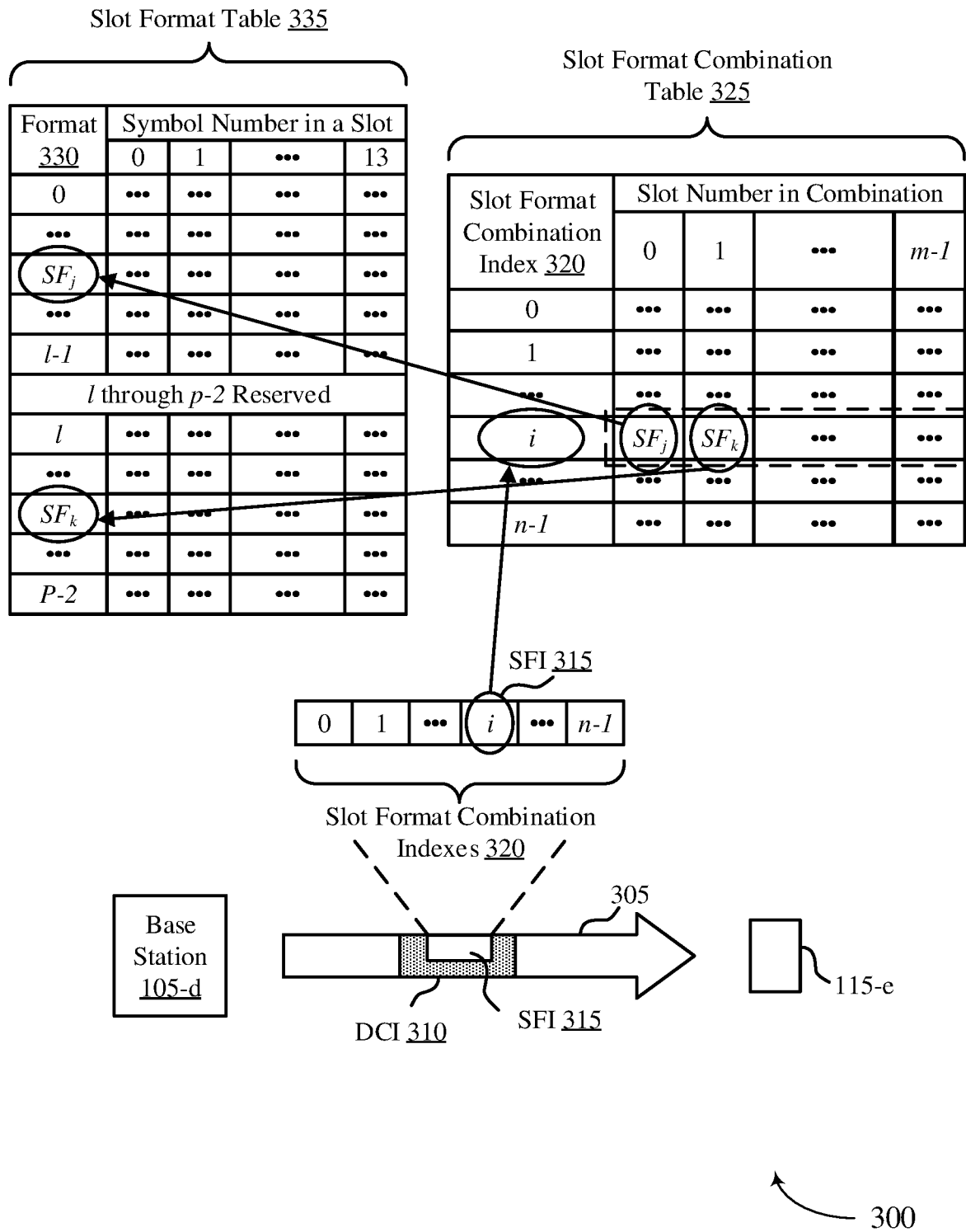
FIG. 3 illustrates an example of a resource selection procedure that supports slot format DCI for CLI measurement resource configuration in accordance with one or more aspects of the present disclosure.

FIG. 3 illustrates an example of a resource selection procedure 300 that supports slot format DCI for CLI measurement resource configuration in accordance with one or more aspects of the present disclosure. In some examples, the resource selection procedure 300 may be implemented to realize aspects of the wireless communications system 100 and the wireless communications systems 200 or 201. In some examples, a base station 105-d may transmit DCI 310 including an SFI 315 to a UE 115-e over a communication link 305 and the UE 115-e may use the SFI 315 to determine time-domain resources over which the UE 115-e may measure CLI at the UE 115-e.

In some implementations of the present disclosure, the UE 115-e may use the SFI 315 carried by the DCI 310 to determine a dynamically configured or indicated CLI measurement resource based on a slot format combination table 325 and a slot format table 335. For example, the UE 115-*e* may receive the DCI 310 from the base station 105-*d* and, in some aspects, identify the SFI 315 associated with the time-domain resources to be used by the UE 115-*e* for CLI measurement based on a configured (e.g., a previously configured) or indicated location or position in the DCI 310. As illustrated by FIG. 3, the SFI 315 associated with the UE 115-*e* may be an SFI i. In some aspects, the SFI i may be an example of a slot format combination index 320 (which may be also be referred to as an SFI combination 320) of a set of n slot format combination indexes 320 and, as such, the SFI i may be equivalently referred to as a slot format combination index i. In some examples, the base station 105-*d* may include the slot format combination index i in a DCI field of the DCI 310. In some aspects, the DCI field of the DCI 310 carrying the slot format combination index i may indicate (e.g., may exclusively indicate) slot format combination indexes to be used by the UE 115-*e* for determining time-domain resources over which the UE 115-*e* may measure CLI.

Further, although shown as being different than a slot format combination index 0, 1, or n−1, the slot format combination index i may be an example of any slot format combination index 320 within the set of n slot format combination indexes 320, including a slot format combination index 0, 1, or n−1. Further, although n may be any number, n may sometimes be defined as less than or equal to 512 (e.g., the base station 105-*d* may configure up to 512 slot format combination indexes 320). Additionally, a quantity of slot format combination indexes 320 carried by the DCI 310 may be any number and may not necessarily be equal to the quantity n of the set of possible slot format combination indexes 320.

The UE 115-*e* may use the determined slot format combination index i as an index into a slot format combination table 325 including the set of n slot format combination indexes 320. In some aspects, the base station 105-*d* may configure the slot format combination table 325 at the UE 115-*e* (e.g., via RRC signaling) and may configure the slot format combination table 325 to include up to n slot format combinations, each slot format combination corresponding to a slot format combination index 320. In some implementations, the slot format combination table 325 may be configured for uplink and downlink scheduling for the base station 105-*d* on which the UE 115-*e* receives the DCI 310 in addition to being configured for determining time-domain resources over which the UE 115-*e* may measure CLI. In other words, the slot format combination table 325 may include slot format combinations that may be used for both uplink and downlink scheduling by the base station 105-*d* and for determining time-domain resources over which the UE 115-*e* may measure CLI. In such implementations, the base station 105-*d* may configure the slot format combination table 325 at the UE 115-*e* based on a SlotFormatCombinationsPerCell parameter and a SlotFormatCombination parameter, which may be examples of RRC parameters.

The SlotFormatCombinationsPerCell parameter may include a servingCellId parameter defined by ServCellIndex, a subcarrierSpacing parameter defined by SubcarrierSpacing, a subcarrrierSpacing2 parameter defined by SubcarrierSpacing (optional), a slotFormatCombinations parameter defined by a sequence of size between 1 and maxNrofSlotFormatCombinationsPerSet (which may be equal to 512 in some cases), and a positionInDCI parameter (which may be an integer between 0 and maxSFI-DCI-PayloadSize−1). The SlotFormatCombination parameter may include a slotFormatCombinationId defined by SlotFormatCombinationId, which may be an integer between 0 and maxNrofSlotFormatCombinationsPerSet−1, and a slotFormats parameter defined as a sequence of a size between 1 and maxNrofSlotFormatsPerCombination (which may be equal to 256 in some cases).

In some other implementations, the slot format combination table 325 may be configured for uplink and downlink scheduling for a second base station 105 different than the base station 105-*d* on which the UE 115-*e* receives the DCI 310 in addition to being configured for determining time-domain resources over which the UE 115-*e* may measure CLI. In other words, the slot format combination table 325 may include slot format combinations that may be used for both uplink and downlink scheduling by the second base station 105 and for determining time-domain resources over which the UE 115-*e* may measure CLI. In such implementations, the base station 105-*d* may provide an indication in the DCI 310 that the UE 115-*e* may use to determine the slot format combination table 325 configured for the second base station 105. For example, the base station 105-*d* may include a cell identifier (ID) associated with the second base station 105 in the DCI 310 (e.g., in the CLI measurement resource configuration) and the UE 115-*e* may identify the slot format combination table 325 configured for the second base station 105 based on receiving the cell ID in the DCI 310. In some examples, the base station 105-*d* or the second base station 105 may configure the slot format combination table 325 at the UE 115-*e* based on the SlotFormatCombinationsPerCell parameter and the SlotFormatCombination parameter (e.g., via RRC configuration).

In some other implementations, the base station 105-*d* may configure the slot format combination table 325 at the UE 115-*e* including a set of slot format combinations that are dedicatedly or exclusively associated with the time-domain resources over which the UE 115-*e* may measure CLI. In other words, the set of slot format combinations included in the slot format combination table 325 may be exclusively used by the UE 115-*e* for determining time-domain resources over which the UE 115-*e* may measure CLI. In such implementations, the base station 105-*d* may configure the slot format combination based on the SlotFormatCombinationsPerCell parameter and the SlotFormatCombination parameter or based on different parameters that are exclusively defined for the slot format combination table 325 that is exclusively used for determining time-domain resources over which the UE 115-*e* may measure CLI. In some examples, the base station 105-*d* may configure the slot format combination table 325 that is dedicated to CLI measurement resources in examples in which the UE 115-*e* is connected to only the base station 105-*d* (e.g., and not connected to the second base station 105).

The slot format combination index i may correspond to a row i (e.g., an $i^{th}$ row) of the slot format combination table 325, where each row of the slot format combination table 325 may be referred to as a slot format combination. Each slot format combination may include an index into a slot format table 335 for each of a quantity of up to m consecutive slots and each slot format combination may have a different number of slots. For example, the slot format combination index i may correspond to a slot format combination that indicates a set of row indexes of the slot format table 335 associated with the set of up to m consecutive slots, each slot number in the slot format combination including an indication of a row index of the slot format table 335. Additionally, although m may be any number without exceeding the scope of the present disclosure, m may sometimes be defined as less than or equal to 256. The UE 115-e, based on determining the set of rows of the slot format table 335 that correspond to the set of slots in the slot format combination, may determine a set of slot formats 330 associated with the slot format combination index i.

For example, the UE 115-e may determine a slot format 330 for a first slot (e.g., a slot number 0) in the slot format combination corresponding to the slot format combination index i based on identifying a row index $SF_j$ of the slot format table 335. The row in the slot format table 335 corresponding to the row index $SF_j$ may be the slot format 330 configured for the first slot and may include an indication of which symbols of the first slot are allocated as uplink symbols, which symbols of the first slot are allocated as downlink symbols, and which symbols of the first slot are allocated as flexible symbols. For further example, the UE 115-e may determine a slot format 330 for a second slot (e.g., a slot number 1) in the slot format combination corresponding to the slot format combination index i based on identifying a row index $SF_k$ into the slot format table 335. The row in the slot format table 335 corresponding to the row index $SF_k$ may be the slot format 330 configured for the second slot and may include an indication of which symbols of the second slot are allocated as uplink symbols, which symbols of the second slot are allocated as downlink symbols, and which symbols of the second slot are allocated as flexible symbols. Which rows of the slot format table 335 that may be used by the base station 105-d to configure a slot format 330 for a slot in the slot format combination used by the UE 115-e to determine the time-domain resources over which the UE 115-e may measure CLI may vary depending on the implementation.

In some implementations, for example, the row indexes indicated by the slot format combination may correspond to rows within a first portion of the slot format table 335 that is associated with available (e.g., valid) slot formats for uplink and downlink scheduling. In some aspects, the first portion of the slot format table 335 that may be used for uplink and downlink scheduling may include row 0 through row l−1. Accordingly, in such implementations, the row indexes indicated by the slot format combination may correspond to rows of the slot format table 335 from row 0 (e.g., slot format 0) to row l−1 (e.g., slot format l−1). As such, the slot format combination may refrain from including a row index that may be outside of the first portion of the slot format table 335 (e.g., that may exceed row l−1), such as the row index $SF_k$. Additionally, although l may be any number without exceeding the scope of the present disclosure, l may sometimes be equal to 56.

In some other implementations, the row indexes indicated by the slot format combination may correspond to rows within a second portion of the slot format table 335 that are associated with reserved rows of the slot format table 335 that are unavailable for uplink and downlink scheduling. In some aspects, the second portion of the slot format table 335 that may be reserved or otherwise unavailable for uplink and downlink scheduling may include row l through row p−2. Accordingly, in such implementations, the row indexes indicated by the slot format combination may correspond to rows of the slot format table 335 from row l (e.g., slot format l) through row p−2 (e.g., slot format p−2). In some examples, the slot format combination may refrain from including a row index that is outside of the second portion of the slot format table 335 (e.g., outside the range between l and p−2). In such examples, the slot format combination may refrain from including the row index $SF_j$. Although p may be any number without exceeding the scope of the present disclosure, p may sometimes be equal to 256.

In some other examples, the slot format combination may include row indexes from both the first portion of the slot format table 335 and the second portion of the slot format table 335. For example, the slot format combination may indicate row indexes that correspond to slot formats 330 that are available for uplink and downlink scheduling and may indicate row indexes that correspond to reserved slot formats 330 that are unavailable for uplink and downlink scheduling. In such examples, the slot format combination may indicate both the row index $SF_j$ and the row index $SF_k$.

In implementations in which the slot format combination indicates one or more slot formats 330 from the first portion of the slot format table 335, the base station 105-d may transmit an indication to the UE 115-e of a slot format configuration indicating a first set of symbols of each slot in the slot format combination that the UE 115-e may use for CLI measurement. For example, each slot format 330 in the first portion of the slot format table 335 may include symbols allocated or otherwise designated as uplink symbols, downlink symbols, or flexible symbols, or any combination thereof, and the UE 115-e may determine which of the uplink symbols, downlink symbols, or flexible symbols to interpret as the first set of symbols over which the UE 115-e may measure CLI. Additionally or alternatively, in implementations in which the slot format combination indicates one or more slot formats 330 from the second portion of the slot format table 335, the UE 115-e may determine which symbols in each slot are the first set of symbols over which the UE 115-e may measure CLI based on differentiating between two different types of symbols, where a first type of symbols is associated with symbols over which the UE 115-e may measure CLI and a second type of symbols is associated with symbols over which the UE 115-e may refrain from measuring CLI. Additional details relating to how the UE 115-e may determine over which symbols to measure CLI in each slot based on the slot format 330 are described herein, including with reference to FIG. 4.

Figure 4:
FIG. 4 illustrates an example of a slot format table that supports slot format DCI for CLI measurement resource configuration in accordance with one or more aspects of the present disclosure.

FIG. 4 illustrates an example of a slot format table 400 that supports slot format DCI for CLI measurement resource configuration in accordance with one or more aspects of the present disclosure. In some examples, the slot format table 400 may be used by a UE 115 to implement aspects of the wireless communications system 100 and the wireless communications system 200 or 201. For example, the UE 115 may determine rows corresponding to slot formats 405 of the slot format table 400 based on a slot format combination of a slot format combination table and may use the determined rows to determine a set of slot formats indicative of time-domain resources over which the UE 115 may measure CLI.

In some cases, the slot format table 400 may be partitioned into a first portion and a second portion, where the first portion of the slot format table includes rows between row 0 (e.g., slot format 0) and row l−1 (e.g., slot format l−1) and the second portion of the slot format table includes rows between row l (e.g., slot format l) and row p−2 (e.g., slot format p−2). In some aspects, the first portion of the slot format table 400 may include slot formats 405 that are available for uplink and downlink scheduling. Accordingly, the slot formats 405 within the first portion of the slot format table 400 may include symbols allocated as uplink symbols (which are illustrated by a "U" in the slot format table 400), downlink symbols (which are illustrated by a "D" in the slot format table 400), or flexible symbols (which are illustrated by an "F" in the slot format table 400). The second portion of the slot format table 400 may include slot formats 405 that are reserved or otherwise unavailable for uplink and downlink scheduling. As such, the slot formats 405 within the second portion of the slot format table 400 may refrain from allocating symbols of a slot as uplink symbols, downlink symbols, or flexible symbols. In some cases, the slot format table 400 may also include a row p–1 that may indicate the UE 115 to determine a slot format 405 for a slot based on a semi-static TDD uplink and downlink configuration and based on any detected DCI formats. In some examples of the present disclosure, the UE 115 may use one or more of the slot formats 405 within the first portion of the slot format table 400 or the second portion of the slot format table 400, or both, to determine time-domain resources over which the UE 115 may measure CLI.

In some implementations, the UE 115 may determine to use one or more rows within a first portion of the slot format table 400. In such implementations, the UE 115 may receive an indication of a slot format configuration from a base station 105 indicating a rule for how the UE 115 may determine over which symbols to measure CLI based on using slot formats 405 that allocate or designate symbols as uplink symbols, downlink symbols, or flexible symbols. In some examples, the slot format configuration may indicate that uplink symbols within a slot format 405 are symbols over which the UE 115 may measure CLI at the UE 115. Accordingly, in such examples, the UE 115 may measure CLI over symbols within a slot that are allocated as uplink symbols in the corresponding slot format 405. In some other examples, the slot format configuration may indicate that downlink symbols within a slot format 405 are symbols over which the UE 115 may measure CLI at the UE 115. Accordingly, in such examples, the UE 115 may measure CLI over symbols within a lot that are allocated as downlink symbols in the corresponding slot format 405.

In some other examples, the slot format configuration may indicate that uplink symbols and flexible symbols within a slot format 405 are symbols over which the UE 115 may measure CLI at the UE 115. Accordingly, in such examples, the UE 115 may measure CLI over symbols within a slot that are allocated as either uplink symbols or flexible symbols in the corresponding slot format 405. In some other examples, the slot format configuration may indicate that downlink and flexible symbols within a slot format 405 are symbols over which the UE 115 may measure CLI at the UE 115. Accordingly, in such examples, the UE 115 may measure CLI over symbols within a slot that are allocated as either downlink symbols or flexible symbols in the corresponding slot format 405.

For instance, in some examples, the UE 115 may determine that a slot is associated with a slot format 1–1 and may determine to measure CLI at the UE 115 over the three symbols that are allocated as uplink symbols or, in some other examples, the UE 115 may determine to measure CLI at the UE 115 over the eight downlink symbols that are allocated as downlink symbols. In some other examples, the UE 115 may determine to measure CLI at the UE 115 over the six symbols that are allocated as either uplink symbols or flexible symbols. In some further examples, the UE 115 may determine to measure CLI at the UE 115 over the eleven symbols that are allocated as either downlink symbols or flexible symbols.

In some other implementations, the UE 115 may determine a to use one or more rows within the second portion of the slot format table 400 which may include one or more slot formats 405 that are reserved or otherwise unavailable for uplink or downlink scheduling. In some examples, such one or more slot formats 405 that may be reserved and unavailable for uplink or downlink scheduling may be configured (e.g., exclusively configured) to be used for determining time-domain resources over which the UE 115 may measure CLI at the UE 115. For example, the slot format table 400 may include a slot format l and a slot format l+1 that include two different types of symbols, namely "Y" symbols and "N" symbols. Such a slot format design may be configured at the UE 115 by the base station 105 (e.g., via a slot format configuration) or may be pre-configured or pre-defined, such as by a specification. In some aspects, "Y" symbols may correspond to a first type of symbols over which the UE 115 may measure CLI and "N" symbols may correspond to a second type of symbols over which the UE 115 may refrain from measuring CLI.

For instance, for a slot associated with the slot format l, the UE 115 may determine to measure CLI over the six symbols that are marked as "Y" symbols and may refrain from measuring CLI over the eight symbols that are marked as "N" symbols. Similarly, for a slot associated with the slot format l+1, the UE 115 may determine to measure CLI over the eight symbols that are marked as "Y" symbols and may refrain from measuring CLI over the six symbols that are marked as "N" symbols. Further, the pattern of "Y" symbols and "N" symbols shown in slot format l and slot format l+1 are for purposes of example and, as such, the UE 115 may use other patterns of two different types of symbols to determine time-domain resources for CLI measurement without exceeding the scope of the present disclosure. Further, the labels of "Y" and "N" are also for purposes of example and other labeling may be used to differentiate between the two different types of symbols without exceeding the scope of the present disclosure. For example, the first type of symbol may be equivalently indicated by a "1" and the second type of symbol may be equivalently indicated by a "0," or vice-versa, among other examples.

Figure 5:
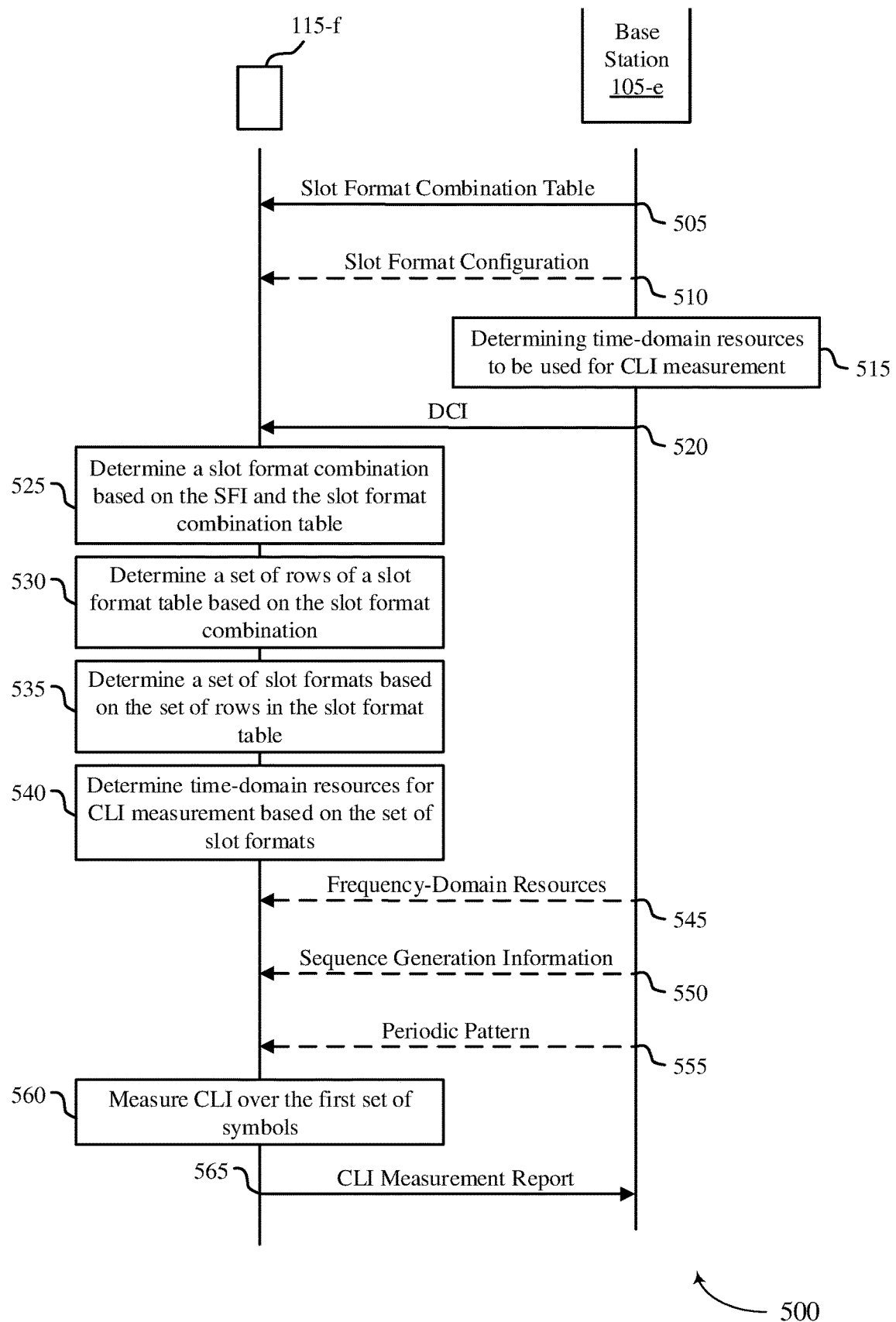
FIG. 5 illustrates an example of a process flow that supports slot format DCI for CLI measurement resource configuration in accordance with one or more aspects of the present disclosure.

FIG. 5 illustrates an example of a process flow 500 that supports slot format DCI for CLI measurement resource configuration in accordance with one or more aspects of the present disclosure. In some examples, the process flow 500 may implement aspects of the wireless communications system 100 and the wireless communications systems 200 or 201. The process flow 500 may illustrate communication between a base station 105-e and a UE 115-f, which may be examples of corresponding devices described herein. In some examples, the base station 105-e may transmit an SFI in a DCI to the UE 115-f and the UE 115-f may use the SFI to determine time-domain resources over which the UE 115-f may measure CLI. Alternative examples of the process flow may be implemented, in which some features are performed in a different order than described or are not performed at all. In some examples, operations may include additional features not mentioned below, or further operations may be added.

At 505, the UE 115-f may receive, from the base station 105-e, an indication of a slot format combination table. In some examples, the base station 105-e may transmit the indication of the slot format combination table to the UE 115-f via RRC signaling, such as via one or more RRC configuration parameters. In some implementations, the slot format combination table may be a slot format combination table configured for or associated with uplink and downlink scheduling with the base station 105-e. In some other implementations, the slot format combination table may be a slot format combination table configured for or associated with uplink and downlink scheduling with a second base station 105 different than the base station 105-e from which the UE 115-*e* may receive DCI. In some other implementations, the slot format combination table may be exclusively configured for or associated with the time-domain resources for the CLI measurement at the UE 115-*f*. In such implementations for example, the UE 115-*f* may use the slot format combination table exclusively for determining the time-domain resources over which the UE 115-*f* may measure CLI (and may refrain from using the slot format combination table for determining time-domain allocations for uplink and downlink scheduling). Additional details relating to the slot format combination table are described herein, including with reference to FIG. 3.

At 510, the UE 115-*f* may, in some implementations, receive an indication of a slot format configuration from the base station 105-*e* for the CLI measurement at the UE 115-*f*. In some examples, the slot format configuration may indicate a first set of symbols over which the UE 115-*f* may measure CLI. For example, the UE 115-*f* may use the slot format configuration to determine over which symbols in a slot to measure CLI based on a slot format corresponding to the slot (as indicated by the slot format combination table). In some implementations, the slot format configuration may indicate that symbols of a slot format that are allocated as uplink symbols are included in the first set of symbols over which the UE 115-*f* may measure CLI. In some other implementations, the slot format configuration may indicate that symbols of a slot format that are allocated as downlink symbols are included in the first set of symbols over which the UE 115-*f* may measure CLI. In some other implementations, the slot format configuration may indicate that symbols of a slot format that are allocated as either uplink symbols or flexible symbols are included in the first set of symbols over which the UE 115-*f* may measure CLI. In some other implementations, the slot format configuration may indicate that symbols of a slot format that are allocated as either downlink symbols or flexible symbols are included in the first set of symbols over which the UE 115-*f* may measure CLI. In some other examples, the slot format configuration may indicate that the slot format corresponding to the slot includes two different types of symbols, such as a first type of symbol over which the UE 115-*f* may measure CLI and a second type of symbol over which the UE 115-*f* may refrain from measuring CLI. Additional details relating to the slot format configuration and methods for determining over which symbols to measure CLI are described in more detail herein, including with reference to FIG. 4.

At 515, the base station 105-*e* may determine time-domain resources to be used for CLI measurement at the UE 115-*f* based on comparing a first slot format of the UE 115-*f* to a second slot format of a second UE 115. In some examples, the time-domain resources may include the first set of symbols.

At 520, the UE 115-*f* may receive, from the base station 105-*e*, DCI including an SFI associated with a set of slot formats. In some examples, the UE 115-*f* may also receive (e.g., separately in other signaling, such as via RRC signaling, or in the DCI) an indication of a location or a position of the SFI associated with the set of slot formats in the DCI. In implementations in which the UE 115-*f* may be configured to use a slot format combination table associated with the second base station 105, the DCI may include an identifier of the second base station 105 and the UE 115-*f* may determine to use the slot format combination table associated with the second base station 105 based on receiving the identifier of the second base station 105 in the DCI. In some examples, the DCI may be associated with an SFI DCI format (e.g., DCI format 2_0). In some other examples, the DCI may be associated with a DCI format that is exclusively used for conveying the time-domain resources for the CLI measurement at the UE 115-*f*. In some aspects, the SFI included in the DCI may be a slot format combination index that points to a slot format combination within a slot format combination table.

At 525, the UE 115-*f* may determine a slot format combination based on the SFI (e.g., a slot format combination index) and the configured (e.g., previously configured) slot format combination table. For example, the SFI may function as a row index of the slot format combination table, where each row of the slot format combination table is associated with a different slot format combination of a quantity of consecutive slots. Additional details relating to the slot format combination table are described herein, including with reference to FIG. 3.

At 530, the UE 115-*f* may determine a set of rows of a slot format table based on the determined slot format combination. For example, the slot format combination may include a row index of the slot format table for each slot of the quantity of consecutive slots within the slot format combination. As such, the UE 115-*f* may determine the set of rows of the slot format table based on identifying the row index of the slot format table associated with each slot of the quantity of consecutive slots within the slot format combination. In some examples, the set of rows of the slot format table may be within a first portion of the slot format table associated with uplink and downlink scheduling or may be within a second portion of the slot format table that is reserved or otherwise unavailable for uplink and downlink scheduling, or a combination of both. Additional details relating to the correspondence between the values of a slot format combination and rows of a slot format table are described herein, including with reference to and illustration by FIG. 3.

At 535, the UE 115-*f* may determine a set of slot formats based on the set of rows in the slot format table. For example, each row index of the slot format table may correspond to a different slot format. In some examples, the set of slot formats may include slot formats that are available for uplink and downlink scheduling or may include reserved slot formats that are unavailable for uplink and downlink scheduling, or a combination of both. Additional details relating to the different slot formats included within the slot format table that may be used by the UE 115-*f* to determine symbols over which the UE 115-*f* may measure CLI are described herein, including with reference to FIGS. 3 and 4.

At 540, the UE 115-*f* may determine the time-domain resources for CLI measurement at the UE 115-*f* based on the set of slot formats. In some implementations, the UE 115-*f* may determine the time-domain resources over which to measure CLI based on the determined set of slot formats and the received slot format configuration. For example, the UE 115-*f* may determine the time-domain resources to use for CLI measurement based on identifying which symbols of the set of slot formats are allocated as uplink symbols, downlink symbols, uplink symbols and flexible symbols, or downlink symbols and flexible symbols. Additionally or alternatively, the UE 115-*f* may determine the time-domain resources to use for CLI measurement based on identifying which symbols of the set of slot formats are associated with a first type of symbol and which symbols of the set of slot formats are associated with a second type of symbol. Additional details relating to determining over which symbols of a slot to measure CLI based on a corresponding slot format are described herein, including with reference to FIG. 4. In some implementations, the base station 105-*e* may supplement or provide additional configuration of the time-domain resources indicated by the SFI in the DCI via additional signaling (e.g., via RRC signaling).

At 545, for example, the base station 105-*e* may, in some implementations, transmit an indication of frequency-domain resources for the CLI measurement at the UE 115-*f*. In such implementations, the UE 115-*f* may determine one or more resource blocks or resource elements in the resource blocks where the UE 115-*f* may measure CLI. Accordingly, the UE 115-*f* may measure CLI over a resource including the time-domain resources indicated by the SFI in the DCI and over frequency resources separately indicated by the base station 105-*e*.

At 550, additionally or alternatively, the base station 105-*e* may, in some implementations, transmit sequence generation information for the CLI measurement at the UE 115-*f*. In such implementations, the UE 115-*f* may use such sequence generation information to receive and demodulate a reference signal transmitted from the second UE 115 over the CLI measurement resource. As such, the UE 115-*f* may measure the CLI at the UE 115-*f* based on measuring the RSRP of the reference signal.

At 555, additionally or alternatively, the base station 105-*e* may, in some implementations, transmit an indication of a periodic pattern within a resource occasion. In such implementations, the UE 115-*f* may determine a second set of symbols based on the periodic pattern within the resource occasion and may determine the first set of symbols over which the UE 115-*f* may measure CLI based on an overlap of the time-domain resources indicated by the SFI in the DCI and the second set of symbols associated with the periodic pattern. In some examples, for instance, the UE 115-*f* may determine the first set of symbols over which the UE 115-*f* may measure CLI based on determining which symbols of the time-domain resources indicated by the SFI in the DCI (e.g., the time-domain resources determined at 540) fully overlap with or are fully included in the second set of symbols associated with the periodic pattern. In some other examples, the UE 115-*f* may determine the first set of symbols over which the UE 115-*f* may measure CLI based on determining which symbols of the time-domain resources indicated by the SFI in the DCI at least partially overlap with or that are at least partially included in the second set of symbols associated with the periodic pattern.

At 560, the UE 115-*f* may measure CLI at the UE 115-*f* over the first set of symbols based on determining the time-domain resources for CLI measurement at the UE 115-*f* indicated by the SFI in the DCI. In some examples, the CLI may arise from one or more uplink transmissions (or sidelink transmissions) from the second UE 115 during a downlink-designate symbol for the UE 115-*f*. As such, the UE 115-*f* may measure the CLI at the UE 115-*f* that is due, at least in part, to the one or more transmissions from the second UE 115, which may be nearby or proximate to the UE 115-*f*.

At 565, the UE 115-*f* may determine a CLI measurement report based on the measured CLI at the UE 115-*f* over the first set of symbols and may transmit, to the base station 105-*e*, the CLI measurement report.

Figure 6:
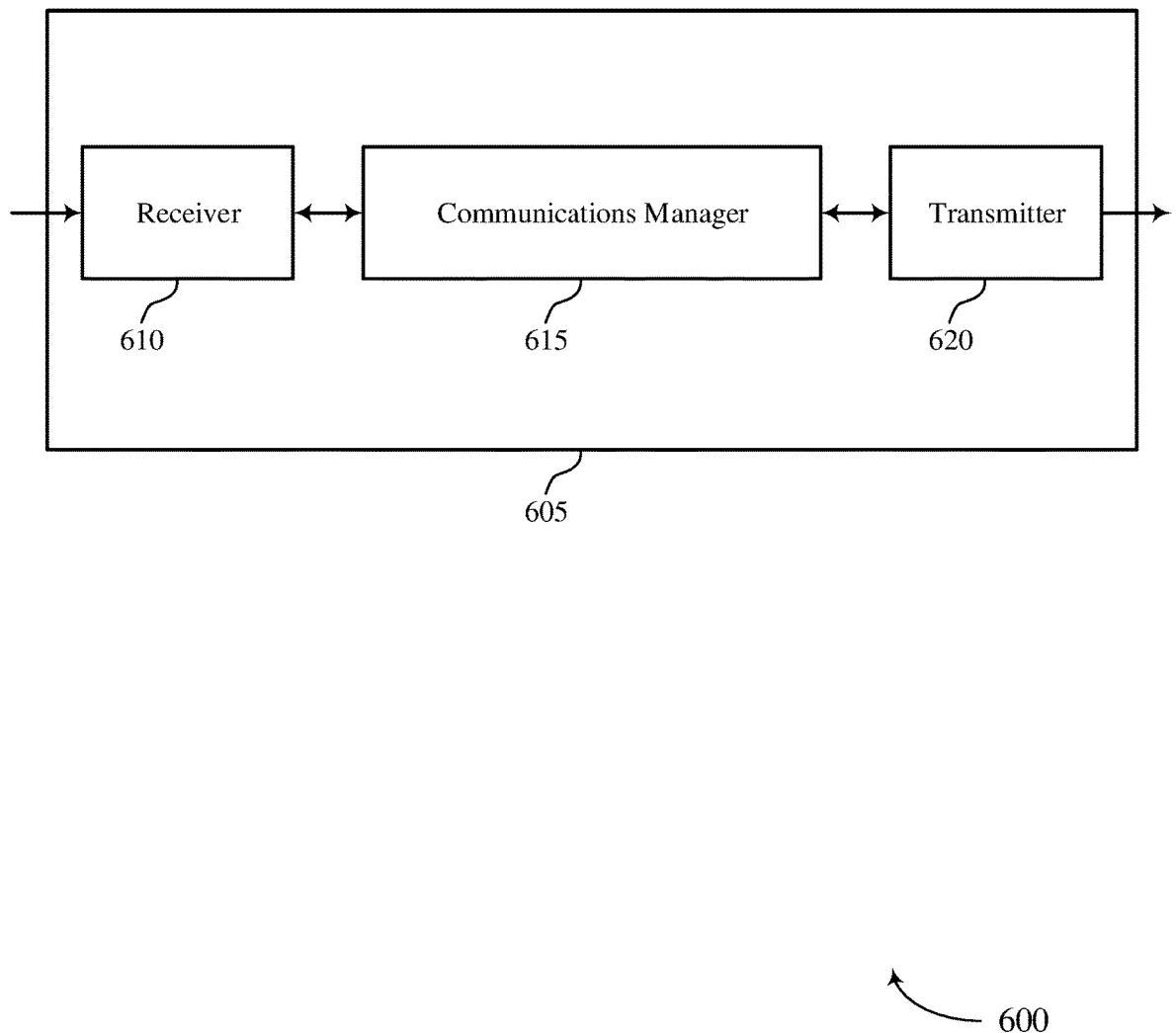
FIGS. 6 and 7 show block diagrams of devices that support slot format DCI for CLI measurement resource configuration in accordance with one or more aspects of the present disclosure.

FIG. 6 shows a block diagram 600 of a device 605 that supports slot format DCI for CLI measurement resource configuration in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to slot format DCI for CLI measurement resource configuration, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, DCI including an SFI associated with a set of slot formats, determine time-domain resources for CLI measurement at the UE based on the set of slot formats, the time-domain resources including a first set of symbols for the CLI measurement at the first UE, and measure CLI at the first UE over the first set of symbols based on the determination. The communications manager 615 may be an example of aspects of the communications manager 910 described herein.

The communications manager 615 may be an example of means for performing various aspects of receiving a dynamic configuration of time-domain resources over which to measure CLI as described herein. The communications manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its subcomponents, may be implemented in code (e.g., as communications management software or firmware) executed by a processor, or any combination thereof. If implemented in code executed by a processor, the functions of the communications manager 615, or its subcomponents may be executed by a general-purpose processor, a DSP, an ASIC, an FPGA, or other programmable logic device.

In some examples, the communication manager 615 may be configured to perform various operations (e.g., receiving, determining, measuring) using or otherwise in cooperation with the receiver 610, the transmitter 620, or both.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas. In some examples, the device 605 may use a first antenna coupled to the receiver 610 configured to obtain the one or more uplink transmissions from the second UE and a second antenna coupled to the transmitter 620 configured to output the CLI measurement report to the base station. In some aspects, the first antenna and the second antenna may be examples of the same antenna or antenna array. In some other aspects, the first antenna and the second antenna may be examples of different antennas or antenna arrays.

In some examples, the communications manager 615 may be implemented as an integrated circuit or chipset for a mobile device modem, and the receiver 610 and the transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. In some implementations, the communications manager 615 may determine time-domain resources of a CLI measurement resource based on receiving an SFI in DCI from a base station. As such, the communications manager 615 may determine a CLI measurement resource based on a dynamic configuration from the base station, which may enable the communications manager 615 to measure CLI over a CLI measurement resource that is current or up-to-date with the current slot formats used by the device 605 and any potentially-interfering peer devices (e.g., other UEs). Accordingly, the communications manager 615 may more optimally measure the CLI at the device 605 (e.g., at the antennas of the receiver 610 of the device 605) and may thus provide a more accurate CLI measurement report to a base station, which may result in scheduling decisions or communication configurations (such as a transmit power, beam weights, or any other communication parameter configurable by a base station that may reduce CLI) that reduce or mitigate CLI at the antennas of the receiver 610 of the device 605.

Based on such scheduling decisions or communication configurations that reduce or mitigate the CLI at the antennas of the receiver 610, the communications manager 615 may have a greater likelihood of successfully receiving downlink communication from the base station, which may result in fewer re-transmissions of downlink signal from the base station to the device 605. Further, based on potentially monitoring for, receiving, and decoding fewer re-transmissions of downlink signaling, the communications manager 615, or one or more processing components of the communications manager 615, may enter a sleep mode more frequency or for longer durations, or both, which may improve the power savings at the device 605 and likewise increase the battery life of the device 605.

Figure 7:
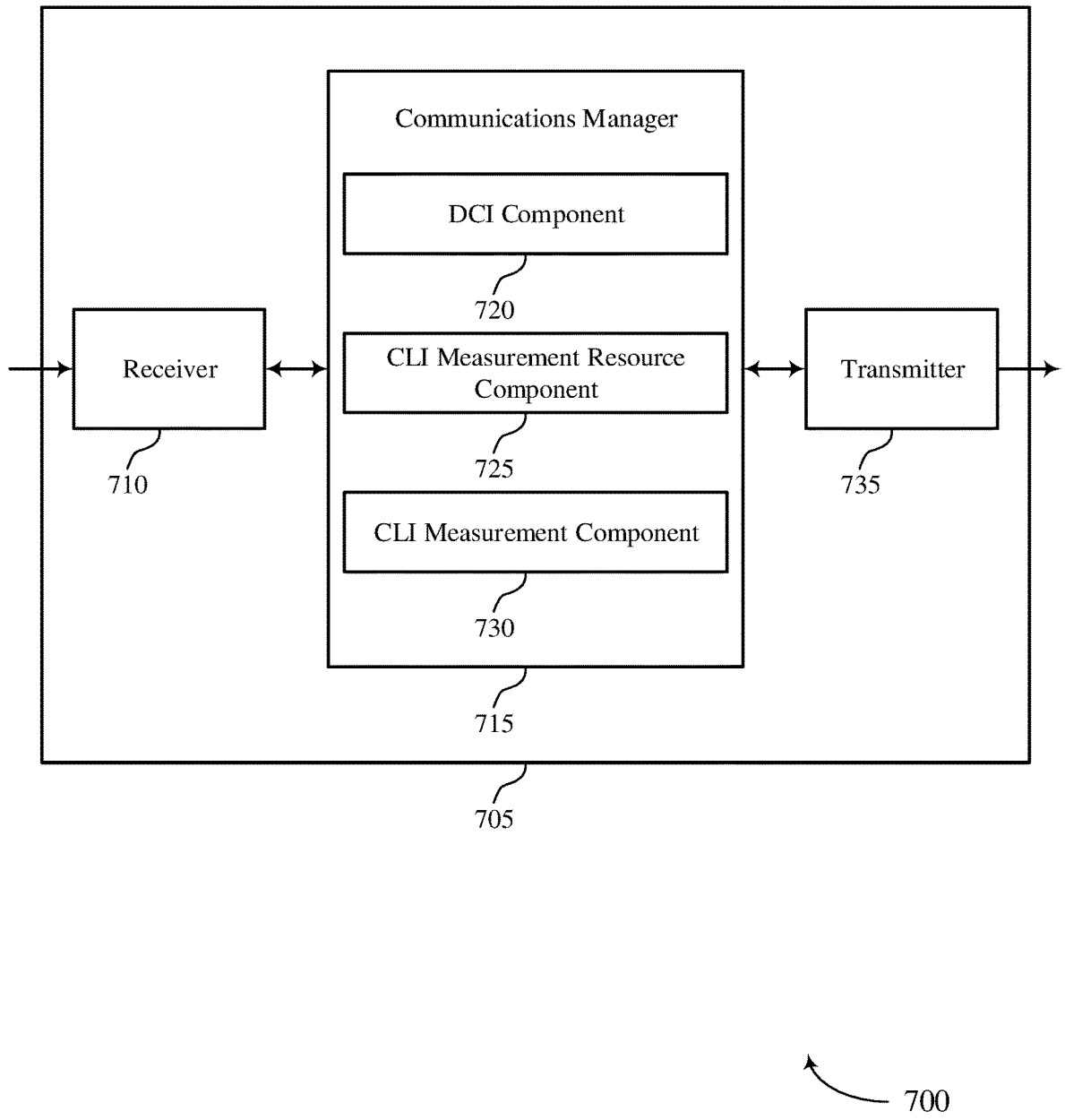

FIG. 7 shows a block diagram 700 of a device 705 that supports slot format DCI for CLI measurement resource configuration in accordance with one or more aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to slot format DCI for CLI measurement resource configuration, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a DCI component 720, a CLI measurement resource component 725, and a CLI measurement component 730. The communications manager 715 may be an example of aspects of the communications manager 910 described herein.

The DCI component 720 may receive, from a base station, DCI including an SFI associated with a set of slot formats. The CLI measurement resource component 725 may determine time-domain resources for CLI measurement at the UE based on the set of slot formats, the time-domain resources including a first set of symbols for the CLI measurement at the first UE. The CLI measurement component 730 may measure CLI at the first UE over the first set of symbols based on the determination.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
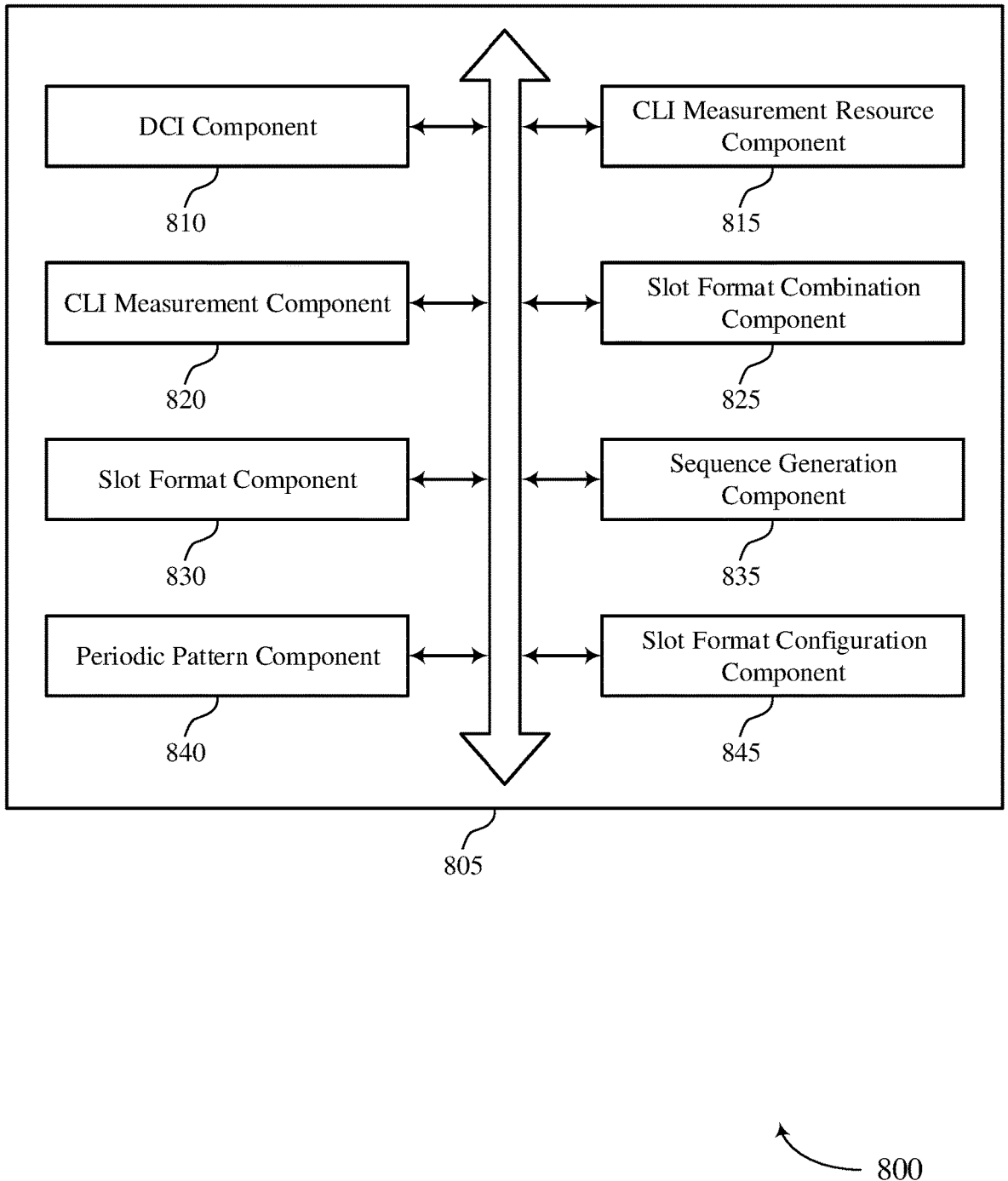
FIG. 8 shows a block diagram of a communications manager that supports slot format DCI for CLI measurement resource configuration in accordance with one or more aspects of the present disclosure.

FIG. 8 shows a block diagram 800 of a communications manager 805 that supports slot format DCI for CLI measurement resource configuration in accordance with one or more aspects of the present disclosure. The communications manager 805 may be an example of aspects of a communications manager 615, a communications manager 715, or a communications manager 910 described herein. The communications manager 805 may include a DCI component 810, a CLI measurement resource component 815, a CLI measurement component 820, a slot format combination component 825, a slot format component 830, a sequence generation component 835, a periodic pattern component 840, and a slot format configuration component 845. Each of these modules may communicate, directly or indirectly, with one another (e.g., via one or more buses).

The DCI component 810 may receive, from a base station, DCI including an SFI associated with a set of slot formats. In some examples, the DCI component 810 may receive an identifier of the second base station in the DCI. In some examples, the DCI component 810 may receive, from the base station, an indication of a location of the SFI within the DCI.

In some cases, the DCI is associated with an SFI DCI format. In some cases, the DCI is associated with a DCI format that is exclusively used for conveying the time-domain resources for the CLI measurement at the first UE. In some cases, the SFI includes a slot format combination index.

The CLI measurement resource component 815 may determine time-domain resources for CLI measurement at the UE based on the set of slot formats, the time-domain resources including a first set of symbols for the CLI measurement at the first UE. In some examples, the CLI measurement resource component 815 may receive, from the base station, an indication of frequency-domain resources for the CLI measurement at the first UE.

In some examples, the CLI measurement resource component 815 may determine the first set of symbols based on the time-domain resources and the second set of symbols. In some cases, the first set of symbols are fully included within the second set of symbols. In some cases, the first set of symbols at least partially overlap with the second set of symbols.

The CLI measurement component 820 may measure CLI at the first UE over the first set of symbols based on the determination. In some examples, the CLI measurement component 820 may receive, from the second UE, a reference signal transmitted by the second UE over the first set of symbols, the reference signal associated with the sequence generation information, and the measuring of the cross link interference at the first UE based at least in part on the receiving of the reference signal over the first set of symbols from the second UE.

In some examples, the CLI measurement component 820 may determine a CLI measurement report based on measuring the CLI at the first UE over the first set of symbols. In some examples, the CLI measurement component 820 may transmit, to the base station, the CLI measurement report.

The slot format combination component 825 may receive, from the base station, an indication of a slot format combination table. In some examples, the slot format combination component 825 may determine a slot format combination based on the SFI and the slot format combination table, the slot format combination indicating the set of slot formats.

In some examples, the slot format combination component 825 may determine to use the slot format combination table associated with the second base station based on receiving the identifier of the second base station received in the DCI. In some cases, the slot format combination table is associated with the base station from which the DCI is received. In some cases, the slot format combination table is exclusively associated with the time-domain resources for the CLI measurement at the first UE.

The slot format component 830 may determine a set of rows of a slot format table based on the slot format combination. In some examples, the slot format component 830 may determine the set of slot formats based on the set of rows in the slot format table, each row of the set of rows in the slot format table indicating a slot format of the set of slot formats.

In some cases, the set of rows includes rows within a portion of the slot format table associated with available slot formats for uplink and downlink scheduling. In some cases, the set of rows includes rows within a portion of the slot format table associated with reserved slot formats that are unavailable for uplink and downlink scheduling. In some cases, the set of rows includes a first subset of rows within a first portion of the slot format table associated with available slot formats for uplink and downlink scheduling and a second subset of rows within a second portion of the slot format table associated with reserved slot formats that are unavailable for uplink and downlink scheduling.

The sequence generation component 835 may receive, from the base station, sequence generation information for the CLI measurement at the first UE.

The periodic pattern component 840 may receive, from the base station, an indication of a periodic pattern within a resource occasion. In some examples, the periodic pattern component 840 may determine a second set of symbols based on the periodic pattern within the resource occasion.

The slot format configuration component 845 may receive, from the base station, an indication of a slot format configuration for the CLI measurement at the first UE, the slot format configuration indicating the first set of symbols. In some examples, the slot format configuration component 845 may determine that the first set of symbols include the one or more uplink symbols of each slot format of the set of slot formats based on the slot format configuration.

In some examples, the slot format configuration component 845 may determine that the first set of symbols include the one or more downlink symbols of each slot format of the set of slot formats based on the slot format configuration. In some examples, the slot format configuration component 845 may determine that the first set of symbols include the one or more uplink symbols and the one or more flexible symbols of each slot format of the set of slot formats based on the slot format configuration.

In some examples, the slot format configuration component 845 may determine that the first set of symbols include the one or more downlink symbols and the one or more flexible symbols of each slot format of the set of slot formats based on the slot format configuration. In some examples, the slot format configuration component 845 may determine that each slot format of the set of slot formats includes a quantity of symbols including a first type of symbols and a second type of symbols, the first set of symbols including the first type of symbols. In some cases, the first type of symbols is associated with first symbols over which the first UE measures the CLI at the first UE and the second type of symbols is associated with second symbols over which the first UE refrains from measuring the CLI at the first UE.

Figure 9:
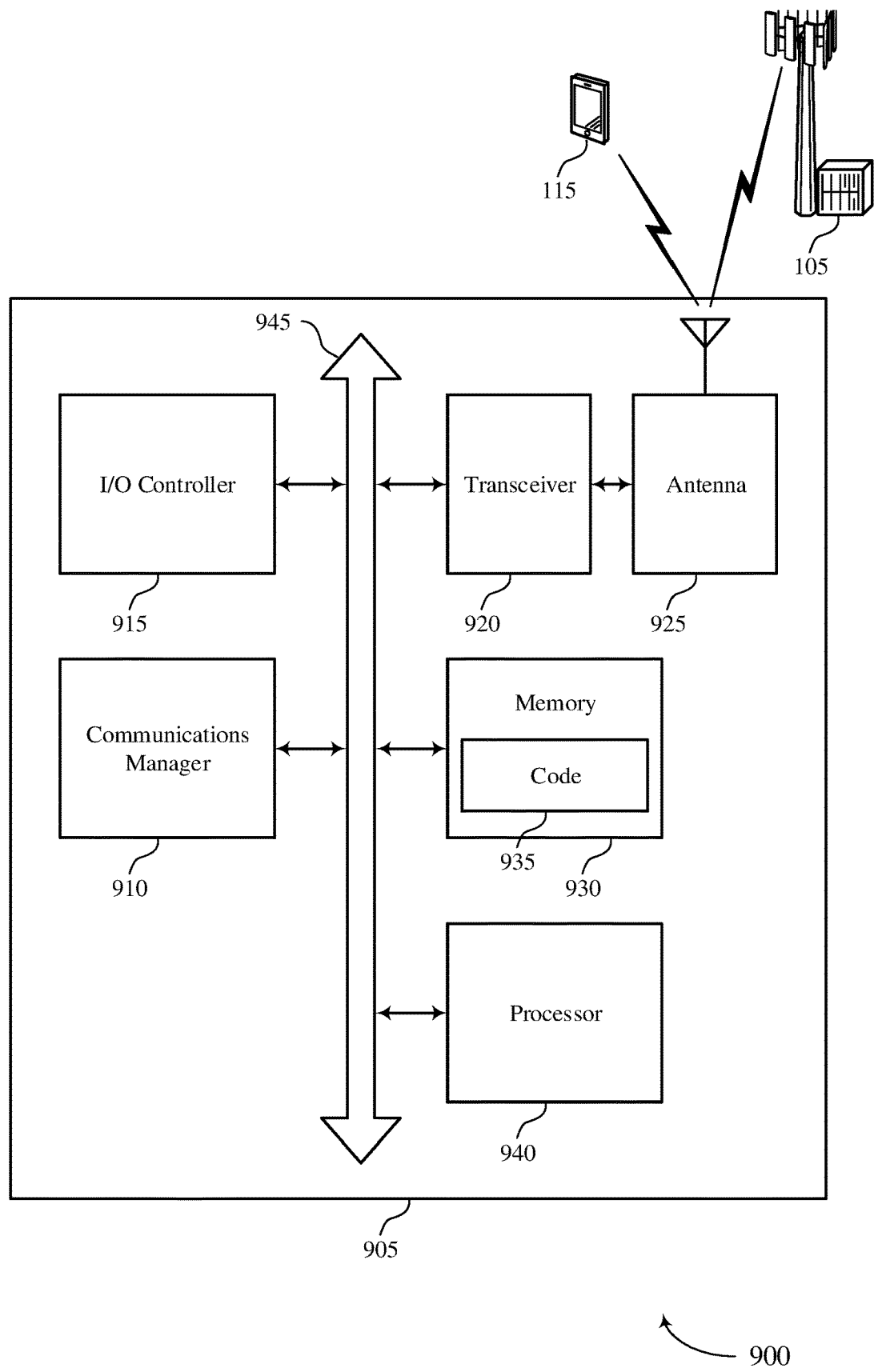
FIG. 9 shows a diagram of a system including a device that supports slot format DCI for CLI measurement resource configuration in accordance with one or more aspects of the present disclosure.

FIG. 9 shows a diagram of a system 900 including a device 905 that supports slot format DCI for CLI measurement resource configuration in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, DCI including an SFI associated with a set of slot formats, determine time-domain resources for CLI measurement at the UE based on the set of slot formats, the time-domain resources including a first set of symbols for the CLI measurement at the first UE, and measure CLI at the first UE over the first set of symbols based on the determination.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting slot format DCI for CLI measurement resource configuration).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
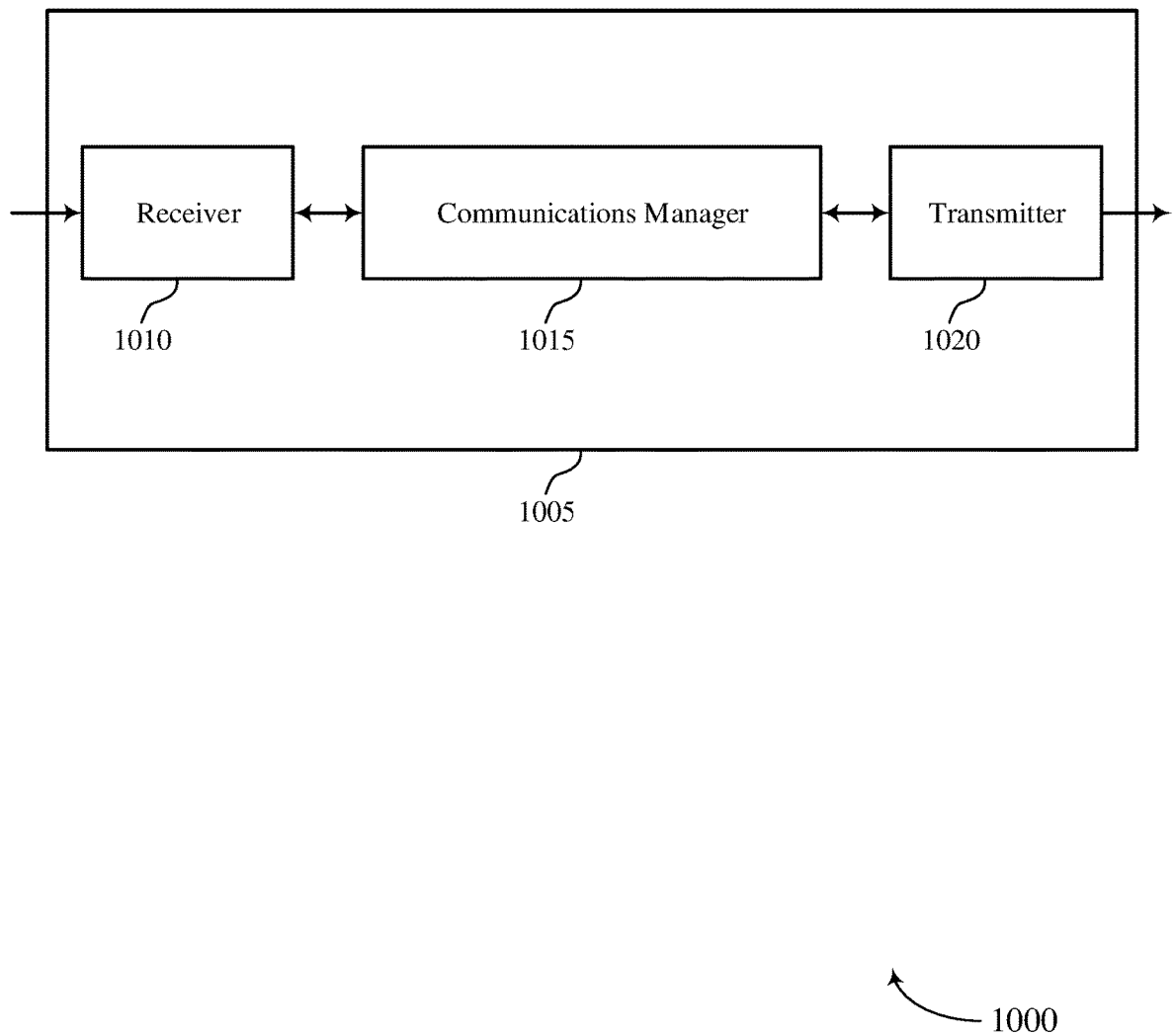
FIGS. 10 and 11 show block diagrams of devices that support slot format DCI for CLI measurement resource configuration in accordance with one or more aspects of the present disclosure.

FIG. 10 shows a block diagram 1000 of a device 1005 that supports slot format DCI for CLI measurement resource configuration in accordance with one or more aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to slot format DCI for CLI measurement resource configuration, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine time-domain resources to be used for CLI measurement at a first UE based on a first slot format of the first UE and a second slot format of a second UE, the time-domain resources including a first set of symbols for the CLI measurement at the first UE, where, transmit, to the first UE, DCI including an SFI associated with a set of slot formats indicative of the time-domain resources to be used for the CLI measurement at the first UE, and receive, from the first UE, a CLI measurement report including a measured CLI at the first UE over the first set of symbols. The communications manager 1015 may be an example of aspects of the communications manager 1310 described herein.

The communications manager 1015 may be an example of means for performing various aspects of providing a dynamic configuration of time-domain resources over which a UE may measure CLI as described herein. The communications manager 1015, or its subcomponents, may be implemented in hardware (e.g., in communications management circuitry). The circuitry may comprise of processor, a DSP, an ASIC, an FPGA or other programmable logic device, discrete gate or transistor logic, discrete hardware components, or any combination thereof designed to perform the functions described in the present disclosure.

In another implementation, the communications manager 1015, or its subcomponents, may be implemented in code (e.g., as communications management software or firmware) executed by a processor, or any combination thereof. If implemented in code executed by a processor, the functions of the communications manager 1015, or its subcomponents may be executed by a general-purpose processor, a DSP, an ASIC, an FPGA, or other programmable logic device.

In some examples, the communication manager 1015 may be configured to perform various operations (e.g., determining, transmitting, receiving) using or otherwise in cooperation with the receiver 1010, the transmitter 1020, or both.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas. In some examples, the device 1005 may include a first antenna coupled to the transmitter 1020 configured to output the DCI including the SFI to the first UE and a second antenna coupled to the receiver 1010 configured to obtain the CLI measurement report from the first UE. In some aspects, the first antenna and the second antenna may be examples of the same antenna or antenna array. In some other aspects, the first antenna and the second antenna may be examples of different antennas or antenna arrays.

In some implementations, the communications manager 1015 may be implemented to realize one or more potential advantages. In one implementation, the communications manager 1015 may transmit an SFI in DCI to a UE that is to be used for determining time-domain resources over which the UE may measure CLI at the UE. As such, the communications manager 1015 may provide a dynamic configuration of a CLI measurement resource at the UE, which may enable the configured CLI measurement resource to stay current or up-to-date with that slot formats used by the UE and other, potentially interfering UEs. Accordingly, the UE may provide a more accurate CLI measurement report to the communications manager 1015, which may enable the communications manager 1015 to make scheduling decisions or provide communication configurations that reduce or mitigate the CLI experienced at the UE.

Based on reducing or mitigating the CLI at the UE, the UE may have a greater likelihood of successfully receiving downlink communications from the communications manager 1015, which may result in fewer re-transmissions of downlink signaling to the UE. Accordingly, the communications manager 1015 may schedule other communication over the resources that may have otherwise have been used for downlink signaling re-transmissions to the UE, which may result in greater system throughput and higher data rates.

Figure 11:
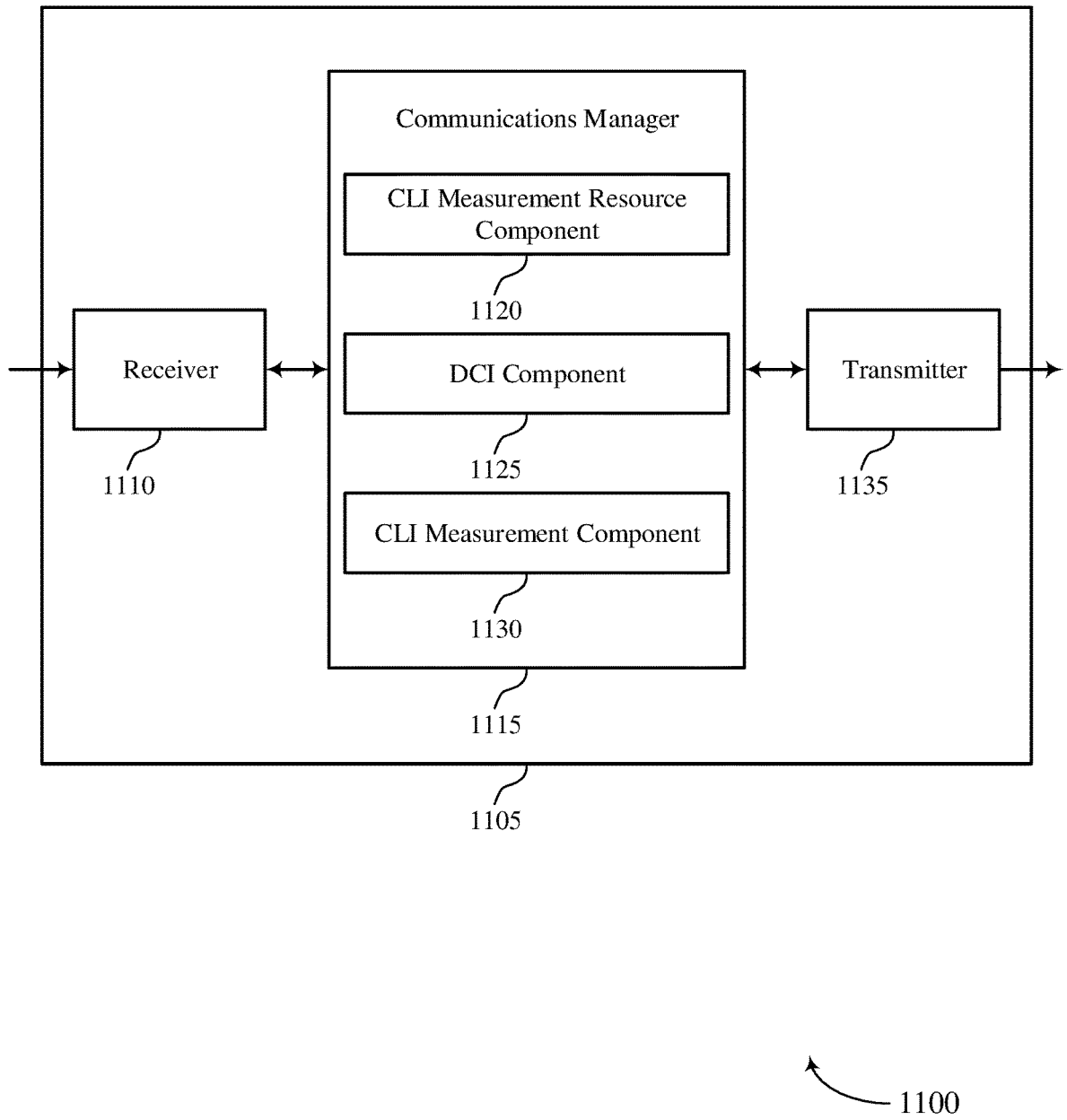

FIG. 11 shows a block diagram 1100 of a device 1105 that supports slot format DCI for CLI measurement resource configuration in accordance with one or more aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to slot format DCI for CLI measurement resource configuration, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CLI measurement resource component 1120, a DCI component 1125, and a CLI measurement component 1130. The communications manager 1115 may be an example of aspects of the communications manager 1310 described herein.

The CLI measurement resource component 1120 may determine time-domain resources to be used for CLI measurement at a first UE based on a first slot format of the first UE and a second slot format of a second UE, the time-domain resources including a first set of symbols for the CLI measurement at the first UE, where.

The DCI component 1125 may transmit, to the first UE, DCI including an SFI associated with a set of slot formats indicative of the time-domain resources to be used for the CLI measurement at the first UE. The CLI measurement component 1130 may receive, from the first UE, a CLI measurement report including a measured CLI at the first UE over the first set of symbols.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
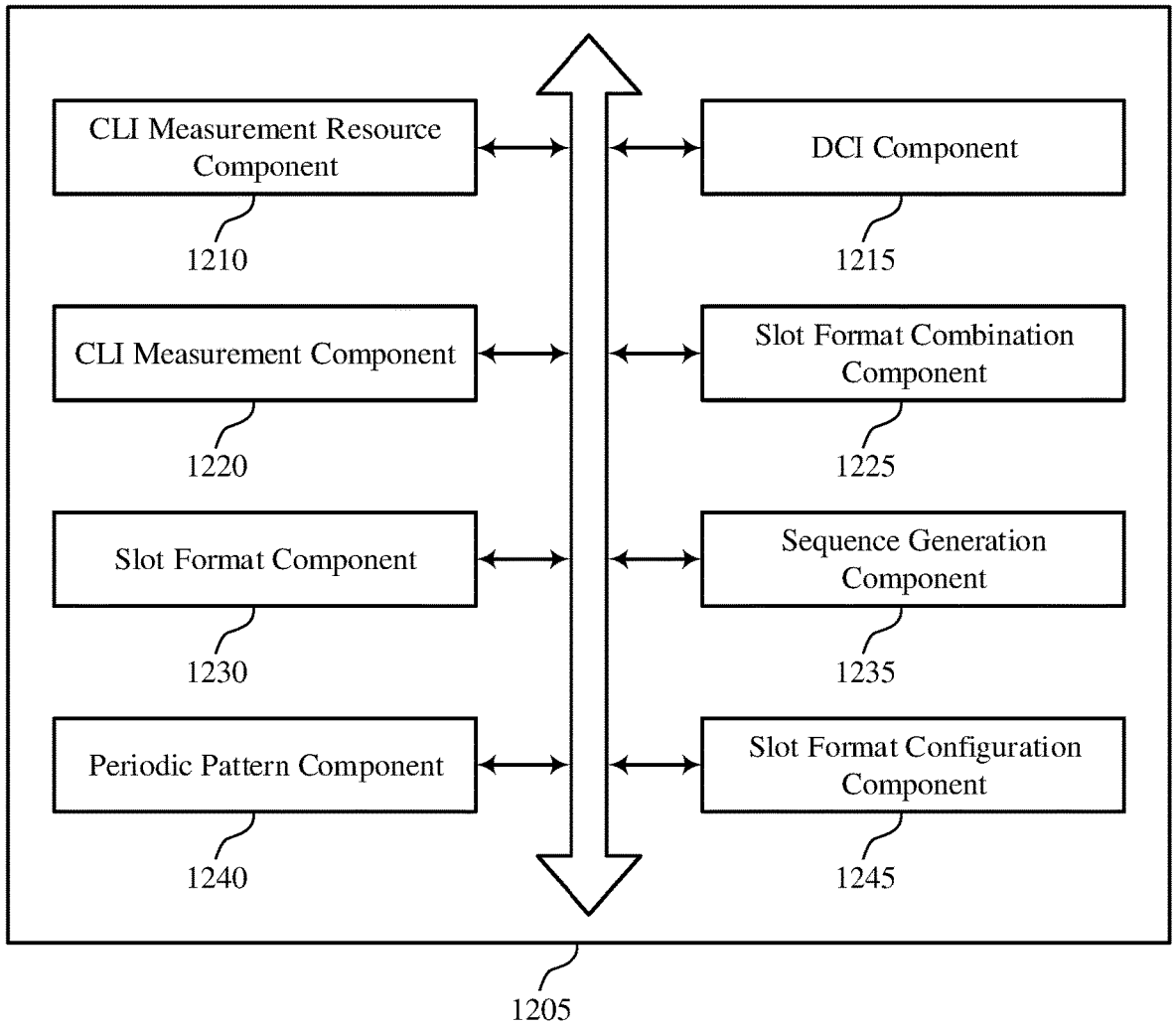
FIG. 12 shows a block diagram of a communications manager that supports slot format DCI for CLI measurement resource configuration in accordance with one or more aspects of the present disclosure.

FIG. 12 shows a block diagram 1200 of a communications manager 1205 that supports slot format DCI for CLI measurement resource configuration in accordance with one or more aspects of the present disclosure. The communications manager 1205 may be an example of aspects of a communications manager 1015, a communications manager 1115, or a communications manager 1310 described herein. The communications manager 1205 may include a CLI measurement resource component 1210, a DCI component 1215, a CLI measurement component 1220, a slot format combination component 1225, a slot format component 1230, a sequence generation component 1235, a periodic pattern component 1240, and a slot format configuration component 1245. Each of these modules may communicate, directly or indirectly, with one another (e.g., via one or more buses).

The CLI measurement resource component 1210 may determine time-domain resources to be used for CLI measurement at a first UE based on a first slot format of the first UE and a second slot format of a second UE, the time-domain resources including a first set of symbols for the CLI measurement at the first UE. In some examples, the CLI measurement resource component 1210 may transmit, to the UE, an indication of frequency-domain resources for the CLI measurement at the first UE. In some examples, the CLI measurement resource component 1210 may determine the time-domain resources including an overlap of downlink symbols in the first slot format of the first UE and uplink symbols in the second slot format of the second UE.

The DCI component 1215 may transmit, to the first UE, DCI including an SFI associated with a set of slot formats indicative of the time-domain resources to be used for the CLI measurement at the first UE. In some examples, the DCI component 1215 may transmit, to the first UE, an indication of a location of the SFI within the DCI.

In some cases, the DCI is associated with an SFI DCI format. In some cases, the DCI is associated with a DCI format that is exclusively used for conveying the time-domain resources for the CLI measurement at the first UE. In some cases, the SFI includes a slot format combination index.

The CLI measurement component 1220 may receive, from the first UE, a CLI measurement report including a measured CLI at the first UE over the first set of symbols.

The slot format combination component 1225 may transmit, to the first UE, an indication of a slot format combination table to be used to determine a slot format combination based on the SFI, the slot format combination indicating the set of slot formats. In some examples, the slot format combination component 1225 may transmit an identifier of the second base station in the DCI. In some cases, the slot format combination table is associated with the base station. In some cases, the slot format combination table is exclusively associated with the time-domain resources for the CLI measurement at the first UE.

The slot format component 1230 may determine the set of slot formats based at least in part based on the time-domain resources to be used for the CLI measurement at the first UE. In some examples, the slot format component 1230 may determine a set of rows of a slot format table based on the set of slot formats, the slot format combination based on the set of rows of the slot format table.

In some cases, the set of rows includes rows within a portion of the slot format table associated with available slot formats for uplink and downlink scheduling. In some cases, the set of rows includes rows within a portion of the slot format table associated with reserved slot formats that are unavailable for uplink and downlink scheduling. In some cases, the set of rows includes a first subset of rows within a first portion of the slot format table associated with available slot formats for uplink and downlink scheduling and a second subset of rows within a second portion of the slot format table associated with reserved slot formats that are unavailable for uplink and downlink scheduling.

The sequence generation component 1235 may transmit, to the first UE, sequence generation information for the CLI measurement at the first UE.

The periodic pattern component 1240 may determine the first set of symbols based on the time-domain resources and a second set of symbols, the second set of symbols associated with a periodic pattern within a resource occasion. In some examples, the periodic pattern component 1240 may transmit, to the first UE, an indication of the periodic pattern within the resource occasion. In some cases, the first set of symbols are fully included within the second set of symbols. In some cases, the first set of symbols at least partially overlap with the second set of symbols.

The slot format configuration component 1245 may transmit, to the first UE, an indication of a slot format configuration for the CLI measurement at the first UE, the slot format configuration indicating the first set of symbols. In some examples, the slot format configuration component 1245 may determine that the first set of symbols include the one or more uplink symbols of each slot format of the set of slot formats, the slot format configuration based on determining that the first set of symbols include the one or more uplink symbols.

In some examples, the slot format configuration component 1245 may determine that the first set of symbols include the one or more downlink symbols of each slot format of the set of slot formats, the slot format configuration based on determining that the first set of symbols include the one or more downlink symbols. In some examples, the slot format configuration component 1245 may determine that the first set of symbols include the one or more uplink symbols and the one or more flexible symbols of each slot format of the set of slot formats, the slot format configuration based on determining that the first set of symbols include the one or more uplink symbols and the one or more flexible symbols.

In some examples, the slot format configuration component 1245 may determine that the first set of symbols include the one or more downlink symbols and the one or more flexible symbols of each slot format of the set of slot formats, the slot format configuration based on determining that the first set of symbols include the one or more downlink symbols and the one or more flexible symbols. In some examples, the slot format configuration component 1245 may determine that each slot format of the set of slot formats includes a quantity of symbols including a first type of symbols and a second type of symbols, the first set of symbols including the first type of symbols. In some cases, the first type of symbols is associated with first symbols over which the first UE measures CLI at the first UE and the second type of symbols is associated with second symbols over which the first UE refrains from measuring the CLI at the first UE.

Figure 13:
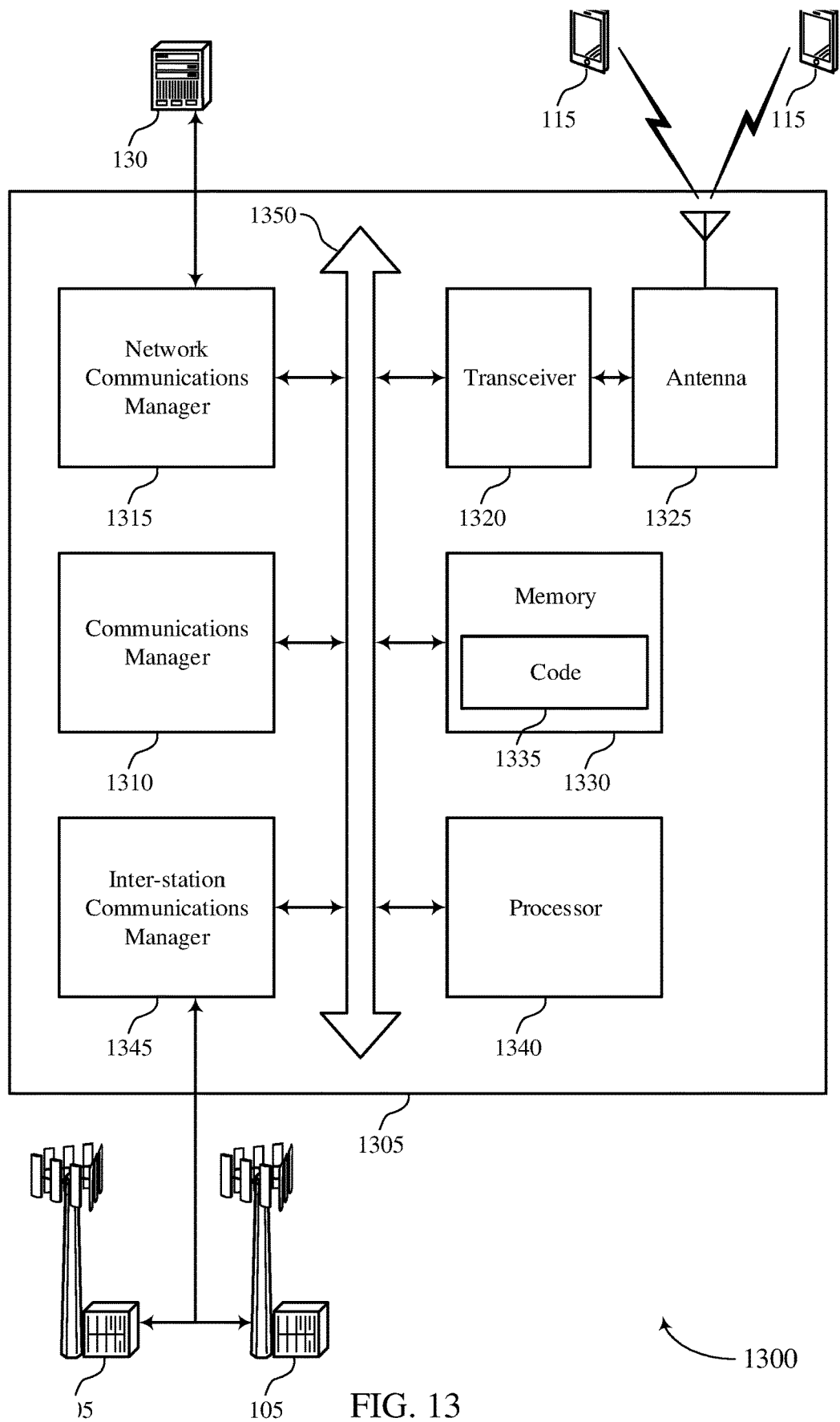
FIG. 13 shows a diagram of a system including a device that supports slot format DCI for CLI measurement resource configuration in accordance with one or more aspects of the present disclosure.

FIG. 13 shows a diagram of a system 1300 including a device 1305 that supports slot format DCI for CLI measurement resource configuration in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine time-domain resources to be used for CLI measurement at a first UE based on a first slot format of the first UE and a second slot format of a second UE, the time-domain resources including a first set of symbols for the CLI measurement at the first UE, where, transmit, to the first UE, DCI including an SFI associated with a set of slot formats indicative of the time-domain resources to be used for the CLI measurement at the first UE, and receive, from the first UE, a CLI measurement report including a measured CLI at the first UE over the first set of symbols.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting slot format DCI for CLI measurement resource configuration).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
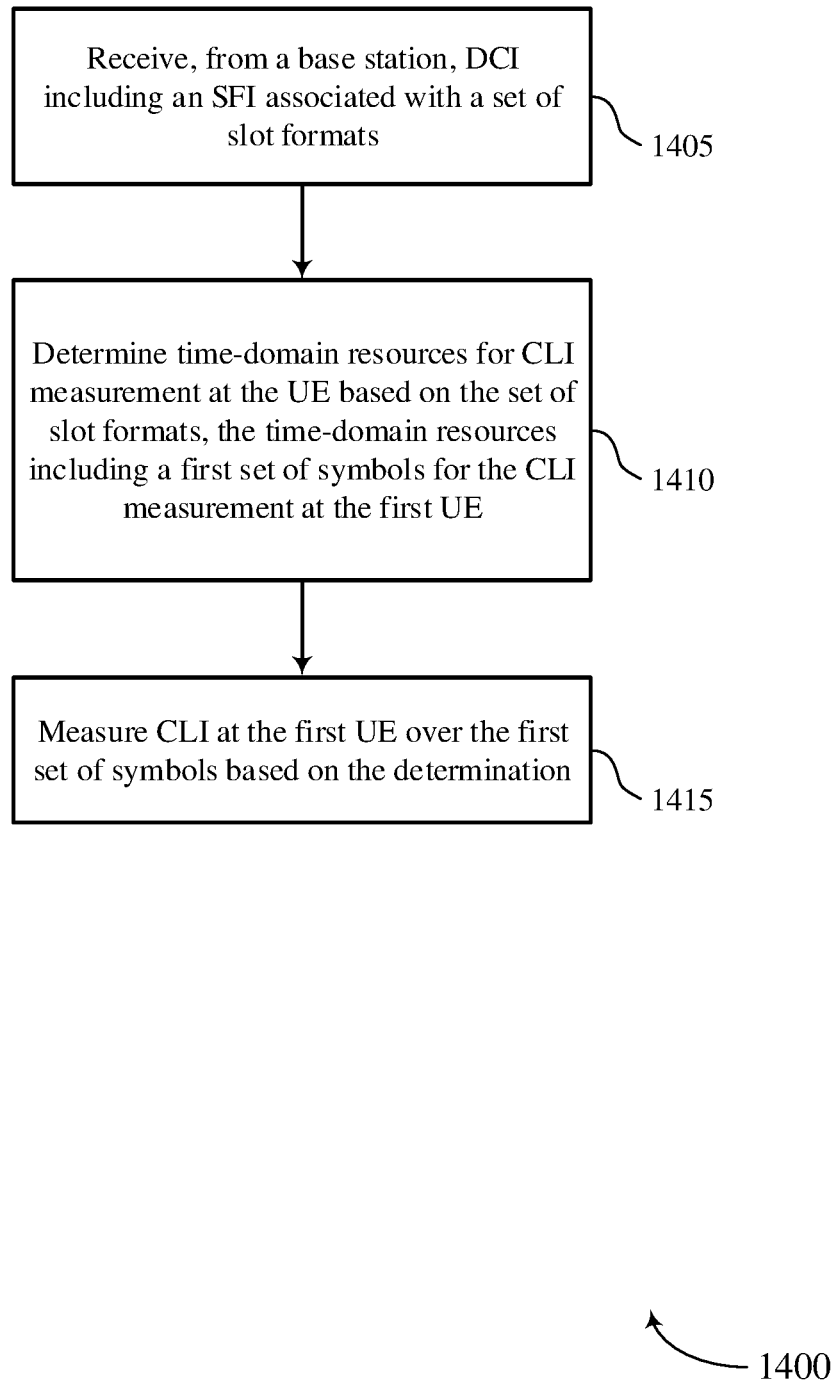
FIGS. 14 through 26 show flowcharts illustrating methods that support slot format DCI for CLI measurement resource configuration in accordance with one or more aspects of the present disclosure.

FIG. 14 shows a flowchart illustrating a method 1400 that supports slot format DCI for CLI measurement resource configuration in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, DCI including an SFI associated with a set of slot formats. The operations of 1405 may be performed according to the methods described herein. In some examples, aspects of the operations of 1405 may be performed by a DCI component as described with reference to FIGS. 6 through 9.

At 1410, the UE may determine time-domain resources for CLI measurement at the UE based on the set of slot formats, the time-domain resources including a first set of symbols for the CLI measurement at the first UE. The operations of 1410 may be performed according to the methods described herein. In some examples, aspects of the operations of 1410 may be performed by a CLI measurement resource component as described with reference to FIGS. 6 through 9.

At 1415, the UE may measure CLI at the first UE over the first set of symbols based on the determination. The operations of 1415 may be performed according to the methods described herein. In some examples, aspects of the operations of 1415 may be performed by a CLI measurement component as described with reference to FIGS. 6 through 9.

Figure 15:
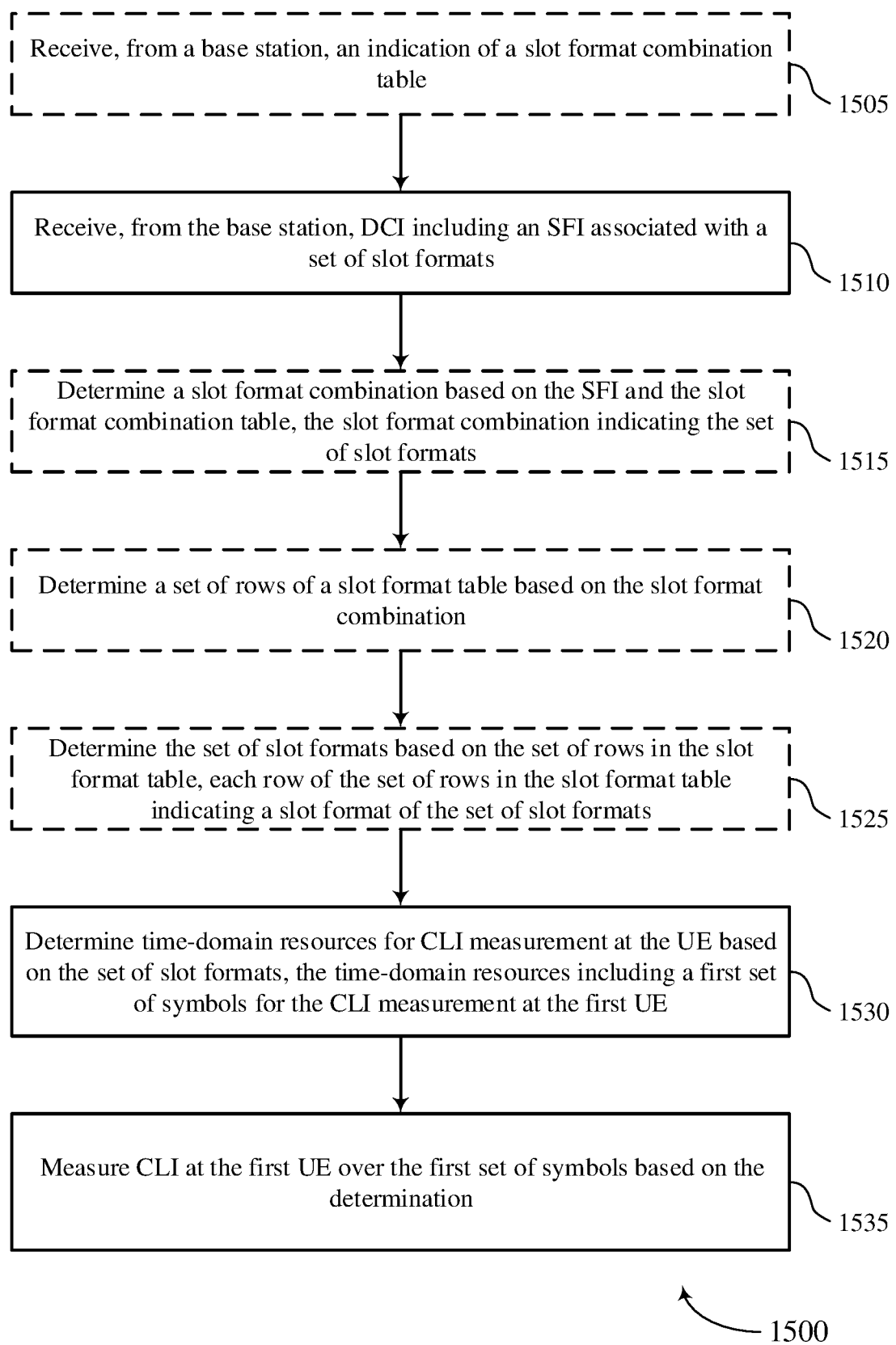

FIG. 15 shows a flowchart illustrating a method 1500 that supports slot format DCI for CLI measurement resource configuration in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an indication of a slot format combination table. The operations of 1505 may be performed according to the methods described herein. In some examples, aspects of the operations of 1505 may be performed by a slot format combination component as described with reference to FIGS. 6 through 9.

At 1510, the UE may receive, from the base station, DCI including an SFI associated with a set of slot formats. The operations of 1510 may be performed according to the methods described herein. In some examples, aspects of the operations of 1510 may be performed by a DCI component as described with reference to FIGS. 6 through 9.

At 1515, the UE may determine a slot format combination based on the SFI and the slot format combination table, the slot format combination indicating the set of slot formats. The operations of 1515 may be performed according to the methods described herein. In some examples, aspects of the operations of 1515 may be performed by a slot format combination component as described with reference to FIGS. 6 through 9.

At 1520, the UE may determine a set of rows of a slot format table based on the slot format combination. The operations of 1520 may be performed according to the methods described herein. In some examples, aspects of the operations of 1520 may be performed by a slot format component as described with reference to FIGS. 6 through 9.

At 1525, the UE may determine the set of slot formats based on the set of rows in the slot format table, each row of the set of rows in the slot format table indicating a slot format of the set of slot formats. The operations of 1525 may be performed according to the methods described herein. In some examples, aspects of the operations of 1525 may be performed by a slot format component as described with reference to FIGS. 6 through 9.

At 1530, the UE may determine time-domain resources for CLI measurement at the UE based on the set of slot formats, the time-domain resources including a first set of symbols for the CLI measurement at the first UE. The operations of 1530 may be performed according to the methods described herein. In some examples, aspects of the operations of 1530 may be performed by a CLI measurement resource component as described with reference to FIGS. 6 through 9.

At 1535, the UE may measure CLI at the first UE over the first set of symbols based on the determination. The operations of 1535 may be performed according to the methods described herein. In some examples, aspects of the operations of 1535 may be performed by a CLI measurement component as described with reference to FIGS. 6 through 9.

Figure 16:
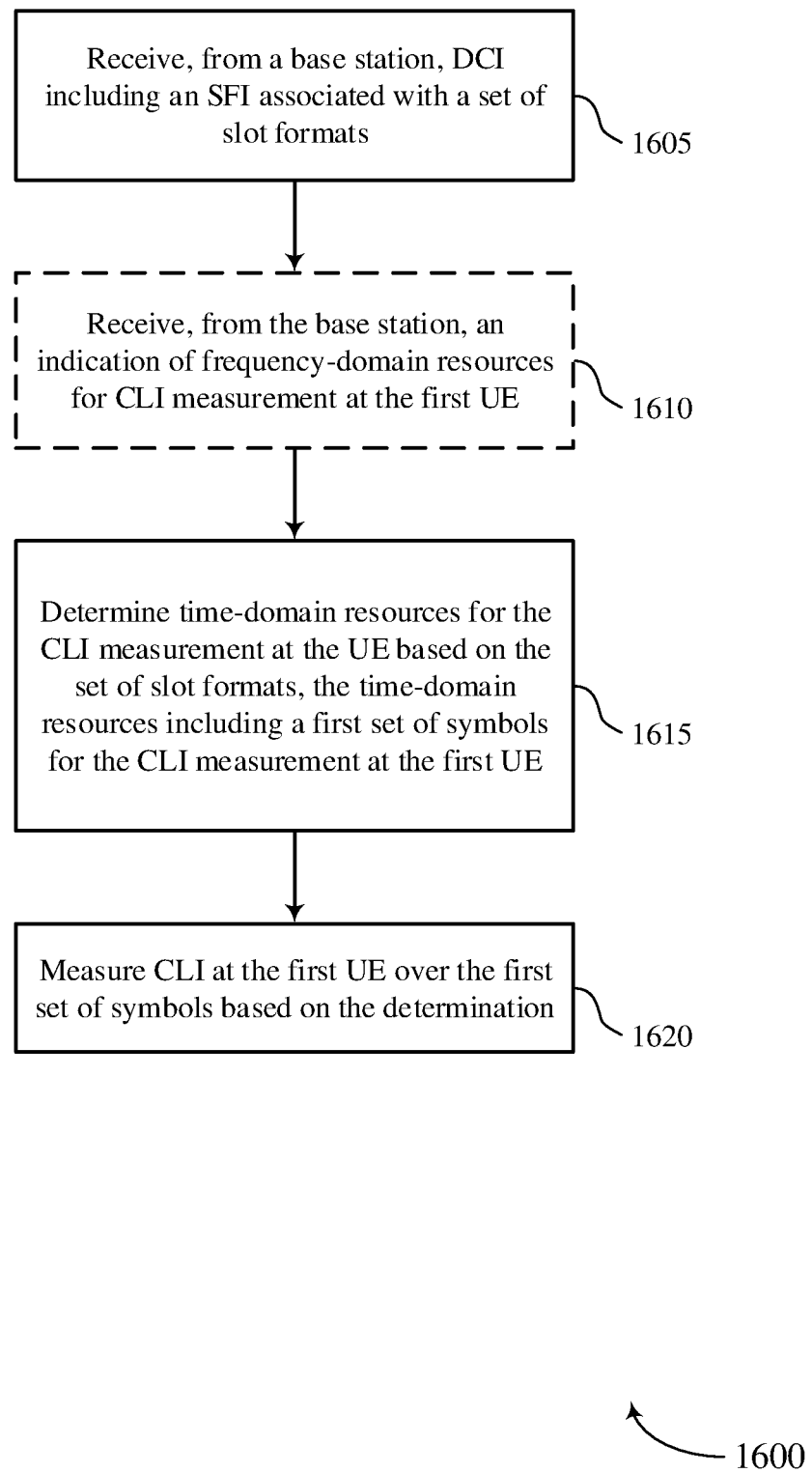

FIG. 16 shows a flowchart illustrating a method 1600 that supports slot format DCI for CLI measurement resource configuration in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, DCI including an SFI associated with a set of slot formats. The operations of 1605 may be performed according to the methods described herein. In some examples, aspects of the operations of 1605 may be performed by a DCI component as described with reference to FIGS. 6 through 9.

At 1610, the UE may receive, from the base station, an indication of frequency-domain resources for CLI measurement at the first UE. The operations of 1610 may be performed according to the methods described herein. In some examples, aspects of the operations of 1610 may be performed by a CLI measurement resource component as described with reference to FIGS. 6 through 9.

At 1615, the UE may determine time-domain resources for the CLI measurement at the UE based on the set of slot formats, the time-domain resources including a first set of symbols for the CLI measurement at the first UE. The operations of 1615 may be performed according to the methods described herein. In some examples, aspects of the operations of 1615 may be performed by a CLI measurement resource component as described with reference to FIGS. 6 through 9.

At 1620, the UE may measure CLI at the first UE over the first set of symbols based on the determination. The operations of 1620 may be performed according to the methods described herein. In some examples, aspects of the operations of 1620 may be performed by a CLI measurement component as described with reference to FIGS. 6 through 9.

Figure 17:
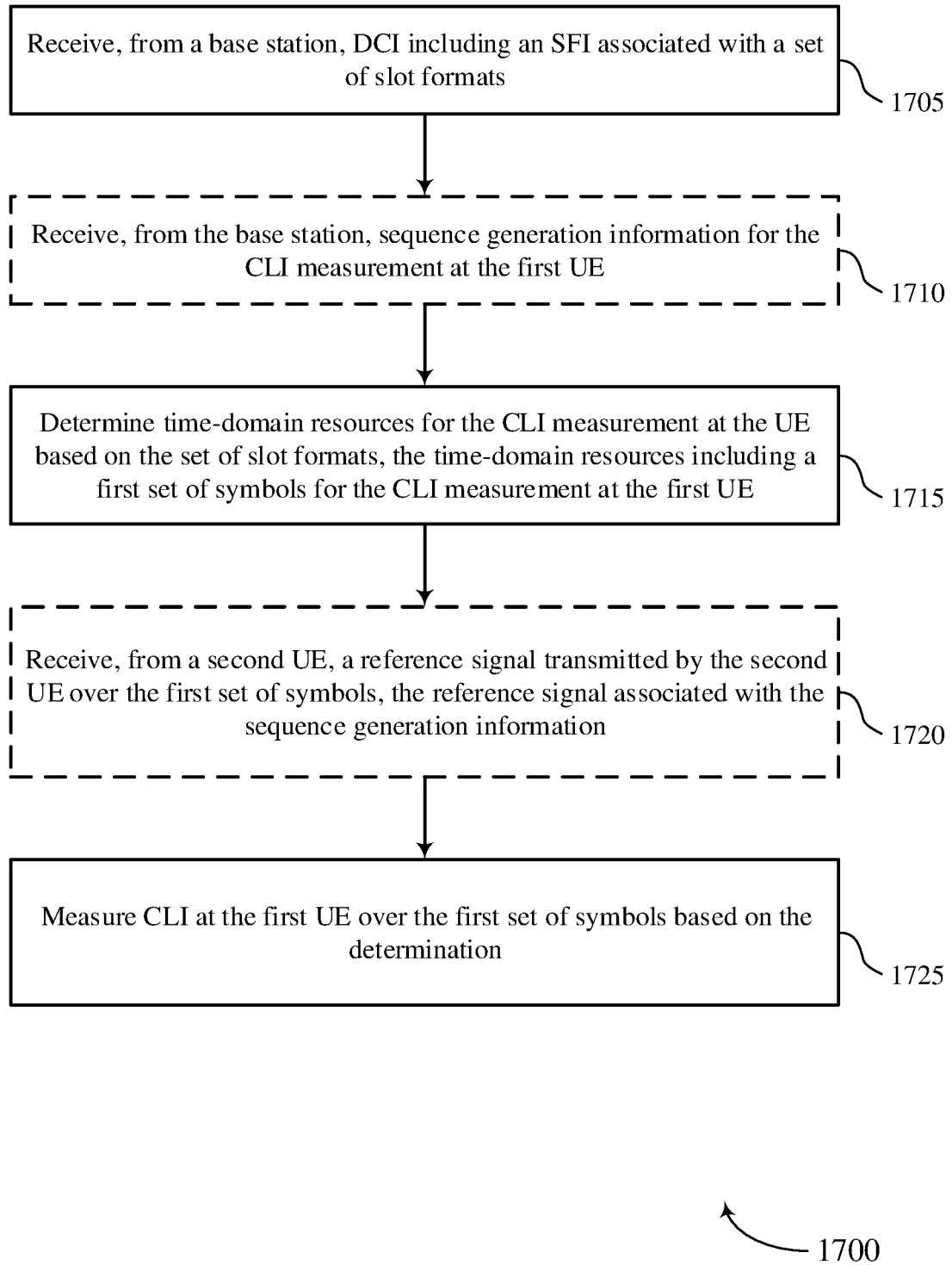

FIG. 17 shows a flowchart illustrating a method 1700 that supports slot format DCI for CLI measurement resource configuration in accordance with one or more aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, DCI including an SFI associated with a set of slot formats. The operations of 1705 may be performed according to the methods described herein. In some examples, aspects of the operations of 1705 may be performed by a DCI component as described with reference to FIGS. 6 through 9.

At 1710, the UE may receive, from the base station, sequence generation information for CLI measurement at the first UE. The operations of 1710 may be performed according to the methods described herein. In some examples, aspects of the operations of 1710 may be performed by a sequence generation component as described with reference to FIGS. 6 through 9.

At 1715, the UE may determine time-domain resources for the CLI measurement at the UE based on the set of slot formats, the time-domain resources including a first set of symbols for the CLI measurement at the first UE. The operations of 1715 may be performed according to the methods described herein. In some examples, aspects of the operations of 1715 may be performed by a CLI measurement resource component as described with reference to FIGS. 6 through 9.

At 1720, the UE may receive, from a second UE, a reference signal transmitted by the second UE over the first set of symbols, the reference signal associated with the sequence generation information, and the measuring of the cross link interference at the first UE based at least in part on the receiving of the reference signal over the first set of symbols from the second UE. The operations of 1720 may be performed according to the methods described herein. In some examples, aspects of the operations of 1720 may be performed by a CLI measurement component as described with reference to FIGS. 6 through 9.

At 1725, the UE may measure CLI at the first UE over the first set of symbols based on the determination. The operations of 1725 may be performed according to the methods described herein. In some examples, aspects of the operations of 1725 may be performed by a CLI measurement component as described with reference to FIGS. 6 through 9.

Figure 18:
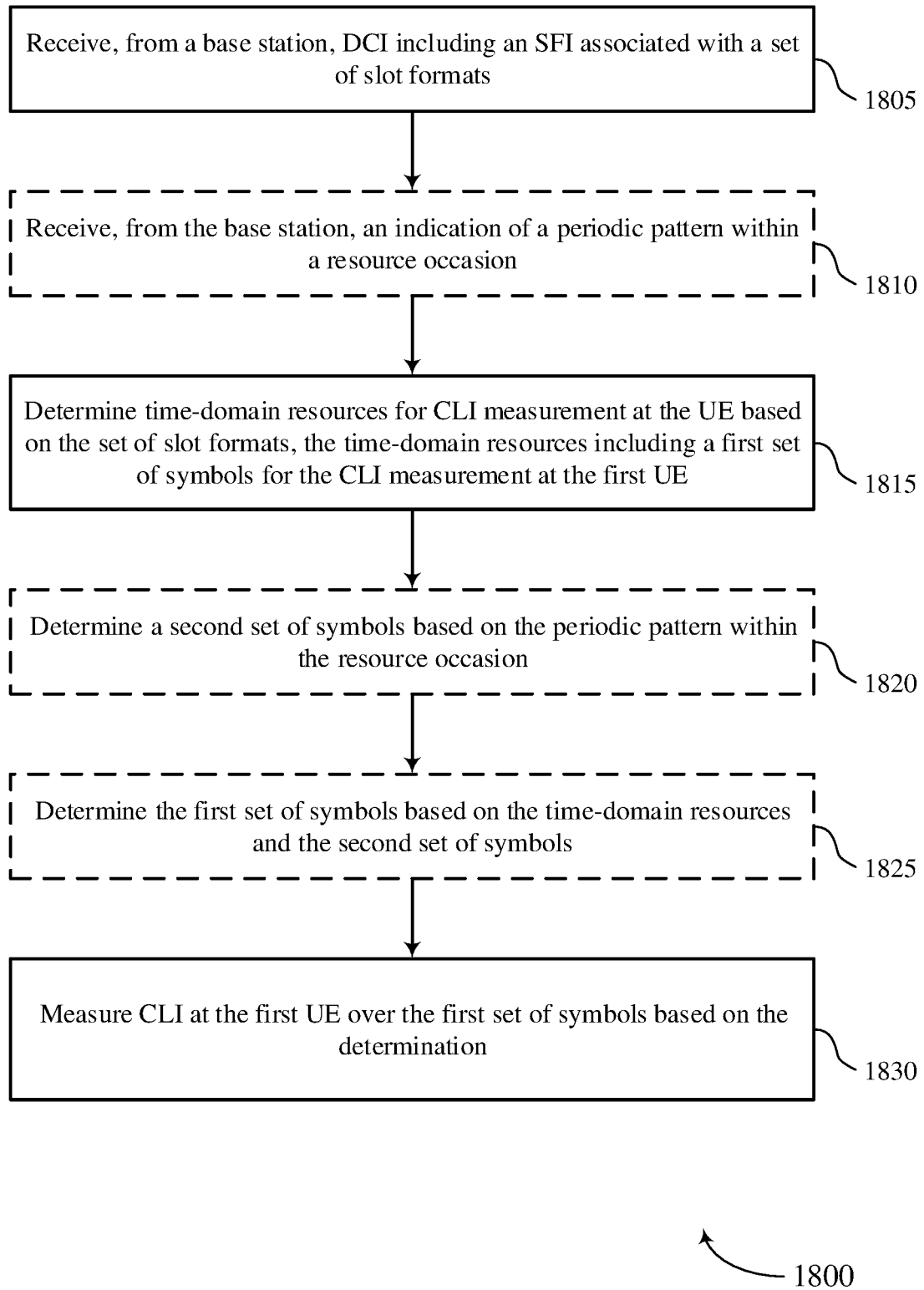

FIG. 18 shows a flowchart illustrating a method 1800 that supports slot format DCI for CLI measurement resource configuration in accordance with one or more aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a base station, DCI including an SFI associated with a set of slot formats. The operations of 1805 may be performed according to the methods described herein. In some examples, aspects of the operations of 1805 may be performed by a DCI component as described with reference to FIGS. 6 through 9.

At 1810, the UE may receive, from the base station, an indication of a periodic pattern within a resource occasion. The operations of 1810 may be performed according to the methods described herein. In some examples, aspects of the operations of 1810 may be performed by a periodic pattern component as described with reference to FIGS. 6 through 9.

At 1815, the UE may determine time-domain resources for CLI measurement at the UE based on the set of slot formats, the time-domain resources including a first set of symbols for the CLI measurement at the first UE. The operations of 1815 may be performed according to the methods described herein. In some examples, aspects of the operations of 1815 may be performed by a CLI measurement resource component as described with reference to FIGS. 6 through 9.

At 1820, the UE may determine a second set of symbols based on the periodic pattern within the resource occasion. The operations of 1820 may be performed according to the methods described herein. In some examples, aspects of the operations of 1820 may be performed by a periodic pattern component as described with reference to FIGS. 6 through 9.

At 1825, the UE may determine the first set of symbols based on the time-domain resources and the second set of symbols. The operations of 1825 may be performed according to the methods described herein. In some examples, aspects of the operations of 1825 may be performed by a CLI measurement resource component as described with reference to FIGS. 6 through 9.

At 1830, the UE may measure CLI at the first UE over the first set of symbols based on the determination. The operations of 1830 may be performed according to the methods described herein. In some examples, aspects of the operations of 1830 may be performed by a CLI measurement component as described with reference to FIGS. 6 through 9.

Figure 19:
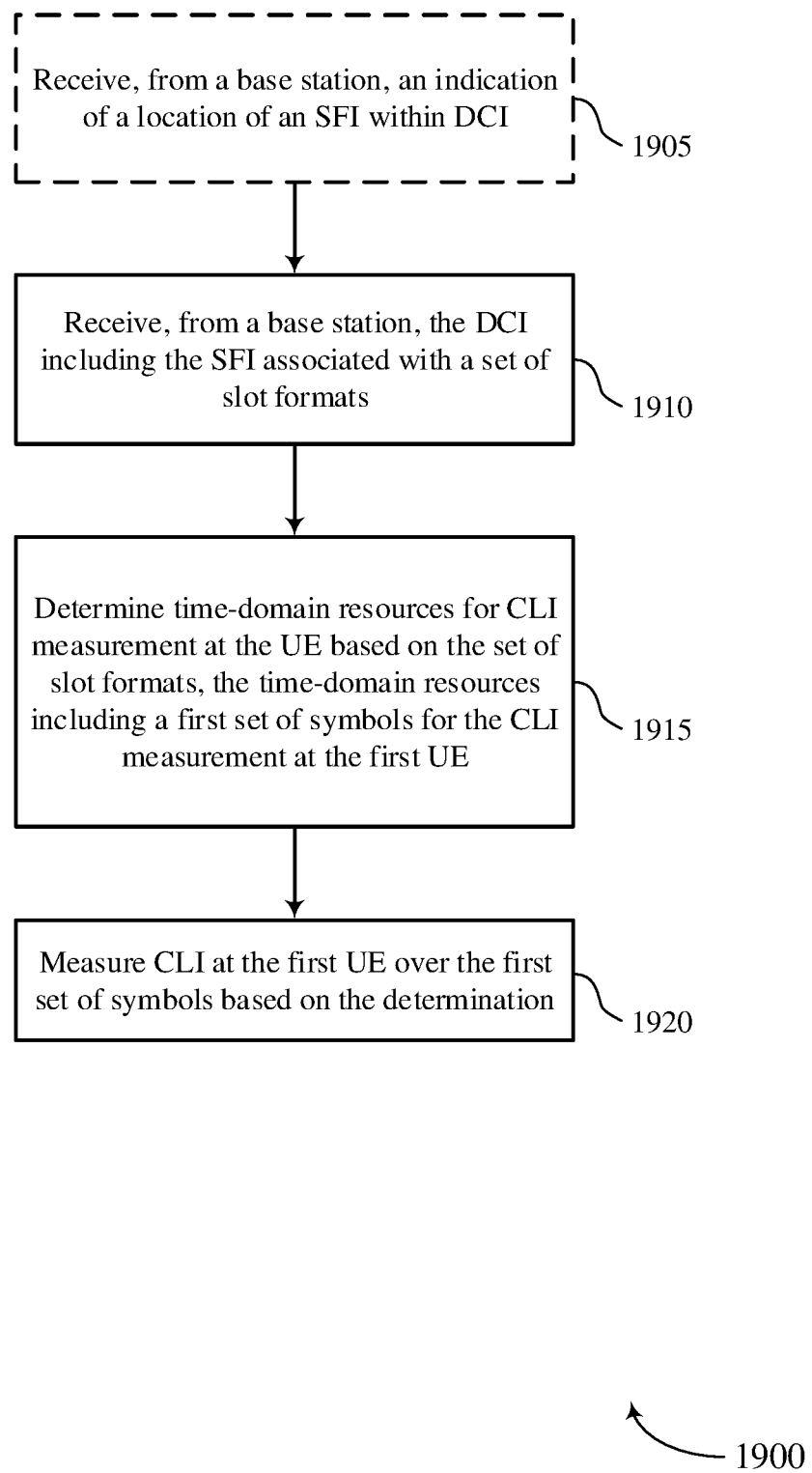

FIG. 19 shows a flowchart illustrating a method 1900 that supports slot format DCI for CLI measurement resource configuration in accordance with one or more aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may receive, from a base station, an indication of a location of sn SFI within DCI. The operations of 1905 may be performed according to the methods described herein. In some examples, aspects of the operations of 1905 may be performed by a DCI component as described with reference to FIGS. 6 through 9.

At 1910, the UE may receive, from the base station, the DCI including the SFI associated with a set of slot formats. The operations of 1910 may be performed according to the methods described herein. In some examples, aspects of the operations of 1910 may be performed by a DCI component as described with reference to FIGS. 6 through 9.

At 1915, the UE may determine time-domain resources for CLI measurement at the UE based on the set of slot formats, the time-domain resources including a first set of symbols for the CLI measurement at the first UE. The operations of 1915 may be performed according to the methods described herein. In some examples, aspects of the operations of 1915 may be performed by a CLI measurement resource component as described with reference to FIGS. 6 through 9.

At 1920, the UE may measure CLI at the first UE over the first set of symbols based on the determination. The operations of 1920 may be performed according to the methods described herein. In some examples, aspects of the operations of 1920 may be performed by a CLI measurement component as described with reference to FIGS. 6 through 9.

Figure 20:
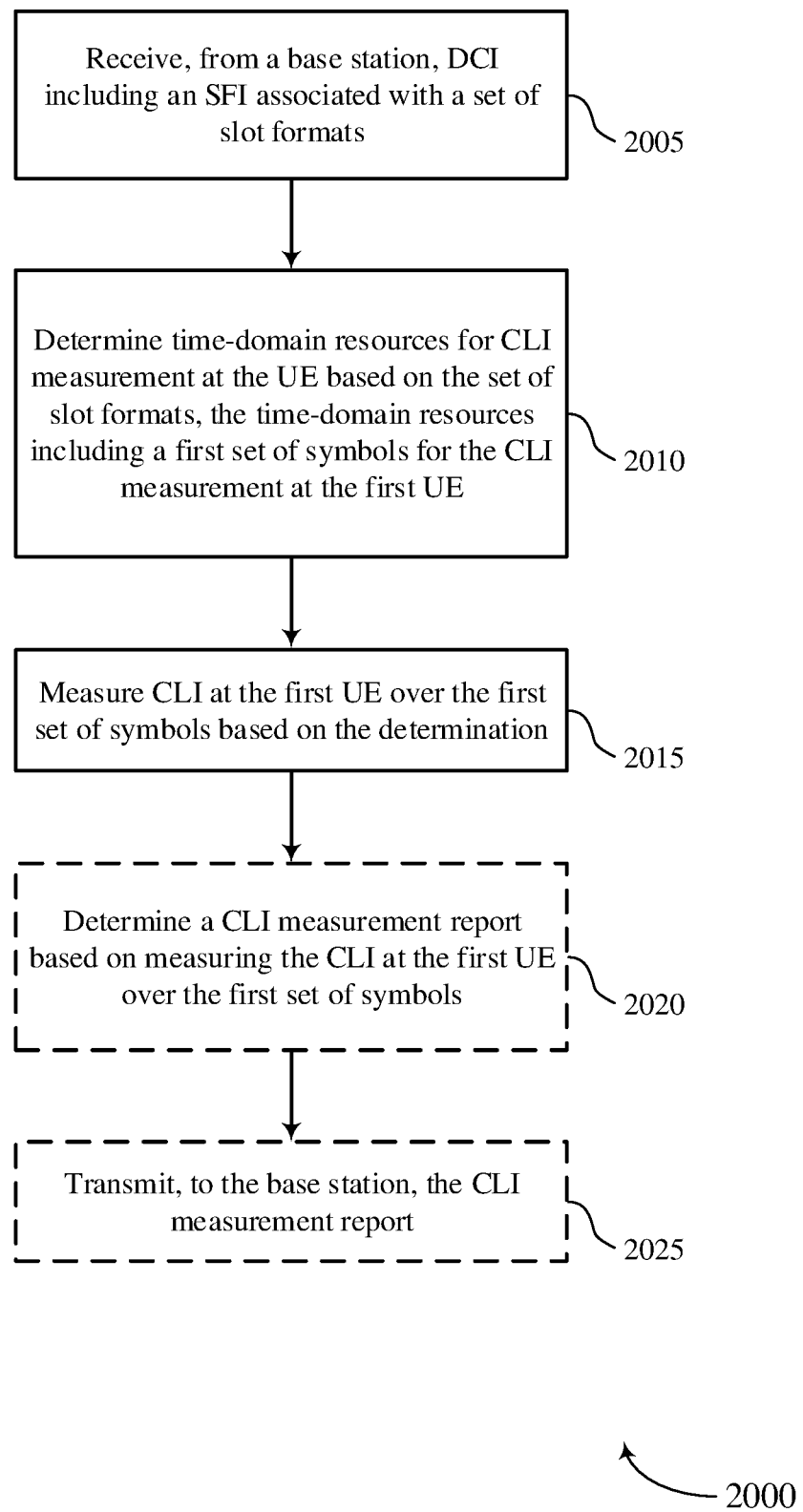

FIG. 20 shows a flowchart illustrating a method 2000 that supports slot format DCI for CLI measurement resource configuration in accordance with one or more aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2005, the UE may receive, from a base station, DCI including an SFI associated with a set of slot formats. The operations of 2005 may be performed according to the methods described herein. In some examples, aspects of the operations of 2005 may be performed by a DCI component as described with reference to FIGS. 6 through 9.

At 2010, the UE may determine time-domain resources for CLI measurement at the UE based on the set of slot formats, the time-domain resources including a first set of symbols for the CLI measurement at the first UE. The operations of 2010 may be performed according to the methods described herein. In some examples, aspects of the operations of 2010 may be performed by a CLI measurement resource component as described with reference to FIGS. 6 through 9.

At 2015, the UE may measure CLI at the first UE over the first set of symbols based on the determination. The operations of 2015 may be performed according to the methods described herein. In some examples, aspects of the operations of 2015 may be performed by a CLI measurement component as described with reference to FIGS. 6 through 9.

At 2020, the UE may determine a CLI measurement report based on measuring the CLI at the first UE over the first set of symbols. The operations of 2020 may be performed according to the methods described herein. In some examples, aspects of the operations of 2020 may be performed by a CLI measurement component as described with reference to FIGS. 6 through 9.

At 2025, the UE may transmit, to the base station, the CLI measurement report. The operations of 2025 may be performed according to the methods described herein. In some examples, aspects of the operations of 2025 may be performed by a CLI measurement component as described with reference to FIGS. 6 through 9.

Figure 21:
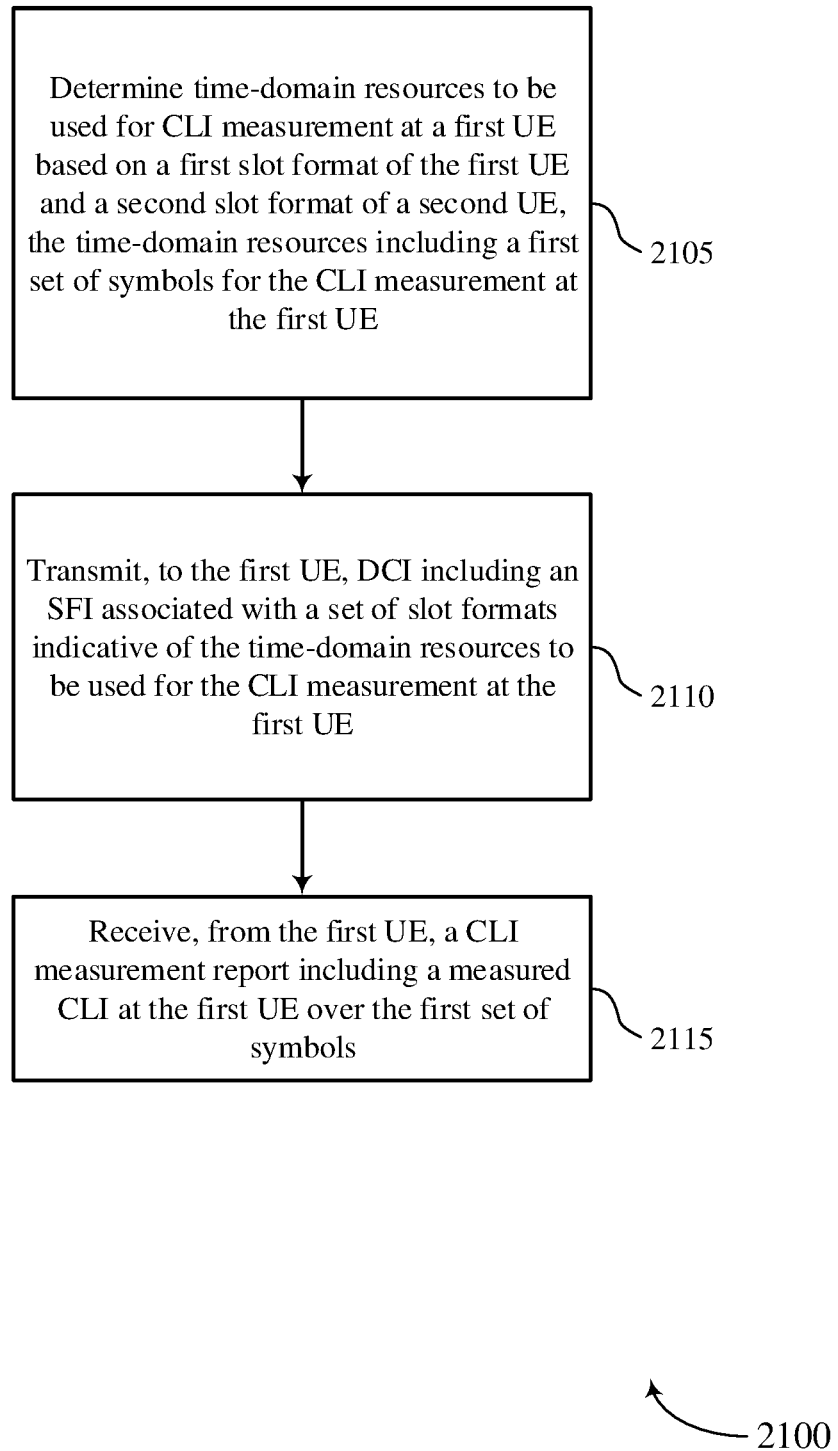

FIG. 21 shows a flowchart illustrating a method 2100 that supports slot format DCI for CLI measurement resource configuration in accordance with one or more aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may determine time-domain resources to be used for CLI measurement at a first UE based on a first slot format of the first UE and a second slot format of a second UE, the time-domain resources including a first set of symbols for the CLI measurement at the first UE. The operations of 2105 may be performed according to the methods described herein. In some examples, aspects of the operations of 2105 may be performed by a CLI measurement resource component as described with reference to FIGS. 10 through 13.

At 2110, the base station may transmit, to the first UE, DCI including an SFI associated with a set of slot formats indicative of the time-domain resources to be used for the CLI measurement at the first UE. The operations of 2110 may be performed according to the methods described herein. In some examples, aspects of the operations of 2110 may be performed by a DCI component as described with reference to FIGS. 10 through 13.

At 2115, the base station may receive, from the first UE, a CLI measurement report including a measured CLI at the first UE over the first set of symbols. The operations of 2115 may be performed according to the methods described herein. In some examples, aspects of the operations of 2115 may be performed by a CLI measurement component as described with reference to FIGS. 10 through 13.

Figure 22:
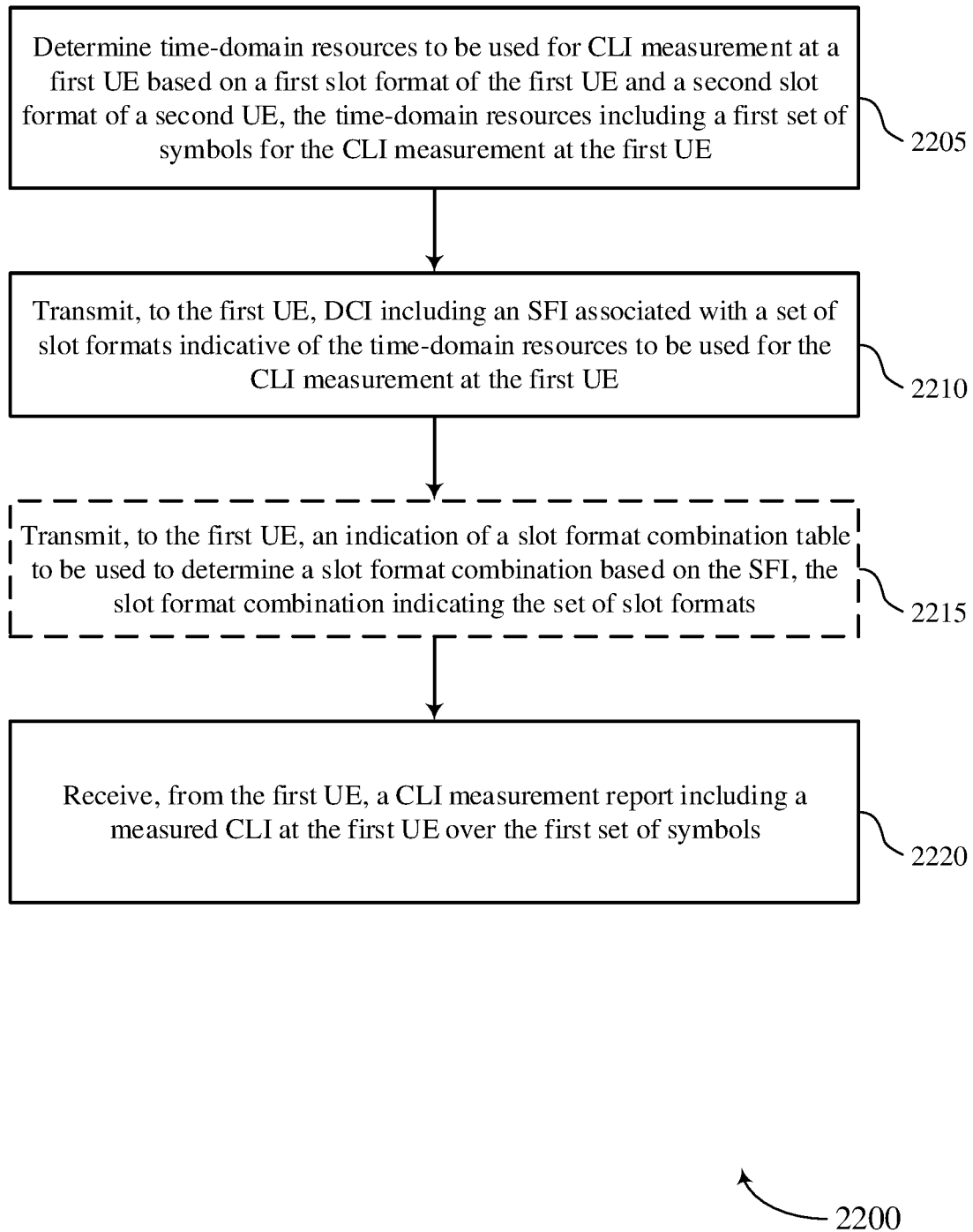

FIG. 22 shows a flowchart illustrating a method 2200 that supports slot format DCI for CLI measurement resource configuration in accordance with one or more aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2205, the base station may determine time-domain resources to be used for CLI measurement at a first UE based on a first slot format of the first UE and a second slot format of a second UE, the time-domain resources including a first set of symbols for the CLI measurement at the first UE. The operations of 2205 may be performed according to the methods described herein. In some examples, aspects of the operations of 2205 may be performed by a CLI measurement resource component as described with reference to FIGS. 10 through 13.

At 2210, the base station may transmit, to the first UE, DCI including an SFI associated with a set of slot formats indicative of the time-domain resources to be used for the CLI measurement at the first UE. The operations of 2210 may be performed according to the methods described herein. In some examples, aspects of the operations of 2210 may be performed by a DCI component as described with reference to FIGS. 10 through 13.

At 2215, the base station may transmit, to the first UE, an indication of a slot format combination table to be used to determine a slot format combination based on the SFI, the slot format combination indicating the set of slot formats. The operations of 2215 may be performed according to the methods described herein. In some examples, aspects of the operations of 2215 may be performed by a slot format combination component as described with reference to FIGS. 10 through 13.

At 2220, the base station may receive, from the first UE, a CLI measurement report including a measured CLI at the first UE over the first set of symbols. The operations of 2220 may be performed according to the methods described herein. In some examples, aspects of the operations of 2220 may be performed by a CLI measurement component as described with reference to FIGS. 10 through 13.

Figure 23:
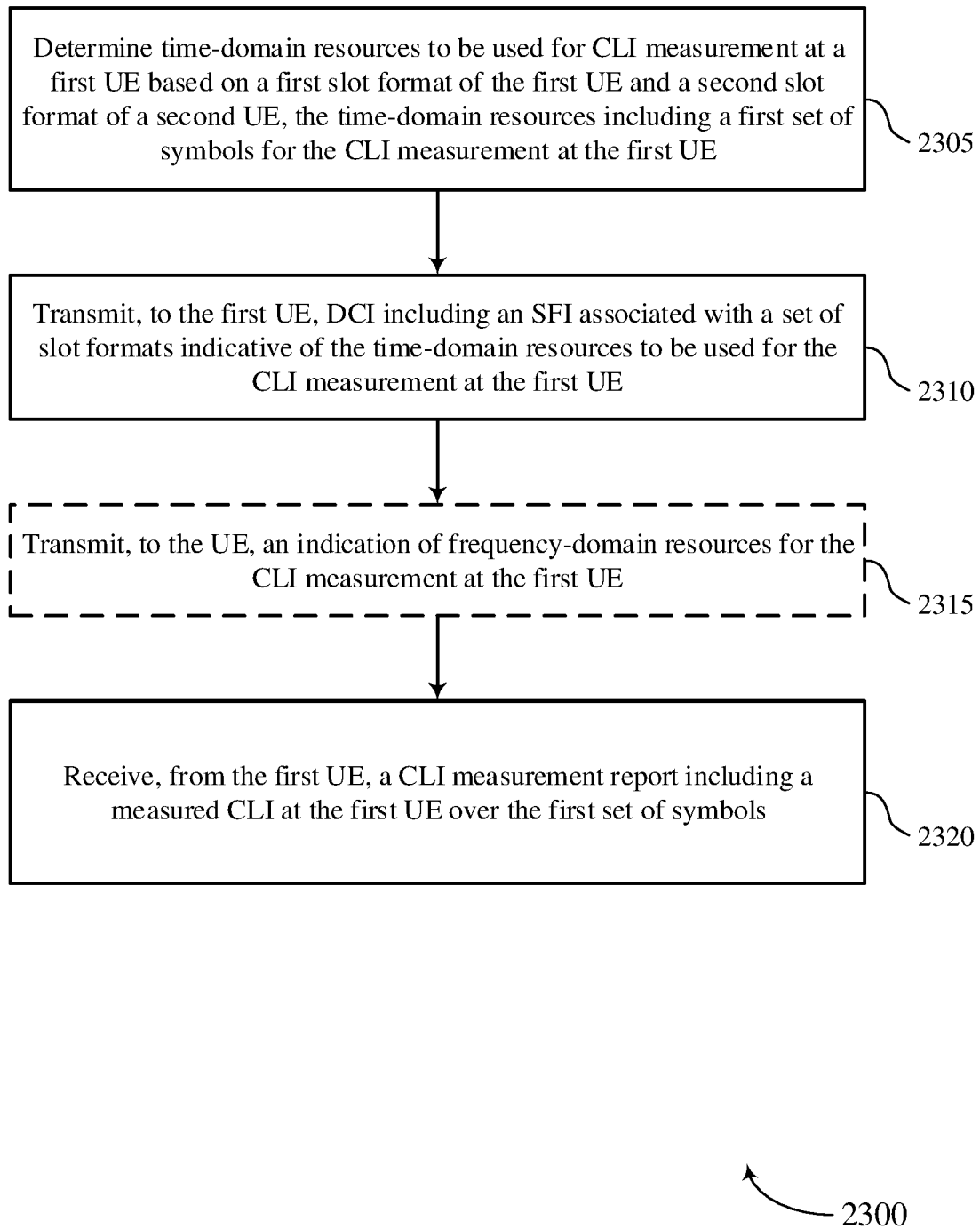

FIG. 23 shows a flowchart illustrating a method 2300 that supports slot format DCI for CLI measurement resource configuration in accordance with one or more aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2305, the base station may determine time-domain resources to be used for CLI measurement at a first UE based on a first slot format of the first UE and a second slot format of a second UE, the time-domain resources including a first set of symbols for the CLI measurement at the first UE. The operations of 2305 may be performed according to the methods described herein. In some examples, aspects of the operations of 2305 may be performed by a CLI measurement resource component as described with reference to FIGS. 10 through 13.

At 2310, the base station may transmit, to the first UE, DCI including an SFI associated with a set of slot formats indicative of the time-domain resources to be used for the CLI measurement at the first UE. The operations of 2310 may be performed according to the methods described herein. In some examples, aspects of the operations of 2310 may be performed by a DCI component as described with reference to FIGS. 10 through 13.

At 2315, the base station may transmit, to the UE, an indication of frequency-domain resources for the CLI measurement at the first UE. The operations of 2315 may be performed according to the methods described herein. In some examples, aspects of the operations of 2315 may be performed by a CLI measurement resource component as described with reference to FIGS. 10 through 13.

At 2320, the base station may receive, from the first UE, a CLI measurement report including a measured CLI at the first UE over the first set of symbols. The operations of 2320 may be performed according to the methods described herein. In some examples, aspects of the operations of 2320 may be performed by a CLI measurement component as described with reference to FIGS. 10 through 13.

Figure 24:
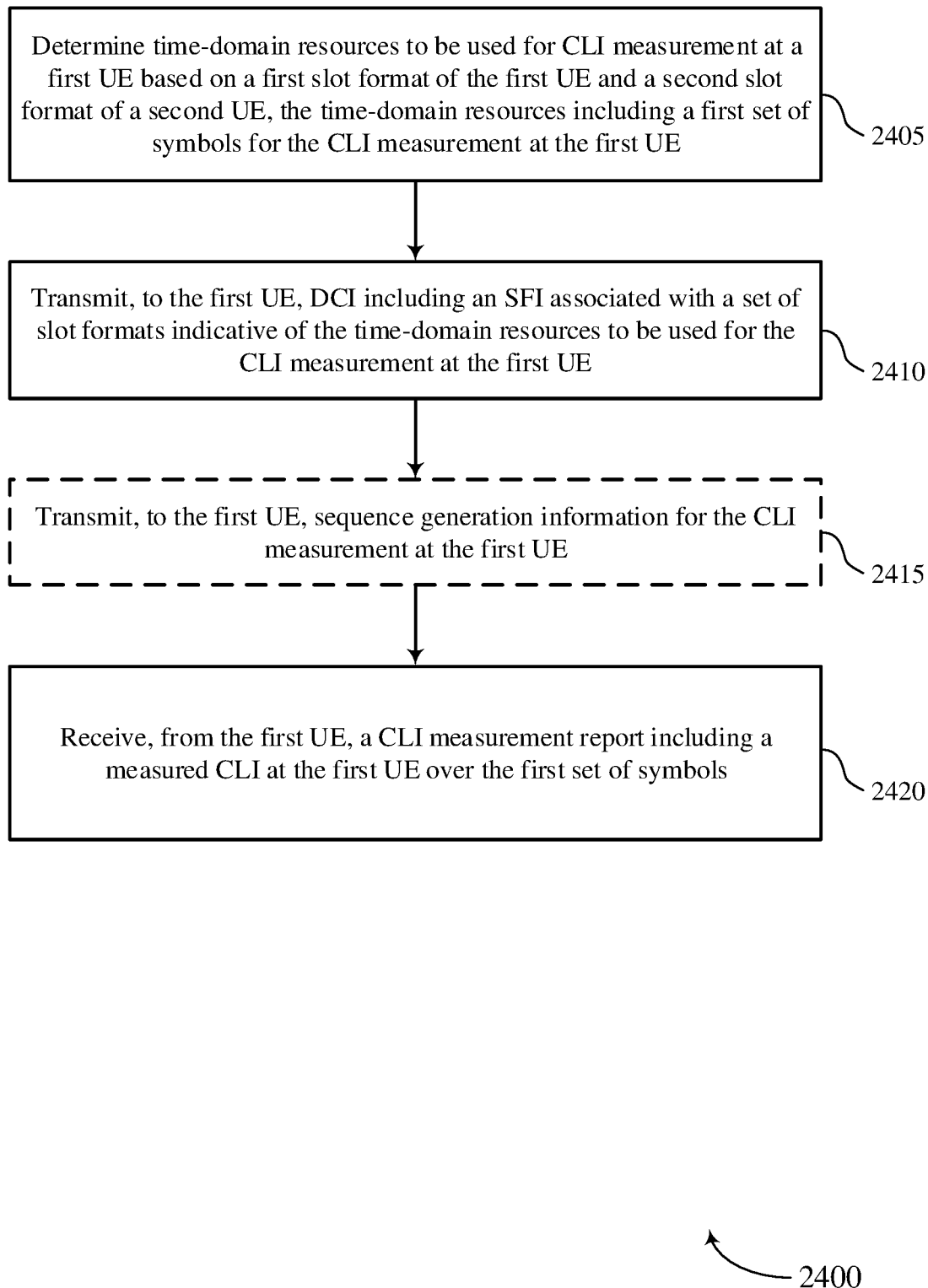

FIG. 24 shows a flowchart illustrating a method 2400 that supports slot format DCI for CLI measurement resource configuration in accordance with one or more aspects of the present disclosure. The operations of method 2400 may be implemented by a base station 105 or its components as described herein. For example, the operations of method 2400 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2405, the base station may determine time-domain resources to be used for CLI measurement at a first UE based on a first slot format of the first UE and a second slot format of a second UE, the time-domain resources including a first set of symbols for the CLI measurement at the first UE. The operations of 2405 may be performed according to the methods described herein. In some examples, aspects of the operations of 2405 may be performed by a CLI measurement resource component as described with reference to FIGS. 10 through 13.

At 2410, the base station may transmit, to the first UE, DCI including an SFI associated with a set of slot formats indicative of the time-domain resources to be used for the CLI measurement at the first UE. The operations of 2410 may be performed according to the methods described herein. In some examples, aspects of the operations of 2410 may be performed by a DCI component as described with reference to FIGS. 10 through 13.

At 2415, the base station may transmit, to the first UE, sequence generation information for the CLI measurement at the first UE. The operations of 2415 may be performed according to the methods described herein. In some examples, aspects of the operations of 2415 may be performed by a sequence generation component as described with reference to FIGS. 10 through 13.

At 2420, the base station may receive, from the first UE, a CLI measurement report including a measured CLI at the first UE over the first set of symbols. The operations of 2420 may be performed according to the methods described herein. In some examples, aspects of the operations of 2420 may be performed by a CLI measurement component as described with reference to FIGS. 10 through 13.

Figure 25:
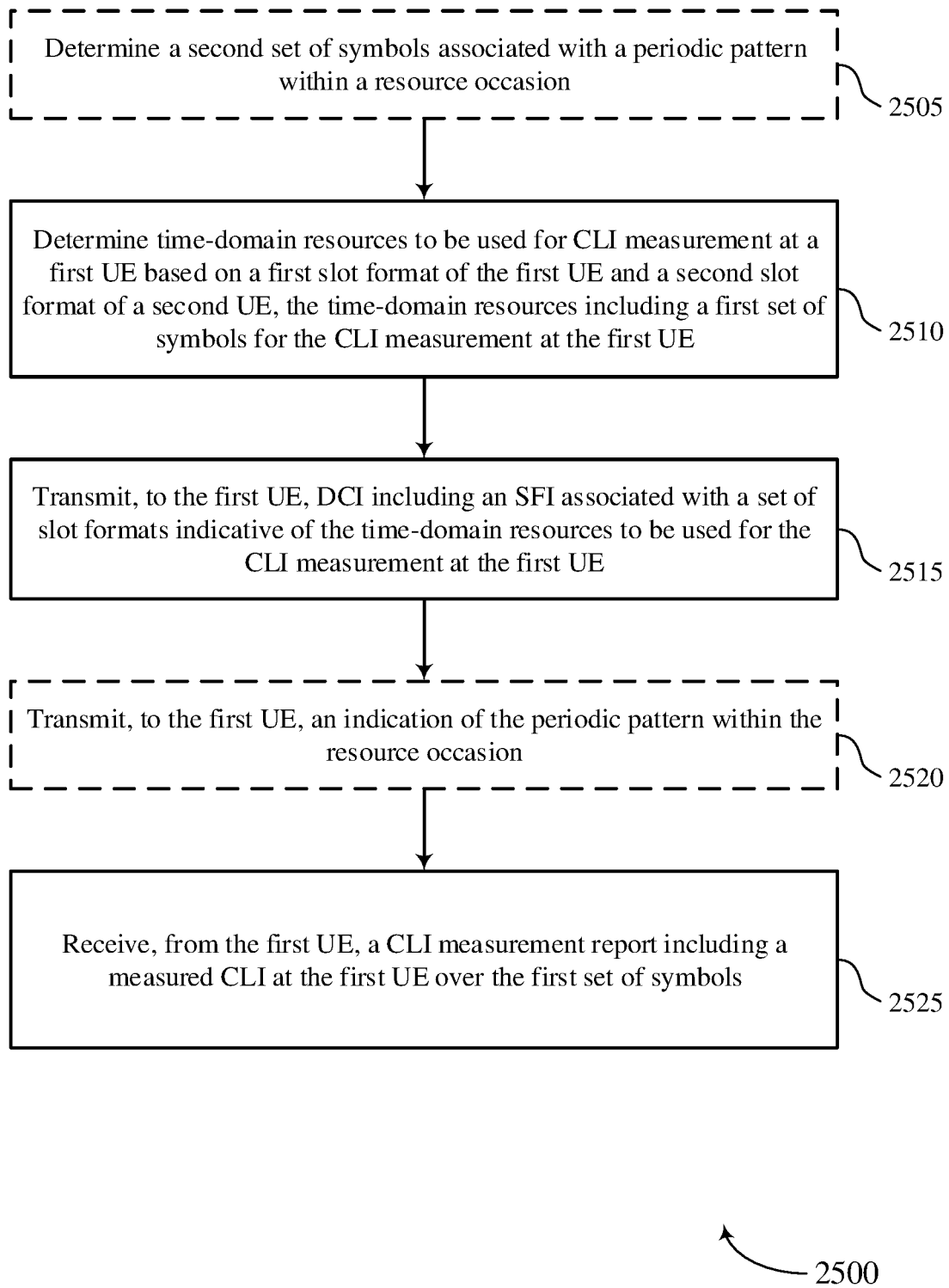

FIG. 25 shows a flowchart illustrating a method 2500 that supports slot format DCI for CLI measurement resource configuration in accordance with one or more aspects of the present disclosure. The operations of method 2500 may be implemented by a base station 105 or its components as described herein. For example, the operations of method 2500 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2505, the base station may determine a second set of symbols associated with a periodic pattern within a resource occasion. The operations of 2505 may be performed according to the methods described herein. In some examples, aspects of the operations of 2505 may be performed by a periodic pattern component as described with reference to FIGS. 10 through 13.

At 2510, the base station may determine time-domain resources to be used for CLI measurement at a first UE based on a first slot format of the first UE and a second slot format of a second UE, the time-domain resources including a first set of symbols for the CLI measurement at the first UE. The operations of 2510 may be performed according to the methods described herein. In some examples, aspects of the operations of 2510 may be performed by a CLI measurement resource component as described with reference to FIGS. 10 through 13.

At 2515, the base station may transmit, to the first UE, DCI including an SFI associated with a set of slot formats indicative of the time-domain resources to be used for the CLI measurement at the first UE. The operations of 2515 may be performed according to the methods described herein. In some examples, aspects of the operations of 2515 may be performed by a DCI component as described with reference to FIGS. 10 through 13.

At 2520, the base station may transmit, to the first UE, an indication of the periodic pattern within the resource occasion. The operations of 2520 may be performed according to the methods described herein. In some examples, aspects of the operations of 2520 may be performed by a periodic pattern component as described with reference to FIGS. 10 through 13.

At 2525, the base station may receive, from the first UE, a CLI measurement report including a measured CLI at the first UE over the first set of symbols. The operations of 2525 may be performed according to the methods described herein. In some examples, aspects of the operations of 2525 may be performed by a CLI measurement component as described with reference to FIGS. 10 through 13.

Figure 26:
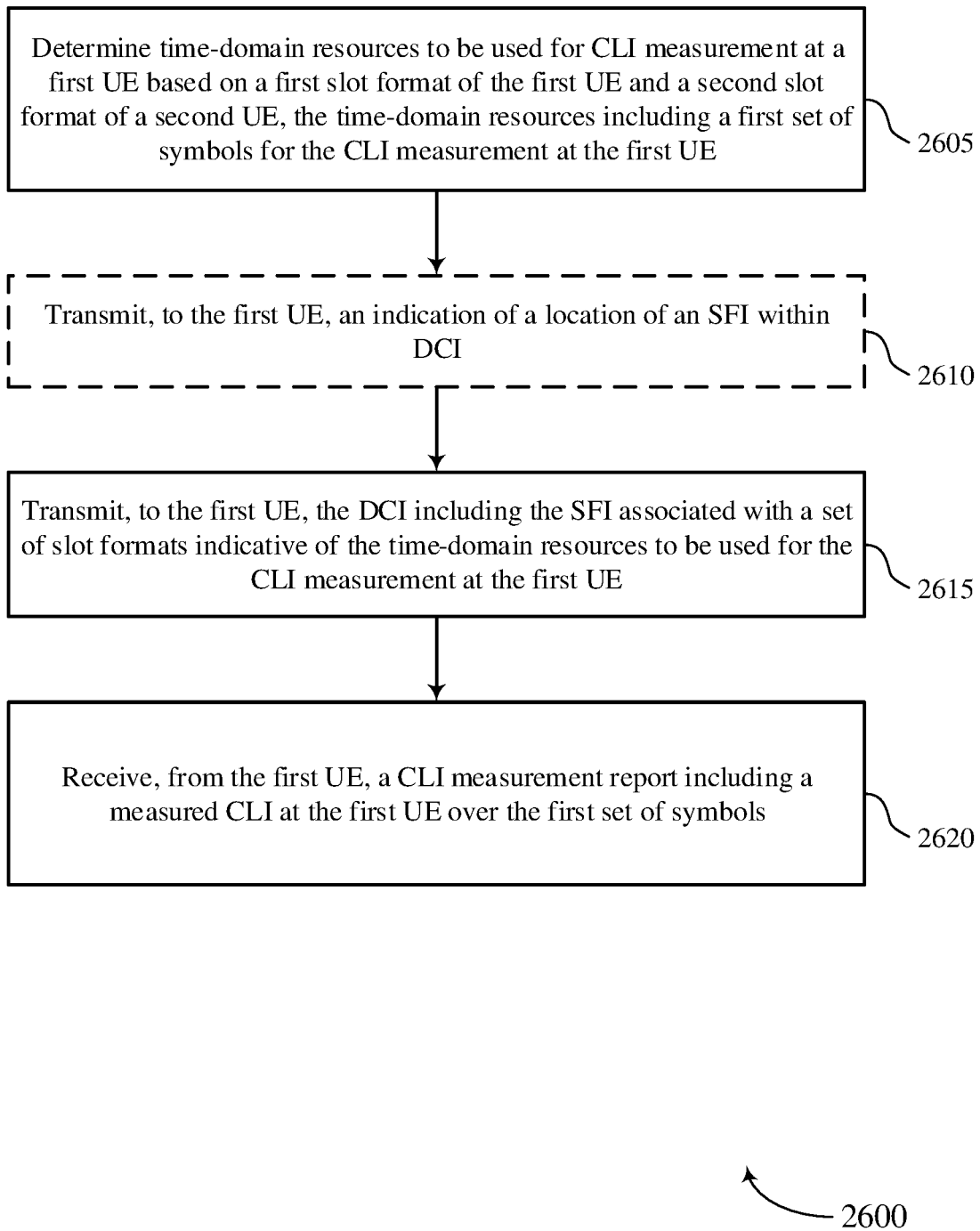

FIG. 26 shows a flowchart illustrating a method 2600 that supports slot format DCI for CLI measurement resource configuration in accordance with one or more aspects of the present disclosure. The operations of method 2600 may be implemented by a base station 105 or its components as described herein. For example, the operations of method 2600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2605, the base station may determine time-domain resources to be used for CLI measurement at a first UE based on a first slot format of the first UE and a second slot format of a second UE, the time-domain resources including a first set of symbols for the CLI measurement at the first UE. The operations of 2605 may be performed according to the methods described herein. In some examples, aspects of the operations of 2605 may be performed by a CLI measurement resource component as described with reference to FIGS. 10 through 13.

At 2610, the base station may transmit, to the first UE, an indication of a location of an SFI within DCI. The operations of 2610 may be performed according to the methods described herein. In some examples, aspects of the operations of 2610 may be performed by a DCI component as described with reference to FIGS. 10 through 13.

At 2615, the base station may transmit, to the first UE, the DCI including the SFI associated with a set of slot formats indicative of the time-domain resources to be used for the CLI measurement at the first UE. The operations of 2615 may be performed according to the methods described herein. In some examples, aspects of the operations of 2615 may be performed by a DCI component as described with reference to FIGS. 10 through 13.

At 2620, the base station may receive, from the first UE, a CLI measurement report including a measured CLI at the first UE over the first set of symbols. The operations of 2620 may be performed according to the methods described herein. In some examples, aspects of the operations of 2620 may be performed by a CLI measurement component as described with reference to FIGS. 10 through 13.

The following provides an overview of examples of the present disclosure:

Example 1: A method for wireless communication at a first UE, comprising: receiving, from a base station, DCI comprising an SFI associated with a set of slot formats; determining time-domain resources for cross link interference measurement at the UE based at least in part on the set of slot formats, the time-domain resources comprising a first set of symbols for the cross link interference measurement at the first UE; and measuring cross link interference at the first UE over the first set of symbols based at least in part on the determination.

Example 2: The method of example 1, further comprising: receiving, from the base station, an indication of a slot format combination table; and determining a slot format combination based at least in part on the SFI and the slot format combination table, the slot format combination indicating the set of slot formats.

Example 3: The method of example 2, wherein the slot format combination table is associated with the base station from which the DCI is received.

Example 4: The method of example 2, wherein the slot format combination table is associated with a second base station different than the base station from which the DCI is received, the method further comprising: receiving an identifier of the second base station in the DCI; and determining to use the slot format combination table associated with the second base station based at least in part on receiving the identifier of the second base station received in the DCI.

Example 5: The method of any one of examples 2 through 4, wherein the slot format combination table is exclusively associated with the time-domain resources for the cross link interference measurement at the first UE.

Example 6: The method of any one of examples 2 through 5, further comprising: determining a set of rows of a slot format table based at least in part on the slot format combination; and determining the set of slot formats based at least in part on the set of rows in the slot format table, each row of the set of rows in the slot format table indicating a slot format of the set of slot formats.

Example 7: The method of example 6, wherein the set of rows comprises rows within a portion of the slot format table associated with available slot formats for uplink and downlink scheduling.

Example 8: The method of claim 6, wherein the set of rows comprises rows within a portion of the slot format table associated with reserved slot formats that are unavailable for uplink and downlink scheduling.

Example 9: The method of claim 6, wherein the set of rows comprises a first subset of rows within a first portion of the slot format table associated with available slot formats for uplink and downlink scheduling and a second subset of rows within a second portion of the slot format table associated with reserved slot formats that are unavailable for uplink and downlink scheduling.

Example 10: The method of any one of examples 1 through 9, further comprising: receiving, from the base station, an indication of frequency-domain resources for the cross link interference measurement at the first UE.

Example 11: The method of any one of examples 1 through 10, further comprising: receiving, from the base station, sequence generation information for the cross link interference measurement at the first UE; and receiving, from the second UE, a reference signal transmitted by the second UE over the first set of symbols, the reference signal associated with the sequence generation information, and the measuring of the cross link interference at the first UE based at least in part on the receiving of the reference signal over the first set of symbols from the second UE.

Example 12: The method of any one of examples 1 through 11, further comprising: receiving, from the base station, an indication of a periodic pattern within a resource occasion; determining a second set of symbols based at least in part on the periodic pattern within the resource occasion; and determining the first set of symbols based at least in part on the time-domain resources and the second set of symbols.

Example 13: The method of example 12, wherein the first set of symbols are fully included within the second set of symbols.

Example 14: The method of example 12, wherein the first set of symbols at least partially overlap with the second set of symbols.

Example 15: The method of any one of examples 1 through 14, further comprising: receiving, from the base station, an indication of a location of the SFI within the DCI.

Example 16: The method of any one of examples 1 through 15, further comprising: determining a cross link interference measurement report based at least in part on measuring the cross link interference at the first UE over the first set of symbols; and transmitting, to the base station, the cross link interference measurement report.

Example 17: The method of any one of examples 1 through 16, wherein each slot format of the set of slot formats comprises a quantity of symbols including the first set of symbols, the quantity of symbols comprising one or more downlink symbols, one or more uplink symbols, or one or more flexible symbols, or any combination thereof, the method further comprising: receiving, from the base station, an indication of a slot format configuration for the cross link interference measurement at the first UE, the slot format configuration indicating the first set of symbols.

Example 18: The method of example 17, further comprising: determining that the first set of symbols comprise the one or more uplink symbols of each slot format of the set of slot formats based at least in part on the slot format configuration.

Example 19: The method of example 17, further comprising: determining that the first set of symbols comprise the one or more downlink symbols of each slot format of the set of slot formats based at least in part on the slot format configuration.

Example 20: The method of example 17, further comprising: determining that the first set of symbols comprise the one or more uplink symbols and the one or more flexible symbols of each slot format of the set of slot formats based at least in part on the slot format configuration.

Example 21: The method of example 17, further comprising: determining that the first set of symbols comprise the one or more downlink symbols and the one or more flexible symbols of each slot format of the set of slot formats based at least in part on the slot format configuration.

Example 22: The method of any one of examples 1 through 16, further comprising: determining that each slot format of the set of slot formats comprises a quantity of symbols including a first type of symbols and a second type of symbols, the first set of symbols comprising the first type of symbols.

Example 23: The method of example 22, wherein the first type of symbols is associated with first symbols over which the first UE measures the cross link interference at the first UE and the second type of symbols is associated with second symbols over which the first UE refrains from measuring the cross link interference at the first UE.

Example 24: The method of any one of examples 1 through 23, wherein the DCI is associated with an SFI DCI format.

Example 25: The method of any one of examples 1 through 23, wherein the DCI is associated with a DCI format that is exclusively used for conveying the time-domain resources for the cross link interference measurement at the first UE.

Example 26: The method of any one of examples 1 through 25, wherein the SFI comprises a slot format combination index.

Example 27: A method for wireless communication at a base station, comprising: determining time-domain resources to be used for cross link interference measurement at a first UE based at least in part on a first slot format of the first UE and a second slot format of a second UE, the time-domain resources comprising a first set of symbols for the cross link interference measurement at the first UE; transmitting, to the first UE, DCI comprising an SFI associated with a set of slot formats indicative of the time-domain resources to be used for the cross link interference measurement at the first UE; and receiving, from the first UE, a cross link interference measurement report comprising a measured cross link interference at the first UE over the first set of symbols.

Example 28: The method of example 27, further comprising: transmitting, to the first UE, an indication of a slot format combination table to be used to determine a slot format combination based at least in part on the SFI, the slot format combination indicating the set of slot formats.

Example 29: The method of example 28, wherein the slot format combination table is associated with the base station.

Example 30: The method of example 28, wherein the slot format combination table is associated with a second base station different than the base station, the transmitting of the DCI further comprising: transmitting an identifier of the second base station in the DCI.

Example 31: The method of any one of examples 28 through 30, wherein the slot format combination table is exclusively associated with the time-domain resources for the cross link interference measurement at the first UE.

Example 32: The method of any one of examples 29 through 31, further comprising: determining the set of slot formats based at least in part based at least in part on the time-domain resources to be used for the cross link interference measurement at the first UE; and determining a set of rows of a slot format table based at least in part on the set of slot formats, the slot format combination based at least in part on the set of rows of the slot format table.

Example 33: The method of example 32, wherein the set of rows comprises rows within a portion of the slot format table associated with available slot formats for uplink and downlink scheduling.

Example 34: The method of example 32, wherein the set of rows comprises rows within a portion of the slot format table associated with reserved slot formats that are unavailable for uplink and downlink scheduling.

Example 35: The method of example 32, wherein the set of rows comprises a first subset of rows within a first portion of the slot format table associated with available slot formats for uplink and downlink scheduling and a second subset of rows within a second portion of the slot format table associated with reserved slot formats that are unavailable for uplink and downlink scheduling.

Example 36: The method of any one of examples 27 through 35, further comprising: transmitting, to the UE, an indication of frequency-domain resources for the cross link interference measurement at the first UE.

Example 37: The method of any one of examples 27 through 36, further comprising: transmitting, to the first UE, sequence generation information for the cross link interference measurement at the first UE.

Example 38: The method of any one of examples 27 through 37, further comprising: determining the first set of symbols based at least in part on the time-domain resources and a second set of symbols, the second set of symbols associated with a periodic pattern within a resource occasion; and transmitting, to the first UE, an indication of the periodic pattern within the resource occasion.

Example 39: The method of example 38, wherein the first set of symbols are fully included within the second set of symbols.

Example 40: The method of example 38, wherein the first set of symbols at least partially overlap with the second set of symbols.

Example 41: The method of any one of examples 27 through 40, further comprising: transmitting, to the first UE, an indication of a location of the SFI within the DCI.

Example 42: The method of any one of examples 27 through 41, the determining of the time-domain resources to be used for the cross link interference measurement at the first UE comprising: determining the time-domain resources comprising an overlap of downlink symbols in the first slot format of the first UE and uplink symbols in the second slot format of the second UE.

Example 43: The method of any one of examples 27 through 42, wherein each slot format of the set of slot formats comprises a quantity of symbols including the first set of symbols, the quantity of symbols comprising one or more downlink symbols, one or more uplink symbols, or one or more flexible symbols, or any combination thereof, the method further comprising: transmitting, to the first UE, an indication of a slot format configuration for the cross link interference measurement at the first UE, the slot format configuration indicating the first set of symbols.

Example 44: The method of example 43, further comprising: determining that the first set of symbols comprise the one or more uplink symbols of each slot format of the set of slot formats, the slot format configuration based at least in part on determining that the first set of symbols comprise the one or more uplink symbols.

Example 45: The method of example 43, further comprising: determining that the first set of symbols comprise the one or more downlink symbols of each slot format of the set of slot formats, the slot format configuration based at least in part on determining that the first set of symbols comprise the one or more downlink symbols.

Example 46: The method of example 43, further comprising: determining that the first set of symbols comprise the one or more uplink symbols and the one or more flexible symbols of each slot format of the set of slot formats, the slot format configuration based at least in part on determining that the first set of symbols comprise the one or more uplink symbols and the one or more flexible symbols.

Example 47: The method of example 43, further comprising: determining that the first set of symbols comprise the one or more downlink symbols and the one or more flexible symbols of each slot format of the set of slot formats, the slot format configuration based at least in part on determining that the first set of symbols comprise the one or more downlink symbols and the one or more flexible symbols.

Example 48: The method of any one of examples 27 through 42, further comprising: determining that each slot format of the set of slot formats comprises a quantity of symbols including a first type of symbols and a second type of symbols, the first set of symbols comprising the first type of symbols.

Example 49: The method of example 48, wherein the first type of symbols is associated with first symbols over which the first UE measures cross link interference at the first UE and the second type of symbols is associated with second symbols over which the first UE refrains from measuring the cross link interference at the first UE.

Example 50: The method of any one of examples 27 through 49, wherein the DCI is associated with an SFI DCI format.

Example 51: The method of any one of examples 27 through 49, wherein the DCI is associated with a DCI format that is exclusively used for conveying the time-domain resources for the cross link interference measurement at the first UE.

Example 52: The method of any one of examples 27 through 51, wherein the SFI comprises a slot format combination index.

Example 53: An apparatus for wireless communication comprising at least one means for performing a method of any one of examples 1 through 26.

Example 54: An apparatus for wireless communication comprising a processor, memory coupled to the processor, and the processor and memory configured to perform a method of any one of examples 1 through 26.

Example 55: A non-transitory computer-readable medium storing code for wireless communication, the code comprising instructions executable by a processor to perform a method of any one of examples 1 through 26.

Example 56: An apparatus for wireless communication comprising at least one means for performing a method of any one of examples 27 through 52.

Example 57: An apparatus for wireless communication comprising a processor, memory coupled to the processor, and the processor and memory configured to perform a method of any one of examples 27 through 52.

Example 58: A non-transitory computer-readable medium storing code for wireless communication, the code comprising instructions executable by a processor to perform a method of any one of examples 27 through 52.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving, from a base station, downlink control information comprising a slot format indicator associated with a set of slot formats;
   determining time-domain resources for cross link interference measurement at the UE based at least in part on the set of slot formats, the time-domain resources comprising a first set of symbols for the cross link interference measurement at the first UE; and
   measuring cross link interference at the first UE over the first set of symbols based at least in part on the determination.

2. The method of claim 1, further comprising:
   receiving, from the base station, an indication of a slot format combination table; and
   determining a slot format combination based at least in part on the slot format indicator and the slot format combination table, the slot format combination indicating the set of slot formats.

3. The method of claim 2, further comprising:
   determining a set of rows of a slot format table based at least in part on the slot format combination; and
   determining the set of slot formats based at least in part on the set of rows in the slot format table, each row of the set of rows in the slot format table indicating a slot format of the set of slot formats.

4. The method of claim 1, further comprising:
   determining a cross link interference measurement report based at least in part on measuring the cross link interference at the first UE over the first set of symbols; and
   transmitting, to the base station, the cross link interference measurement report.

5. The method of claim 1, wherein each slot format of the set of slot formats comprises a quantity of symbols including the first set of symbols, the quantity of symbols comprising one or more downlink symbols, one or more uplink symbols, or one or more flexible symbols, or any combination thereof, the method further comprising:
   receiving, from the base station, an indication of a slot format configuration for the cross link interference measurement at the first UE, the slot format configuration indicating the first set of symbols.

6. The method of claim 1, further comprising:
   determining that each slot format of the set of slot formats comprises a quantity of symbols including a first type of symbols and a second type of symbols, the first set of symbols comprising the first type of symbols, wherein the first type of symbols is associated with first symbols over which the first UE measures the cross link interference at the first UE and the second type of symbols is associated with second symbols over which the first UE refrains from measuring the cross link interference at the first UE.

7. A method for wireless communication at a base station, comprising:
   determining time-domain resources to be used for cross link interference measurement at a first UE based at least in part on a first slot format of the first UE and a second slot format of a second UE, the time-domain resources comprising a first set of symbols for the cross link interference measurement at the first UE;
   transmitting, to the first UE, downlink control information comprising a slot format indicator associated with a set of slot formats indicative of the time-domain resources to be used for the cross link interference measurement at the first UE; and
   receiving, from the first UE, a cross link interference measurement report comprising a measured cross link interference at the first UE over the first set of symbols.

8. An apparatus for wireless communication at a first user equipment (UE), comprising:
   a processor; and
   a memory coupled with the processor, with instructions stored in the memory, the instructions being executable by the processor to cause the apparatus to:
      receive, from a base station, downlink control information comprising a slot format indicator associated with a set of slot formats;
      determine time-domain resources for cross link interference measurement at the UE based at least in part on the set of slot formats, the time-domain resources comprising a first set of symbols for the cross link interference measurement at the first UE; and
      measure cross link interference at the first UE over the first set of symbols based at least in part on the determination.

9. The apparatus of claim 8, wherein the instructions are further executable by the processor to cause the apparatus to:
   receive, from the base station, an indication of a slot format combination table; and
   determine a slot format combination based at least in part on the slot format indicator and the slot format combination table, the slot format combination indicating the set of slot formats.

10. The apparatus of claim 9, wherein the slot format combination table is associated with the base station from which the downlink control information is received.

11. The apparatus of claim 9, wherein the slot format combination table is associated with a second base station different than the base station from which the downlink control information is received, and wherein the instructions are further executable by the processor to cause the apparatus to:
    receive an identifier of the second base station in the downlink control information; and
    determine to use the slot format combination table associated with the second base station based at least in part on receiving the identifier of the second base station received in the downlink control information.

12. The apparatus of claim 9, wherein the slot format combination table is exclusively associated with the time-domain resources for the cross link interference measurement at the first UE.

13. The apparatus of claim 9, wherein the instructions are further executable by the processor to cause the apparatus to:
determine a set of rows of a slot format table based at least in part on the slot format combination; and
determine the set of slot formats based at least in part on the set of rows in the slot format table, each row of the set of rows in the slot format table indicating a slot format of the set of slot formats.

14. The apparatus of claim 13, wherein the set of rows comprises rows within a portion of the slot format table associated with available slot formats for uplink and downlink scheduling.

15. The apparatus of claim 13, wherein the set of rows comprises rows within a portion of the slot format table associated with reserved slot formats that are unavailable for uplink and downlink scheduling.

16. The apparatus of claim 13, wherein the set of rows comprises a first subset of rows within a first portion of the slot format table associated with available slot formats for uplink and downlink scheduling and a second subset of rows within a second portion of the slot format table associated with reserved slot formats that are unavailable for uplink and downlink scheduling.

17. The apparatus of claim 8, wherein the instructions are further executable by the processor to cause the apparatus to:
determine a cross link interference measurement report based at least in part on measuring the cross link interference at the first UE over the first set of symbols; and
transmit, to the base station, the cross link interference measurement report.

18. The apparatus of claim 8, wherein each slot format of the set of slot formats comprises a quantity of symbols including the first set of symbols, and wherein the instructions are further executable by the processor to cause the apparatus to:
receive, from the base station, an indication of a slot format configuration for the cross link interference measurement at the first UE, the slot format configuration indicating the first set of symbols.

19. The apparatus of claim 18, wherein the instructions are further executable by the processor to cause the apparatus to:
determine that the first set of symbols comprise one or more uplink symbols of each slot format of the set of slot formats based at least in part on the slot format configuration.

20. The apparatus of claim 18, wherein the instructions are further executable by the processor to cause the apparatus to:
determine that the first set of symbols comprise one or more downlink symbols of each slot format of the set of slot formats based at least in part on the slot format configuration.

21. The apparatus of claim 18, wherein the instructions are further executable by the processor to cause the apparatus to:
determine that the first set of symbols comprise one or more uplink symbols and one or more flexible symbols of each slot format of the set of slot formats based at least in part on the slot format configuration.

22. The apparatus of claim 18, wherein the instructions are further executable by the processor to cause the apparatus to:
determine that the first set of symbols comprise one or more downlink symbols and one or more flexible symbols of each slot format of the set of slot formats based at least in part on the slot format configuration.

23. The apparatus of claim 8, wherein the instructions are further executable by the processor to cause the apparatus to:
determine that each slot format of the set of slot formats comprises a quantity of symbols including a first type of symbols and a second type of symbols, the first set of symbols comprising the first type of symbols.

24. The apparatus of claim 23, wherein the first type of symbols is associated with first symbols over which the first UE measures the cross link interference at the first UE and the second type of symbols is associated with second symbols over which the first UE refrains from measuring the cross link interference at the first UE.

25. The apparatus of claim 8, wherein the slot format indicator comprises a slot format combination index.

26. An apparatus for wireless communication at a base station, comprising:
a processor; and
a memory coupled with the processor, with instructions stored in the memory, the instructions being executable by the processor to cause the apparatus to:
determine time-domain resources to be used for cross link interference measurement at a first UE based at least in part on a first slot format of the first UE and a second slot format of a second UE, the time-domain resources comprising a first set of symbols for the cross link interference measurement at the first UE;
transmit, to the first UE, downlink control information comprising a slot format indicator associated with a set of slot formats indicative of the time-domain resources to be used for the cross link interference measurement at the first UE; and
receive, from the first UE, a cross link interference measurement report comprising a measured cross link interference at the first UE over the first set of symbols.

27. The apparatus of claim 26, wherein the instructions are further executable by the processor to cause the apparatus to:
transmit, to the first UE, an indication of a slot format combination table to be used to determine a slot format combination based at least in part on the slot format indicator, the slot format combination indicating the set of slot formats.

28. The apparatus of claim 27, wherein the instructions are further executable by the processor to cause the apparatus to:
determine the set of slot formats based at least in part based at least in part on the time-domain resources to be used for the cross link interference measurement at the first UE; and
determine a set of rows of a slot format table based at least in part on the set of slot formats, the slot format combination based at least in part on the set of rows of the slot format table.

29. The apparatus of claim 26, wherein the instructions are further executable by the processor to cause the apparatus to:

determine the time-domain resources comprising an overlap of downlink symbols in the first slot format of the first UE and uplink symbols in the second slot format of the second UE.

30. The apparatus of claim 26, wherein each slot format of the set of slot formats comprises a quantity of symbols including the first set of symbols, and wherein the instructions are further executable by the processor to cause the apparatus to:
transmit, to the first UE, an indication of a slot format configuration for the cross link interference measurement at the first UE, the slot format configuration indicating the first set of symbols.

* * * * *